United States Patent
McCafferty et al.

(10) Patent No.: US 7,617,513 B2
(45) Date of Patent: Nov. 10, 2009

(54) WIRELESS STREAMING MEDIA SYSTEMS, DEVICES AND METHODS

(75) Inventors: Kevin M. McCafferty, San Marcos, CA (US); Richard L. Moore, Escondido, CA (US); Iain Huntley-Playle, La Jolla, CA (US); Sheng Li, San Diego, CA (US); Richard A. Smith, Fayetteville, AR (US); Rudolph J. Timmerman, Prairie Grove, AR (US); C. David Covington, Fayetteville, AR (US)

(73) Assignee: Avocent Huntsville Corporation, Huntsville, AL (US)

( * ) Notice: Subject to any disclaimer, the term of this patent is extended or adjusted under 35 U.S.C. 154(b) by 715 days.

(21) Appl. No.: 11/065,102

(22) Filed: Feb. 25, 2005

(65) Prior Publication Data
US 2006/0150222 A1    Jul. 6, 2006

Related U.S. Application Data

(60) Provisional application No. 60/641,076, filed on Jan. 4, 2005.

(51) Int. Cl.
*H04N 7/18* (2006.01)
(52) U.S. Cl. .............................. 725/81; 725/80; 725/153
(58) Field of Classification Search .................... 725/74, 725/80, 81, 83, 85, 135–142, 153; 348/14.02, 348/14.04
See application file for complete search history.

(56) References Cited

U.S. PATENT DOCUMENTS

| | | | |
|---|---|---|---|
| 5,521,631 A * | 5/1996 | Budow et al. ................. | 725/78 |
| 6,493,875 B1 | 12/2002 | Eames et al. | |
| 6,553,567 B1 * | 4/2003 | Wugofski et al. ............. | 725/81 |
| 7,302,239 B2 * | 11/2007 | Jitsuhara ..................... | 455/130 |
| 2002/0080753 A1 | 6/2002 | Lee | |

(Continued)

FOREIGN PATENT DOCUMENTS

WO    WO 2006/073414    7/2006

OTHER PUBLICATIONS

International Preliminary Examination Report and Written Opinion from International Application No. PCT/US2005/006797 issued Jul. 10, 2007.

(Continued)

*Primary Examiner*—Christopher Kelley
*Assistant Examiner*—Alazar Tilahun
(74) *Attorney, Agent, or Firm*—Davidson Berquist Jackson & Gowdey LLP

(57) ABSTRACT

A system includes one or more transmitter devices constructed and adapted to transmit wireless streaming media, the transmitter device connected to at least one video source, wherein the transmitter device is further constructed and adapted to automatically detect a type of active source signal from the at least one video source and automatically to convert that signal, if necessary, to an appropriate output signal; and one or more receiver devices constructed and adapted to receive wireless signals, the receiver connected to at least one video output device, wherein the at least one receiver device is further constructed and adapted to produce, automatically, a appropriate signal for the at least one video output device connected thereto.

7 Claims, 49 Drawing Sheets

U.S. PATENT DOCUMENTS

2003/0131360 A1* 7/2003 Joung et al. ............ 725/118
2004/0255326 A1  12/2004 Hicks et al.
2005/0172322 A1*  8/2005 Howard .................. 725/81
2006/0212911 A1*  9/2006 MacMullan et al. ...... 725/81
2006/0271965 A1* 11/2006 Tokimoto et al. ........ 725/62

OTHER PUBLICATIONS

International Search Report from International Application No. PCT/US2005/006797 mailed Feb. 21, 2007.
Supplementary European Search Report mailed Nov. 30, 2007 in European Appln. No. 05724362.8.

* cited by examiner

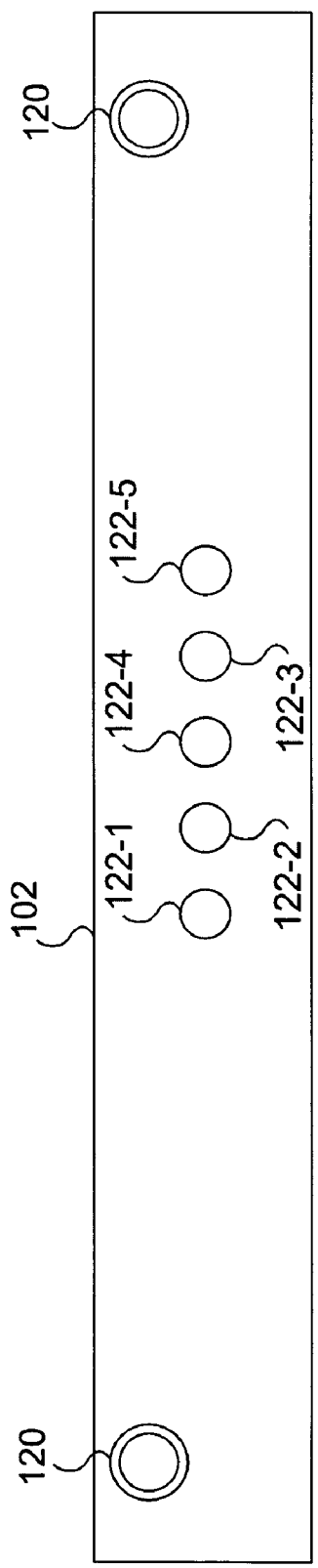
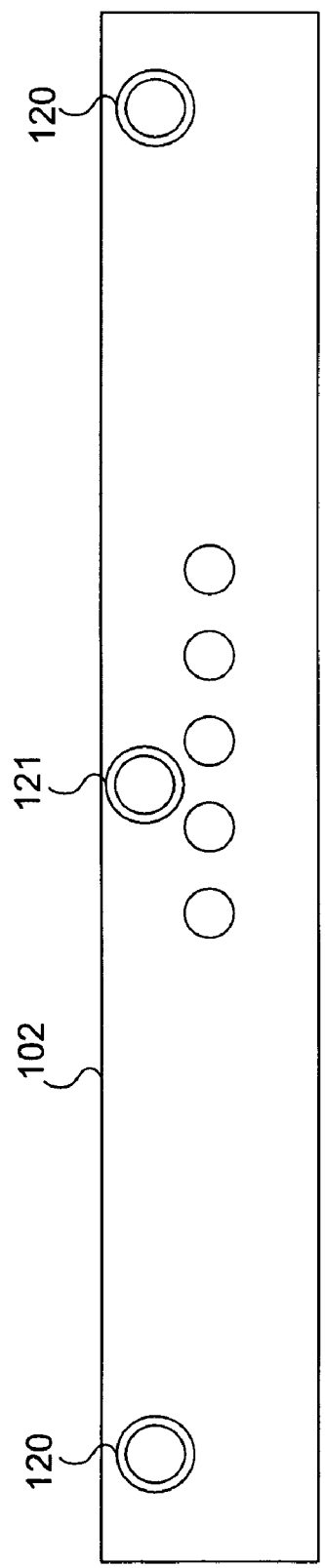

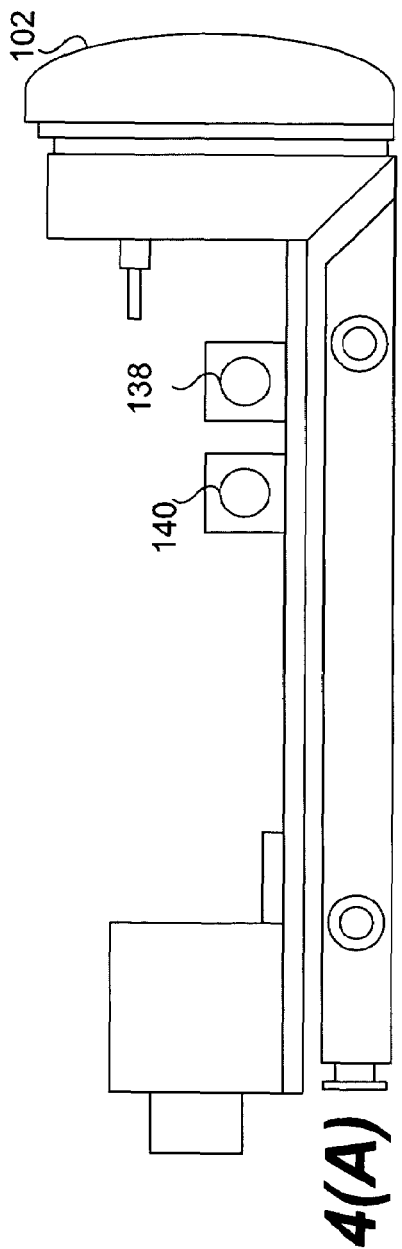
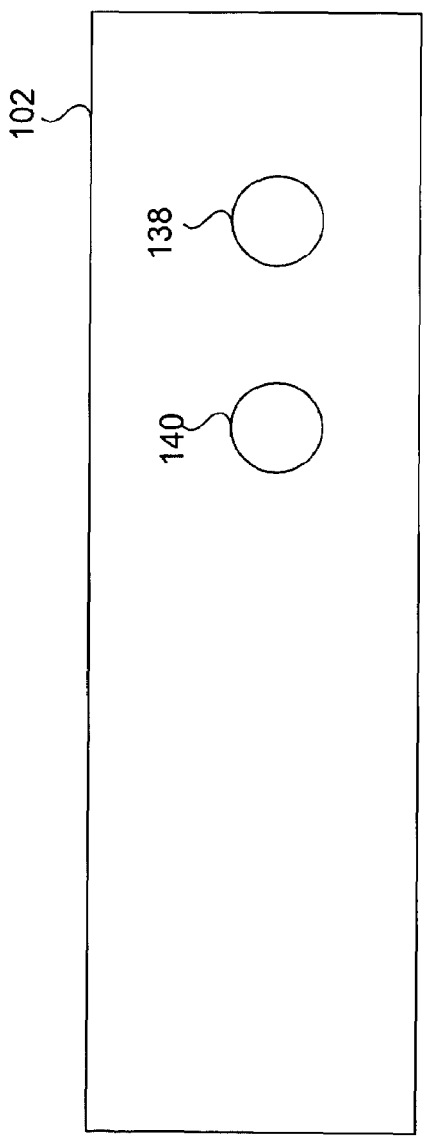

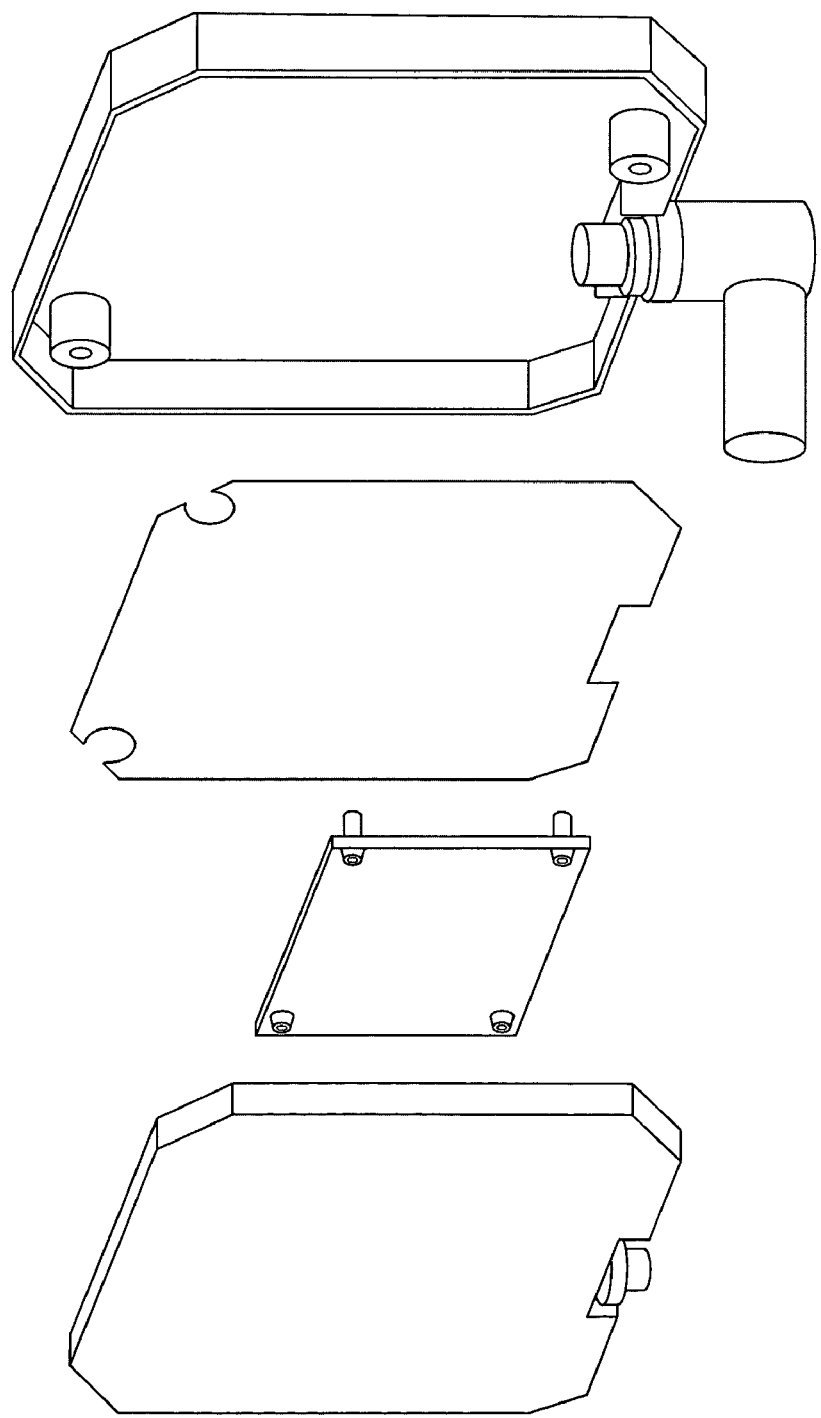

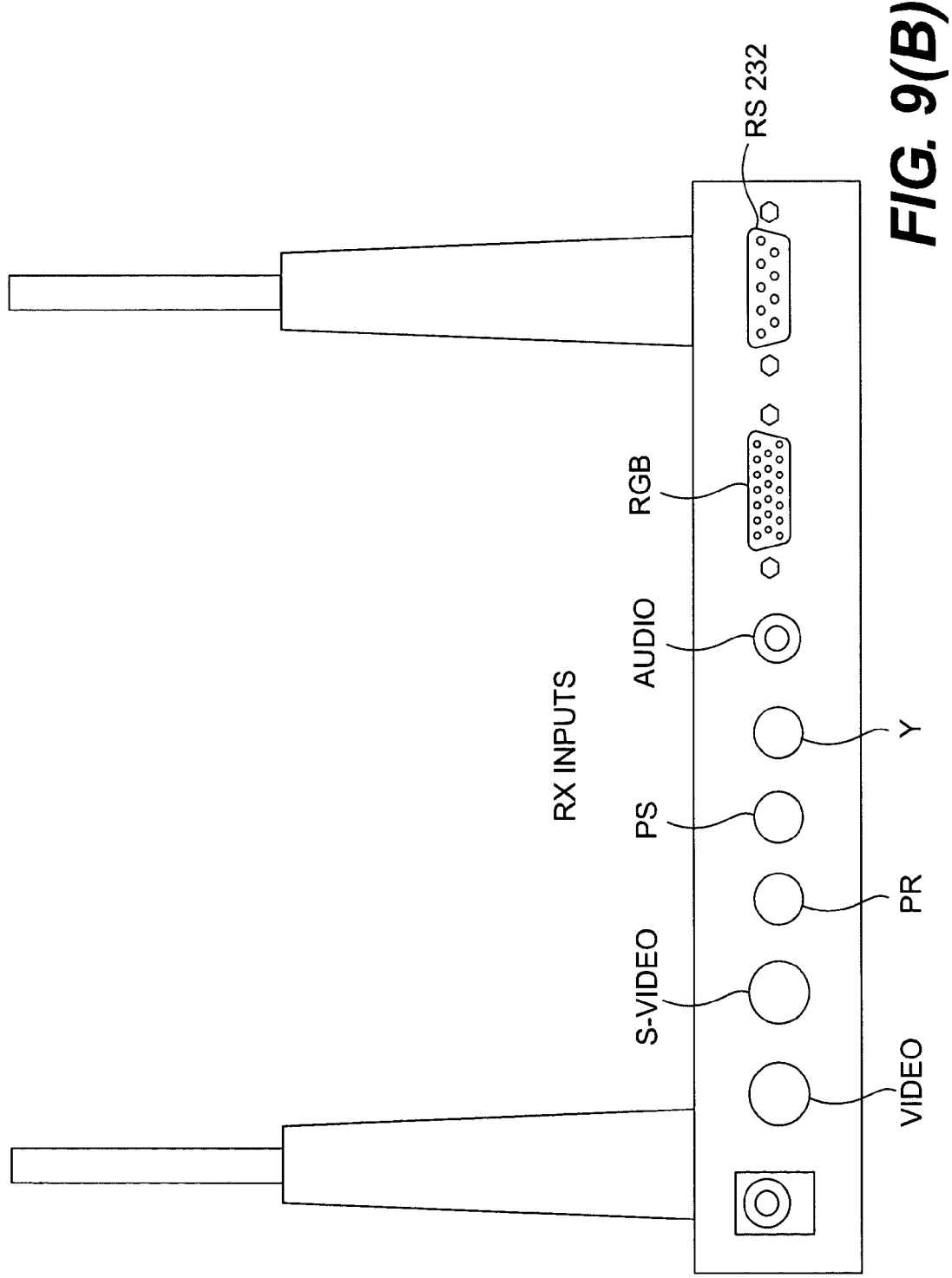

WIRELESS STREAMING MEDIA SYSTEMS, DEVICES AND METHODS

This application claims priority to U.S. Patent Application No. 60/641,076, filed Jan. 4, 2005, which is incorporated by reference herein.

FIELD OF THE INVENTION

This invention relates to wireless streaming media.

OVERVIEW

This invention provides, in some aspects, a wireless streaming media solution that broadcasts high-quality, full-motion, streaming video from one or more sources (e.g., computer, DVD player, VCR, cable TV box and the like) to one or more display devices. Some embodiments of the present invention may broadcast up to 1000 feet. In some aspects, the present invention makes digital signage installations simple and more cost effective by eliminating the need for miles of cabling and expensive computers (e.g., PCs) at each display.

BRIEF DESCRIPTION OF THE DRAWINGS

Exemplary embodiments of the invention are illustrated in the accompanying drawings in which like references indicate similar or corresponding elements and in which:

FIGS. 2(A)-4(B) show embodiments of the transmitter/receivers according to embodiments of the present invention;

FIGS. 8(A)-8(F) show various views of a long-range antenna for use with embodiments of the present invention;

FIGS. 9(A)-9(B) depict a transmitter/receiver according to embodiments of the present invention;

DESCRIPTION OF THE PRESENTLY PREFERRED EXEMPLARY EMBODIMENTS

Figure 1:
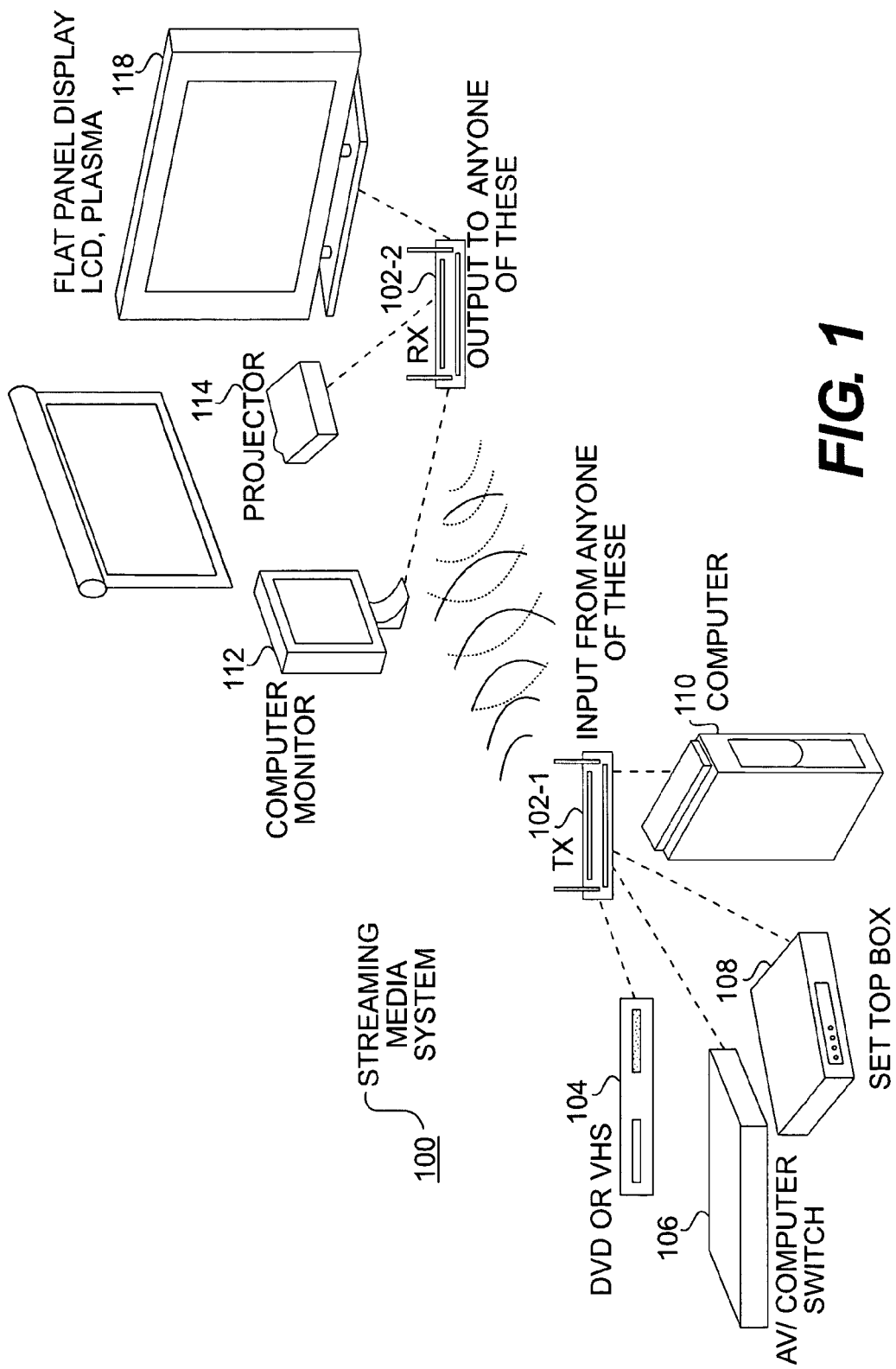
FIG. 1 shows a wireless streaming media system according to embodiments of the present invention.

FIG. 1 shows a wireless streaming media system 100 according to embodiments of the present invention. As shown in FIG. 1, a wireless streaming media system 100 includes one or more transmitter/receivers 102-1, 102-2 which may communicate wirelessly with each other. One of the transmitter/receivers (102-1 in the drawing) is connected to a number of potential sources of video output (DVD or VHS 104, AV/Computer Switch 106, set-top box 108, computer 110), while another of the transmitter/receivers (102-2 in the drawing) is connected one or more video rendering devices (computer monitor 112, projector 114, flat panel display (LCD, Plasma) 116).

For the sake of discussion herein, a transmitter/receiver obtaining source video inputs (e.g., transmitter/receiver TX 102-1 in FIG. 1) is called a source-side transmitter, while a transmitter/receiver receiving a transmission from a source transmitter and rendering output (e.g., transmitter/receiver RX 102-2) is referred to as a remote-end or remote-side receiver.

One skilled in the art will realize that the source video inputs to the source-side transmitter are not limited to those shown in the drawing, and that a source input may be in any known or future form. Similarly, one skilled in the art will realize that the output of a remote-side receiver is not limited to those devices shown in the drawing, and that the output may be in any form and to any type of rendering device. In general, on the source side, a transmitter connects directly to the repository files located on a source device such as, e.g., a computer, DVD player, VCR, cable TV box or the like. The source of the input may be a previously created and stored file or it may be live feed and/or broadcast. At the remote end, the receiver generally connects directly to the output devices (which could be, e.g., a VCR, TV, plasma screen, projector, monitor or the like).

Figure 2A:
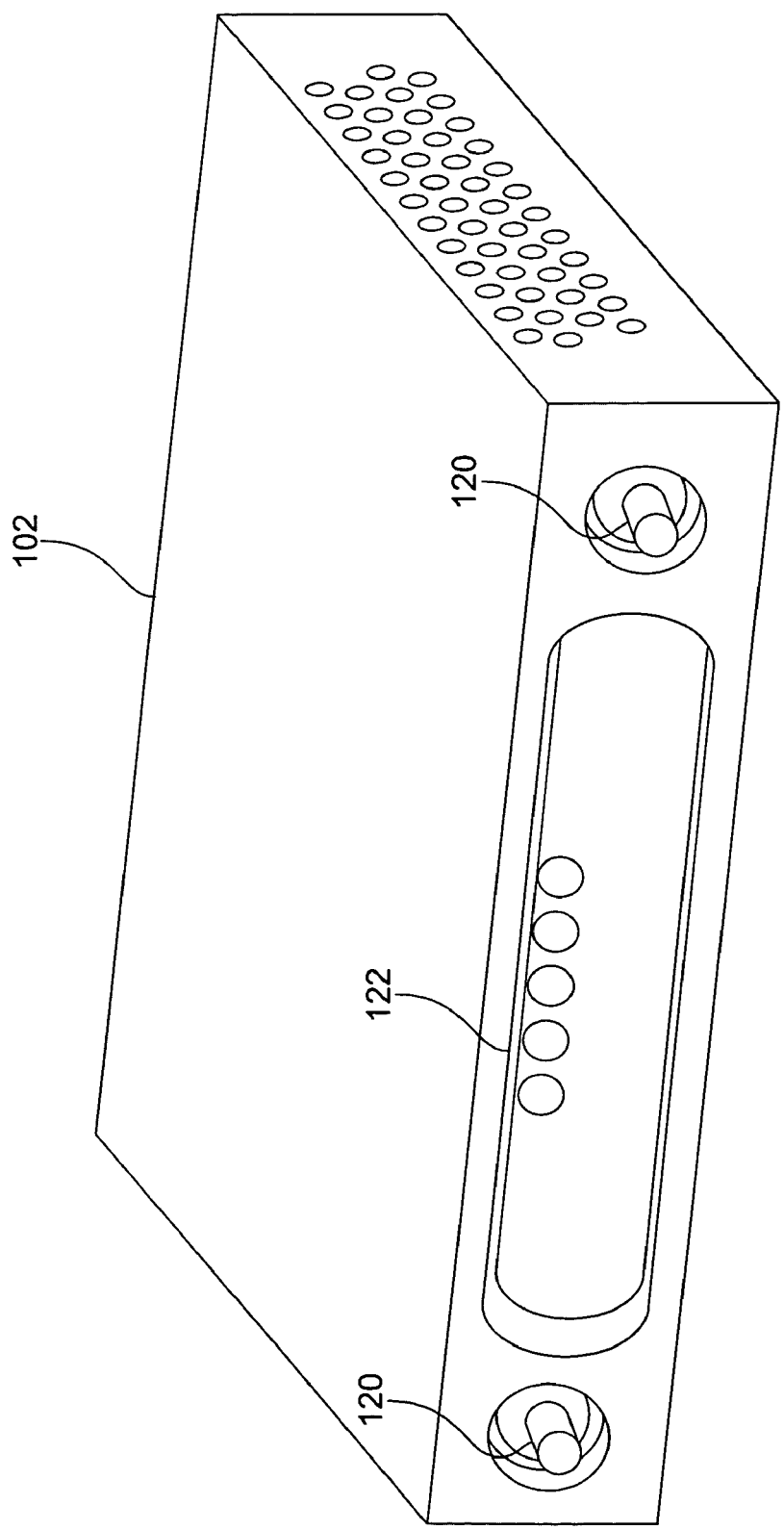
Figure 3A:
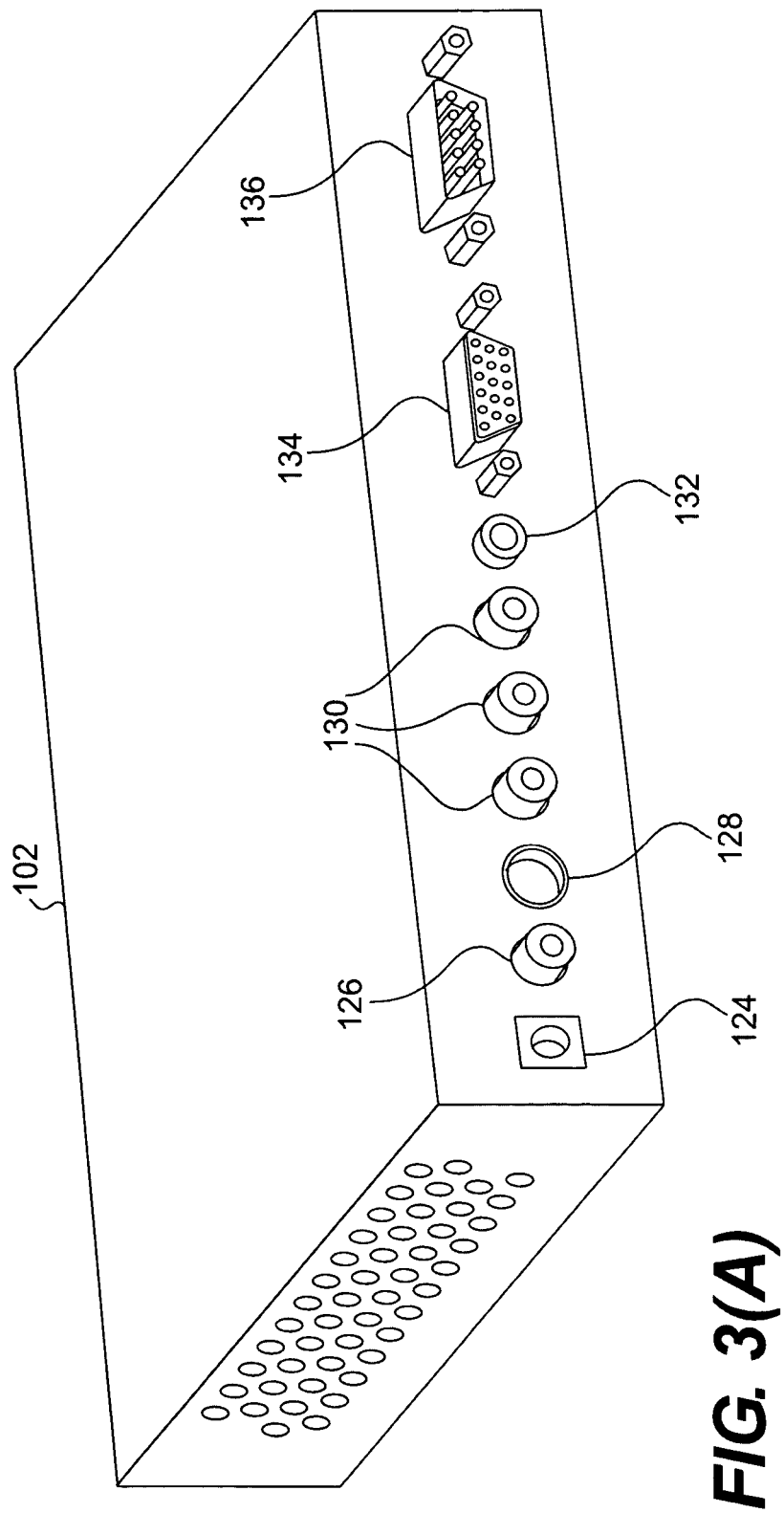
Figure 3B:
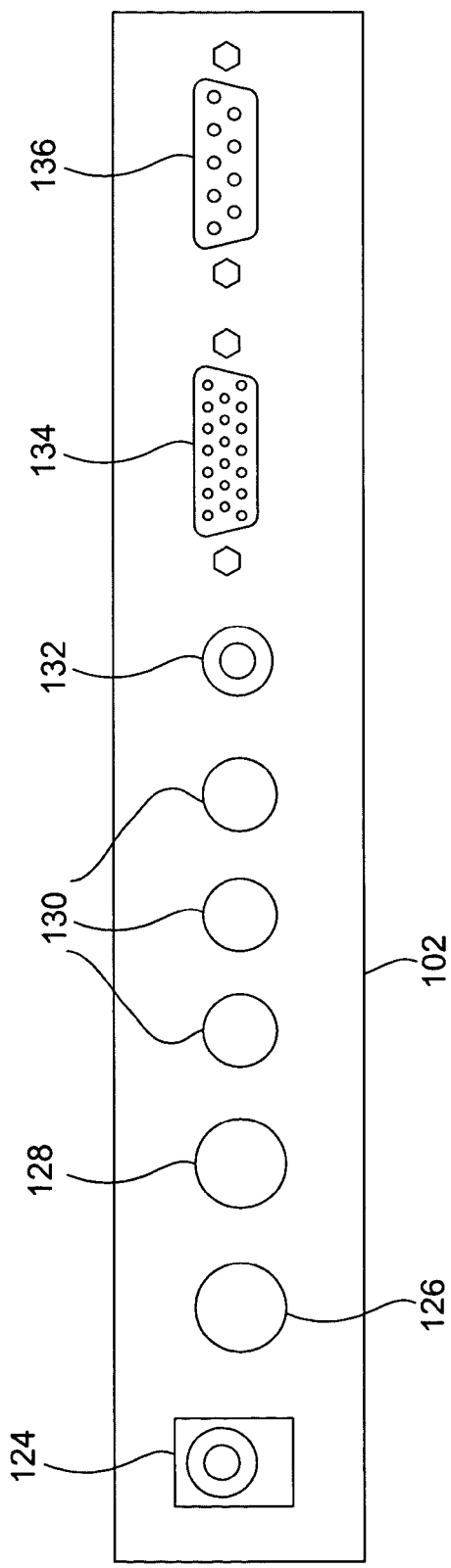

FIGS. 2(A)-3(B) show embodiments of the transmitter/receivers according to embodiments of the present invention, with FIGS. 2(A)-2(B) providing a front view and FIGS. 3(A)-3(B) providing a rear view thereof. With reference to FIGS. 2(A)-2(C), the front of the transmitter/receiver 102 includes antenna connections 120 and a number of light-emitting diodes (LEDs) 122. In the embodiment shown in FIGS. 2(A)-2(B), there are two antenna connections 120, one on either side of the transmitter/receiver, and there are five LEDs, preferably one red, two yellow, and two green. The LEDs 122 are used to provide status information to users. In presently preferred embodiments, LED 122-1 is a power indicator and the other LEDs (122-2, ..., 122-5) are used to indicate signal strength of the wireless signal. In the embodiment shown in FIG. 2(C), there are three antenna connections, two connections 120 being the same as those in the embodiment of FIGS. 2(A)-2(B), and the third connection 121 in the middle.

As shown in FIG. 3(A)-3(B), the rear of transmitter/receiver 102 includes a number of input ports, including power supply input 124, various TV video input ports (including S-Video port 126, standard video port 128, component video ports 130), stereo audio (PC) port 132, PC video port 134 and serial port 136.

In presently preferred exemplary embodiments, the power is 12 volt direct current at 250 mA. Preferably the unit has no fan, which allows for an efficient, quiet and reliable device.

The signal input to the S-Video port 126, standard video port 128, and component video ports 130 may be, e.g., HDTV (High-definition TV), EDTV (Enhanced Definition Television), SDTV (Standard Definition TV), 1080i, 720P, 480P, 480I, 240P. The input signal to the PC Video port is typically computer video (RGB—red, green, blue) (supporting all standard scales (XGA [eXtended Graphics Array]-CGA [color graphics adapter]). The transmitter/receivers 102 is constructed and adapted to automatically sense the format and signal being provided and further, to automatically switch between signals to match the input being used. Thus, there is no need for a user to switch inputs, the system knows which input is being used and adjusts accordingly (if needed). That is, in embodiments of the present invention, the system automatically senses all standard formats of computer video input as well as all forms of video input on the other video input ports. In some presently preferred embodiments, the TV video signal is an NTSC signal and the device auto-senses whether it is HDTV, EDTV, SDTV, 1080i, 720P, 480P, 480I and 240P.

One present embodiment supports the following file types: MPEG 2 (D1=480 Line), JPEG (UXGA=1366×768), and Audio (MP3); Stereo Audio (CD quality), 512 Mbytes memory, 1 serial port; with two modes of operation, namely copy files from server and stored locally, and streaming files over network.

The invention is not limited by these formats and/or modes, and other formats and types of signal are within the scope of the invention.

The serial port 136 supports two-way communication between the transmitter/receiver 102 and other devices. The serial port 136 also supports management of multiple displays with a single transmitter, upgrading of the firmware in the device and other system control functions (via an attached computer or the like).

FIGS. 4(A)-4(B) are side views of a transmitter/receivers 102 according to embodiments of the present invention. As shown in FIGS. 4(A)-4(B), the transmitter/receivers 102 preferably includes setup buttons 138, 140, on one side thereof. These buttons may be used, e.g., to train the devices and/or to establish secure connections (using, e.g., AES [Advanced Encryption Standard]), with other devices in the system. Using these setup buttons, no keyboard or OSD (On Screen Display) is needed to setup a secure connection between transmitters and receivers in the system according to the invention. The dimensions shown in FIG. 4(A) are only exemplary of a particular implementation, and should not be considered to limit the scope of the invention in any manner.

Figure 5A:
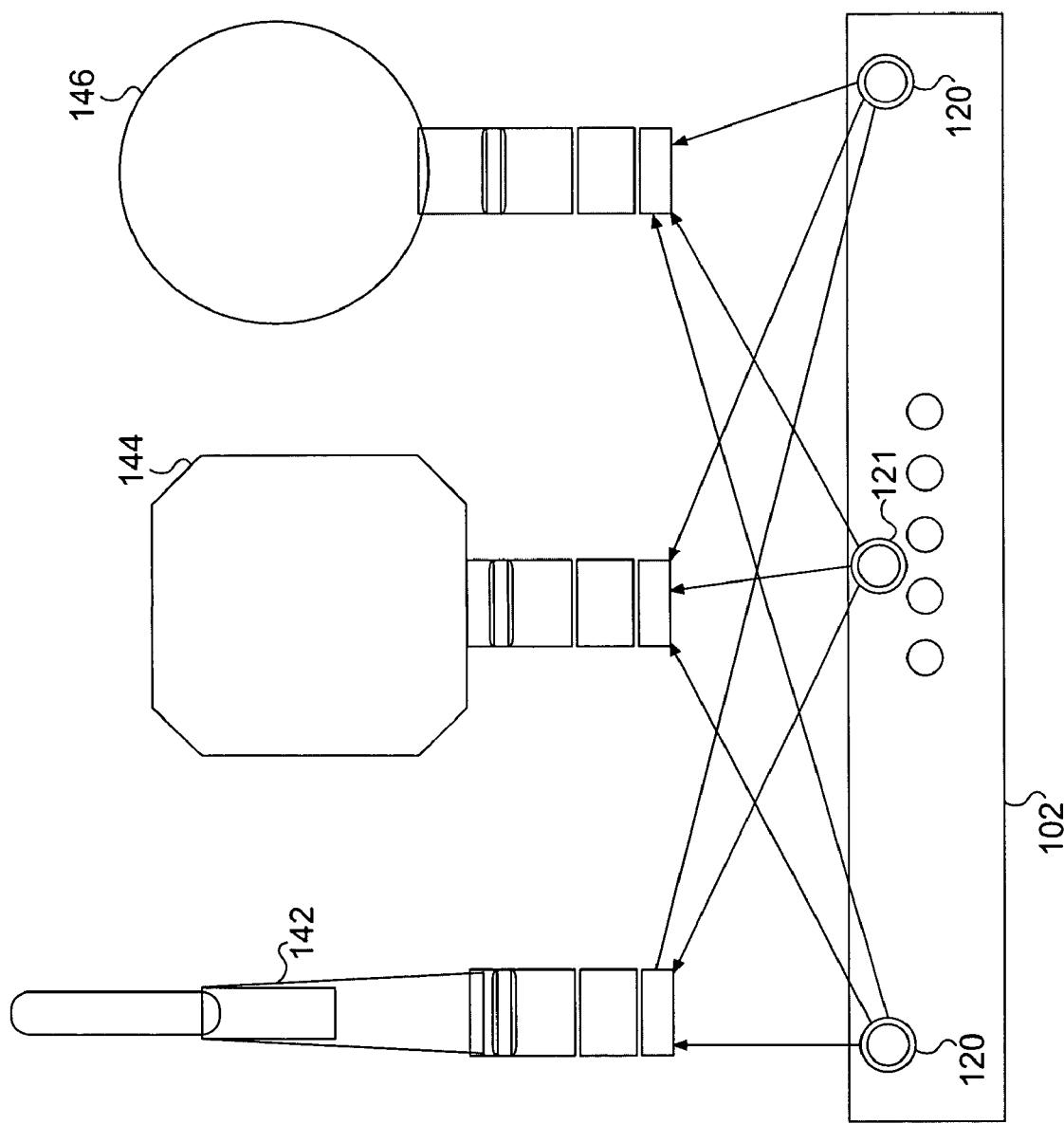
FIGS. 5(A)-5(C) show transmitter/receivers according to embodiments of the present invention with antennas.

FIG. 5(A) shows the various antennas that may be used in embodiments of the present invention. Standard, 2 db gain omni-directional antenna 142 may be connected to antenna connectors 120 or 121; alternatively, a longer range directional antenna 146 with 9 db gain may be connected thereto. In general, the system is preferably capable of supporting other types of antennas, including Multiple Input Multiple Output (MIMO) antenna 148. One skilled in the art will realize that the choice of antenna is affected by a number of factors including the distance over which the signal is to be broadcast, the amount of expected interference and the reliability requirements of the system.

Figure 5B:
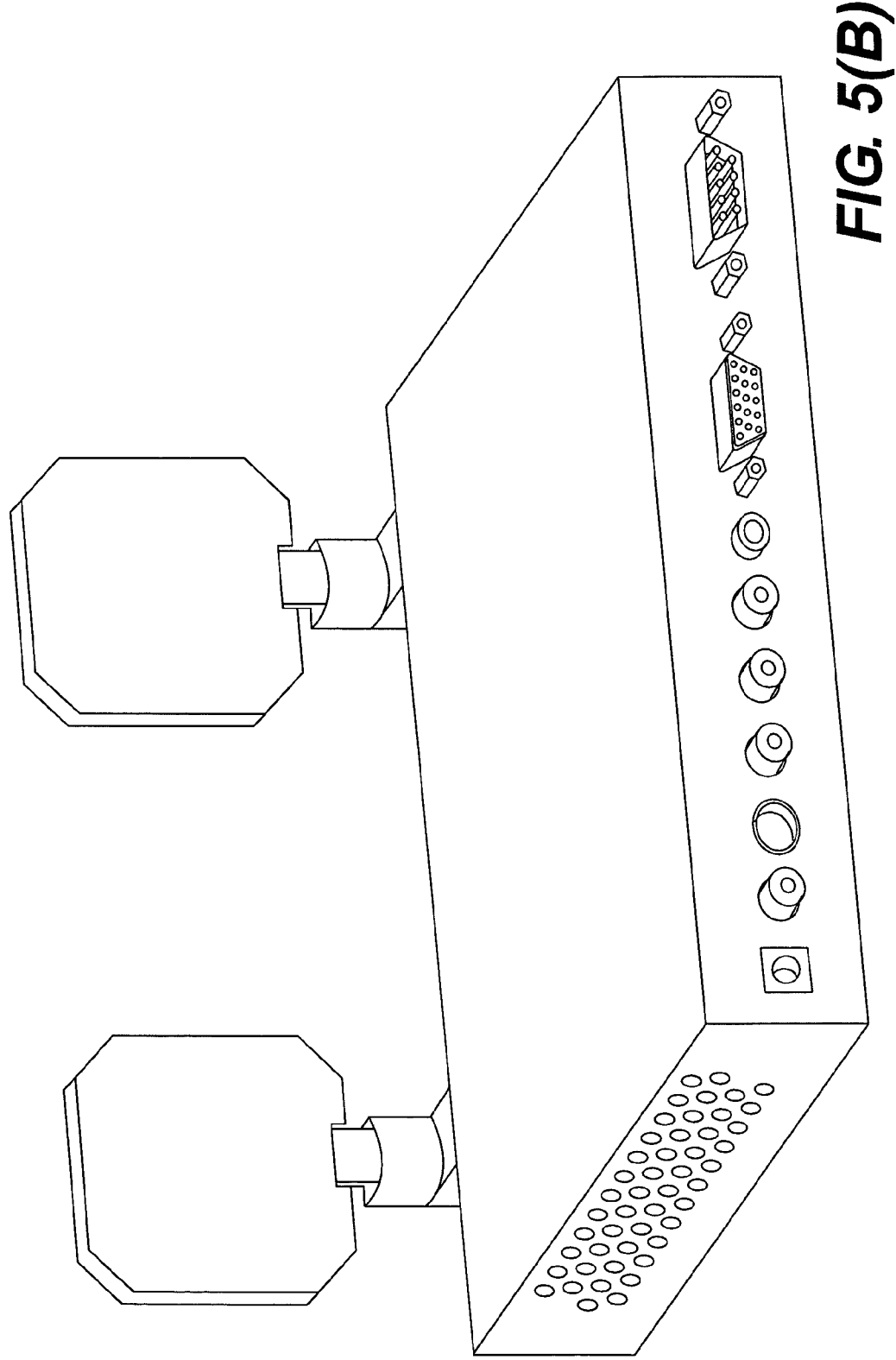
Figure 5C:
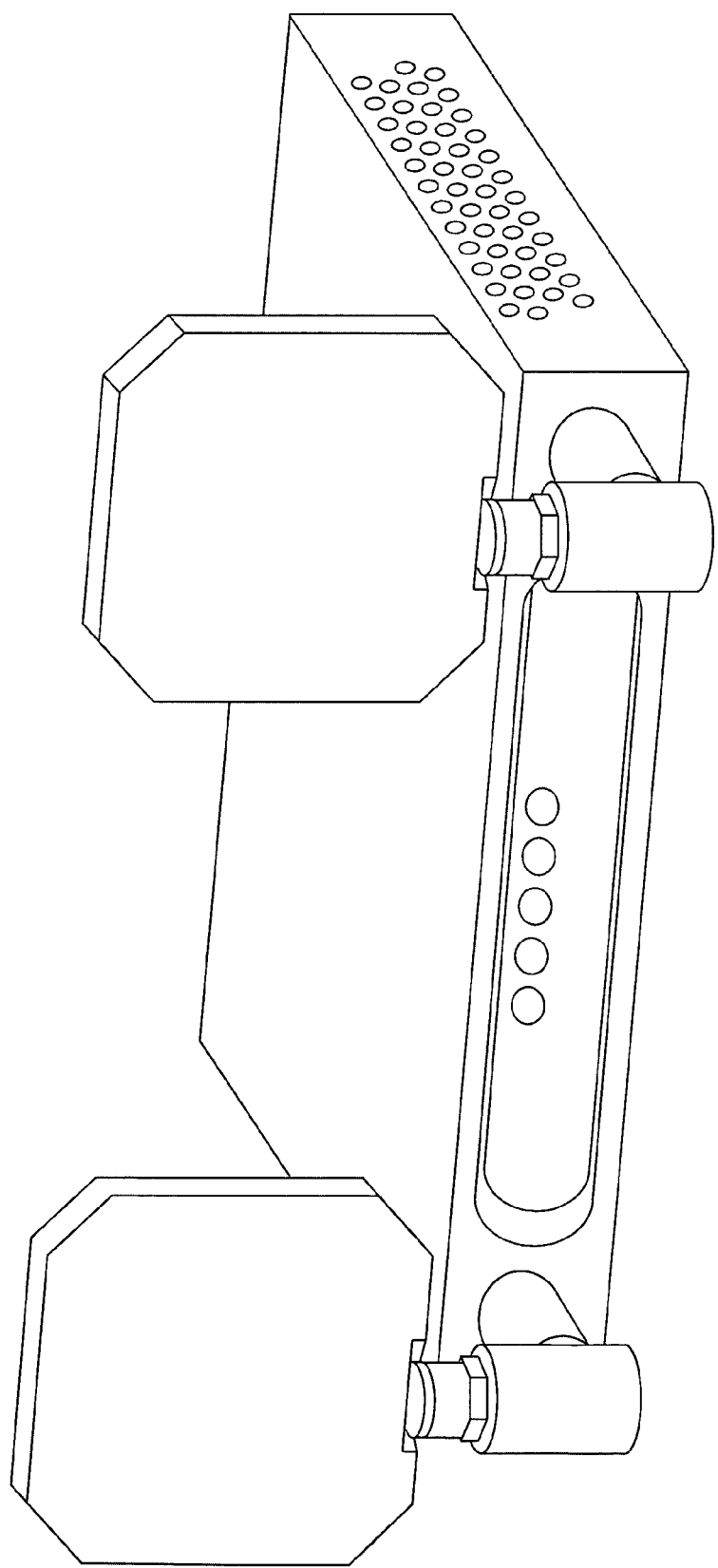

FIGS. 5(B)-5(C) are rear and front views, respectively, of a transmitter/receiver 102 according to embodiments of the present invention with long range (9 db gain) directional antennas mounted thereon. The antennas are preferably mounted on the side opposite of the inputs which allows the connectors to be hidden and further allows for uncluttered and potentially optimal positioning of the antennas.

A transmitter/receiver 102 according to some presently preferred embodiments of the invention has the following specifications. (One skilled in the art will, of course, realize that these specifications of a presently preferred should not limit the scope of the invention in any way.)

General: Power Supply: External, 9 volt @ 1 amp AC to DC universal; Rated Power: 5 watts (transmitter), 4 watts (receiver); Weight: ~2 lbs; Size: 6.5" L, 4" W, 1.25 H, metal enclosure with 75 mm VESA (Video Electronics Standards Association) mounts; Frequency: 5.2-5.8 GHz.

Transmitter Inputs: Computer video Signals: Mini D-Sub 15 pin (socket connector) Compatibility CGA (240×320), VGA (480×640), SVGA*(600×800), XGA*(1024×768), WVGA*(852×480), WXGA*(1330×768) (maximum) 70 Hz Vertical Refresh.

TV Video Signals: Component RCA S-Video Std TV RCS 480I, 480P, 720P* @ 30 FPS (Frames per second)

Audio: Stereo mini jack

Control: RS-232C D-sub 9 pin (Inputs marked with a star "*" are scaled for MPEG D1 wireless transport to 480P.)

Receiver Outputs

Computer Video Signals: Mini D-Sub 15 pin (socket connector) Compatibility CGA (240×320), VGA (480×640), SVGA*(600×800), XGA*(1024×768), WVGA*(852×480), WXGA*(1330×768) (maximum) 70 hz Vertical Refresh.

TV Video Signals: Component RCA S-Video Std TV RCS 480I, 480P, 720P* @ 30 FPS (Outputs marked with a star "*" are scaled for MPEG D1 wireless transport to 480P.)

Audio: Stereo mini jack

Control: RS-232C D-sub 9 pin

PERFORMANCE Distance: 300 feet through 3 walls Up to 1000 ft line of sight

Compression: MEPG2 480D compression

Communication Modes: Point-to-point multicasting to 8 receivers

Security: Advanced Encryption Services (AES)

Antennas: two-2 dbi omni directional or 8 dbi directional antennas

The transmitter/receivers 102 may also include power supply audio cable mounting hardware and long-range antennas.

Figure 6:
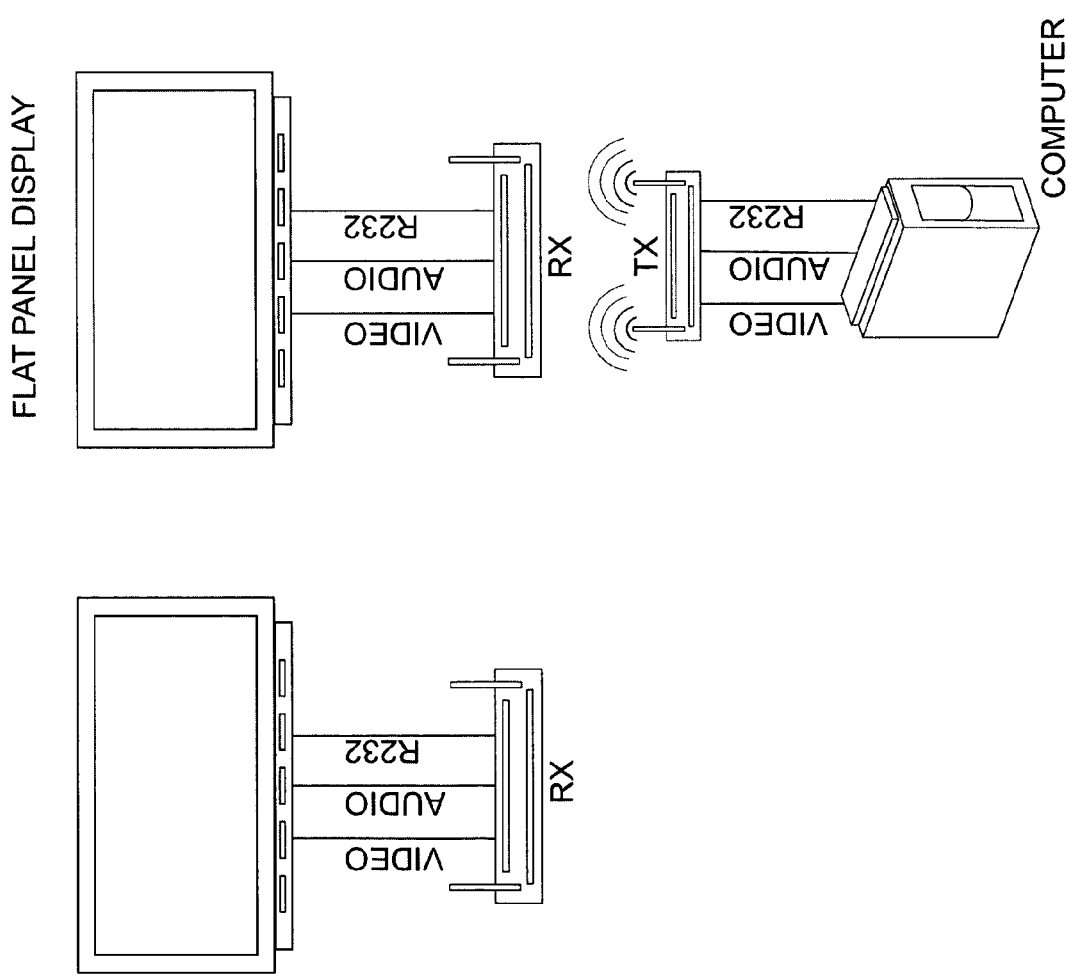
FIGS. 6 and 7 show system configurations according to embodiments of the present invention.

FIG. 1 shows a wireless streaming media system 100 according to embodiments of the present invention. More particularly, one skilled in the art will realize that the configuration depicted in FIG. 1 is a point-to-point configuration. By way of example, another exemplary configurations is shown in FIG. 6 which depicts a point-to-multipoint system configuration according to embodiments of the present invention. In the setup shown in FIG. 6, the output of a single computer is wirelessly broadcast to and displayed on a number of flat-panel displays. One skilled in the art will realize that the invention is not limited by or to the configurations shown and that any number of possible system configurations are possible using the present invention and are contemplated by the inventors.

Figure 7:
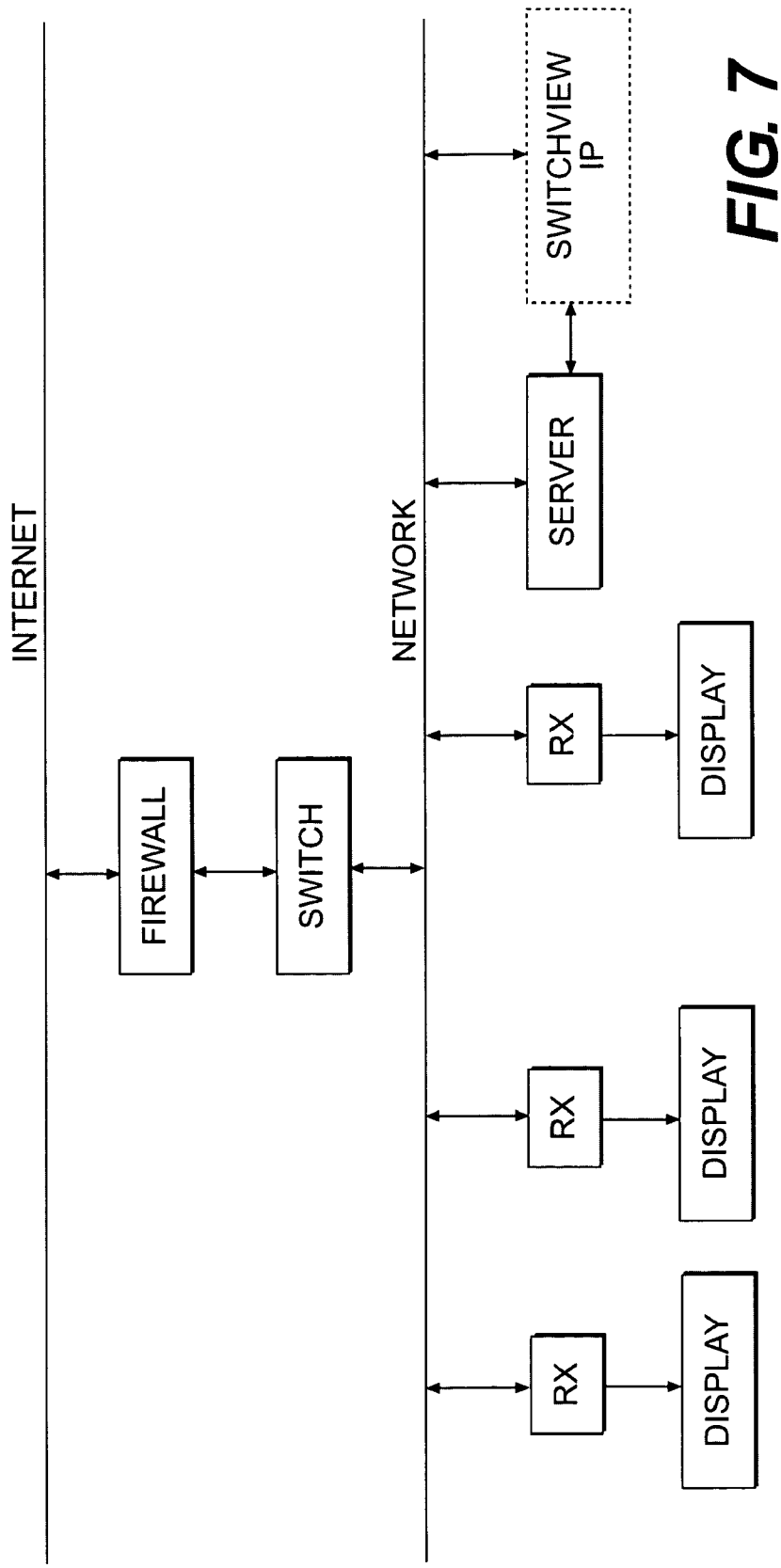
Figure 8A:
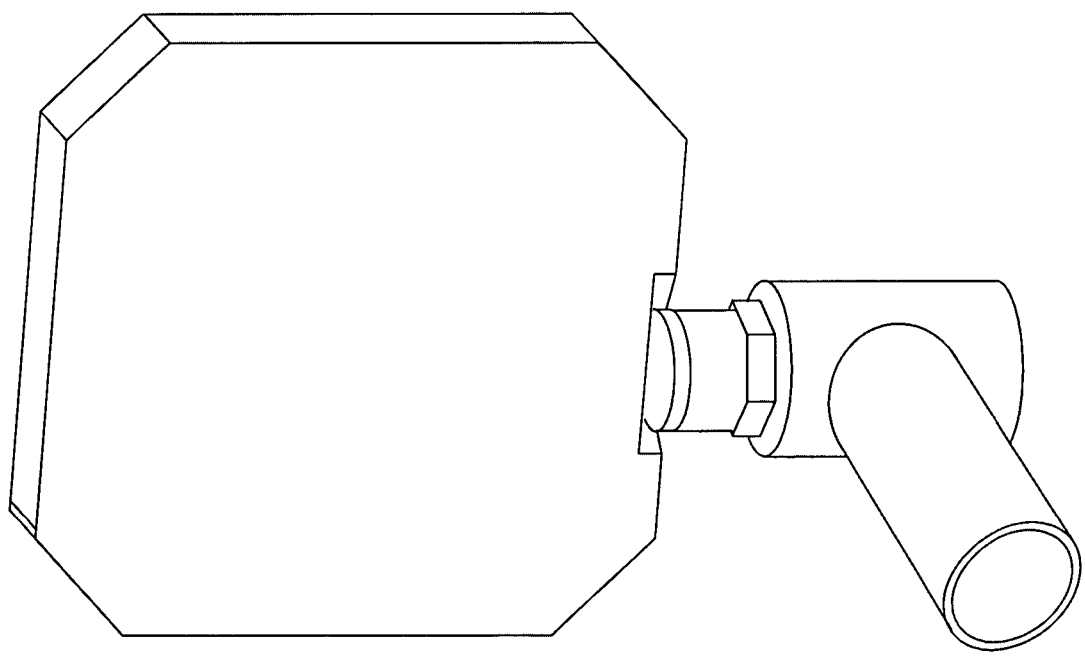
Figure 8C:
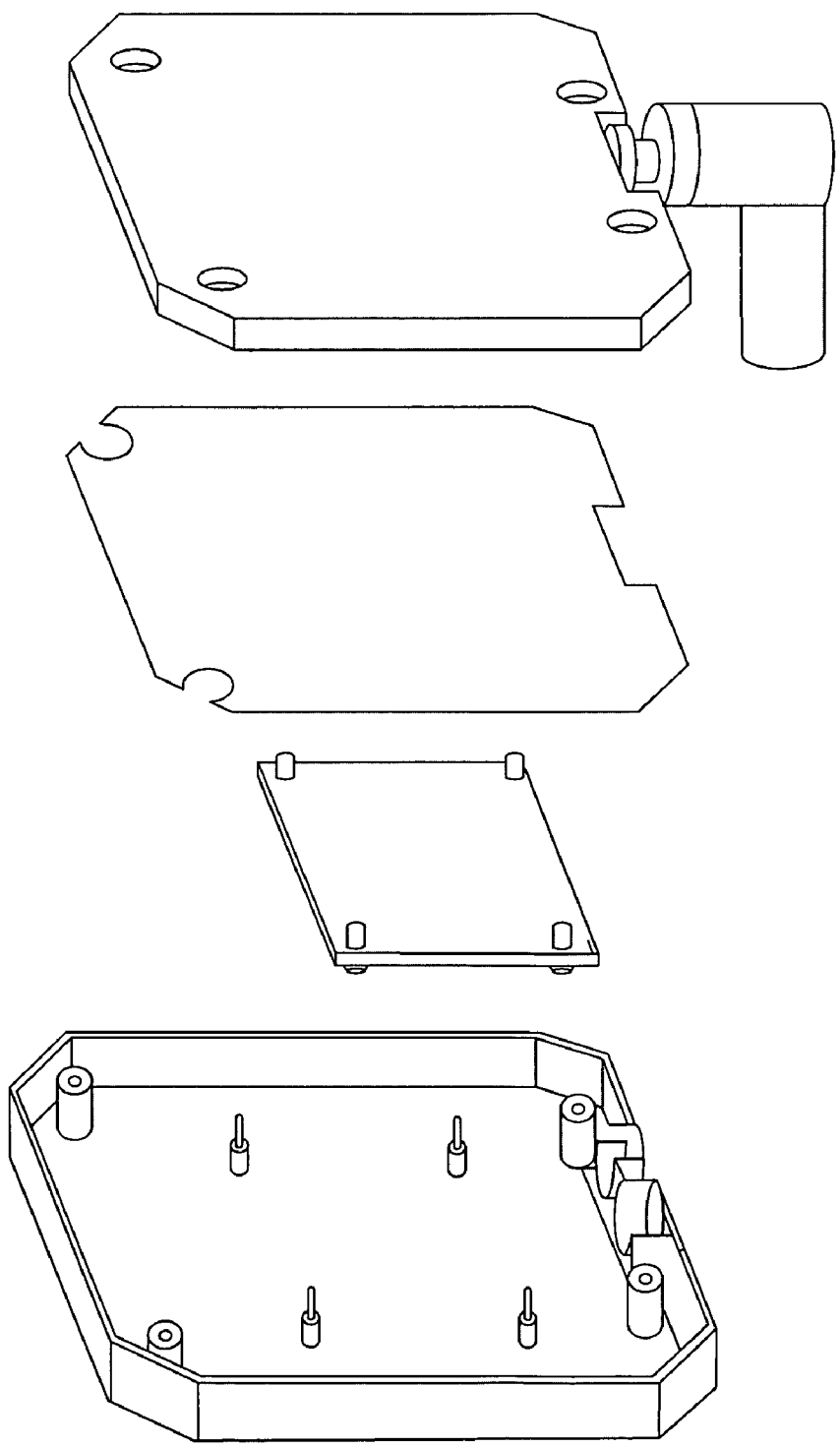
Figure 8D:
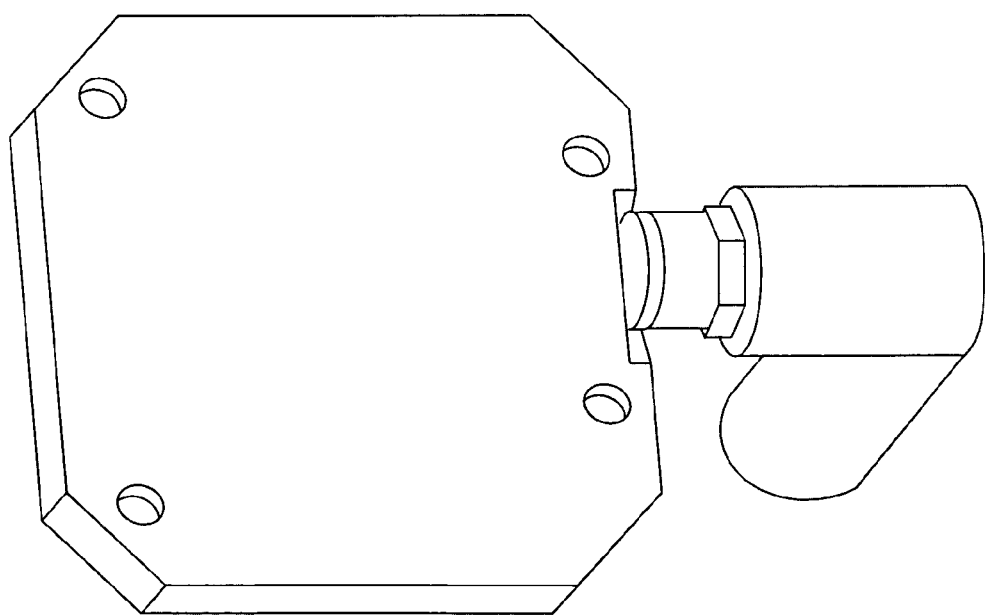
Figure 8E:
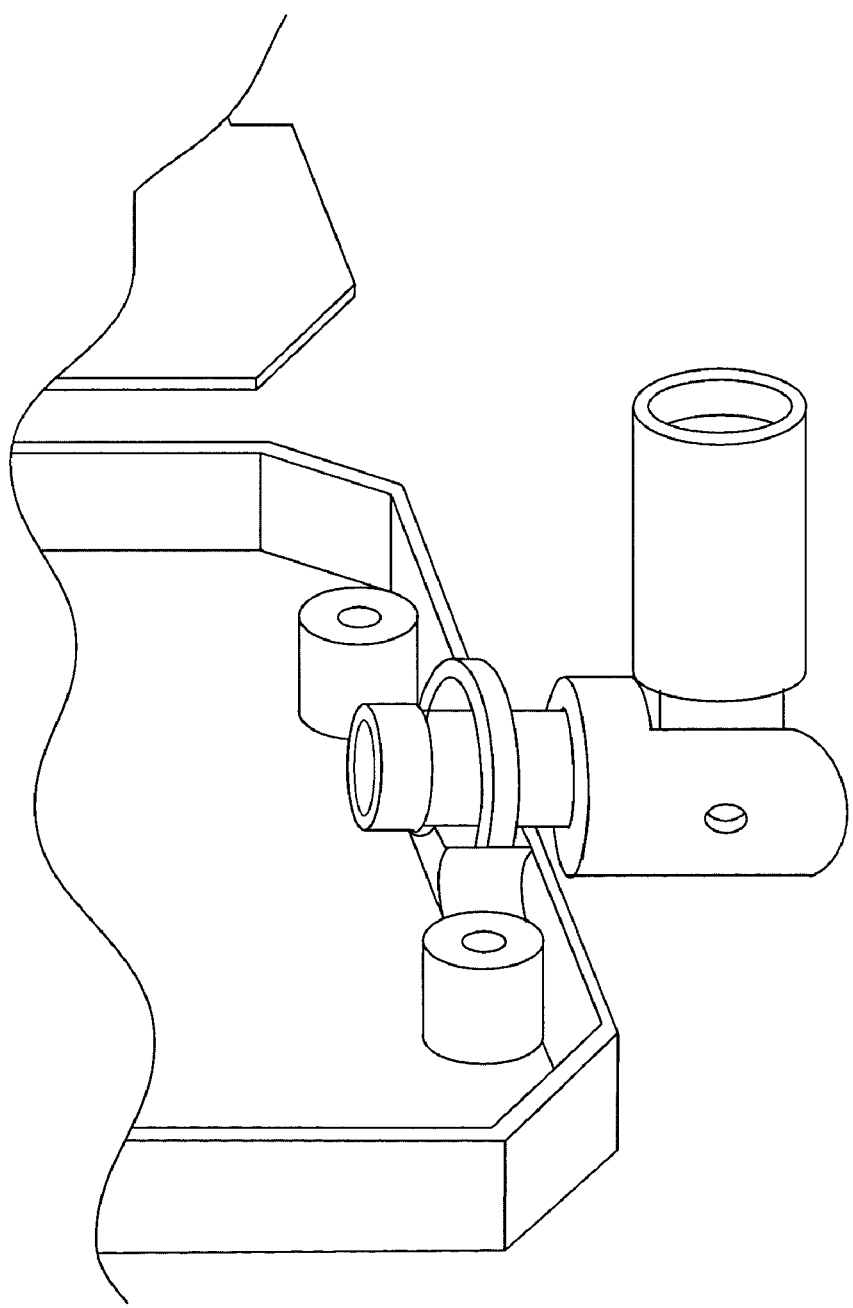
Figure 8F:
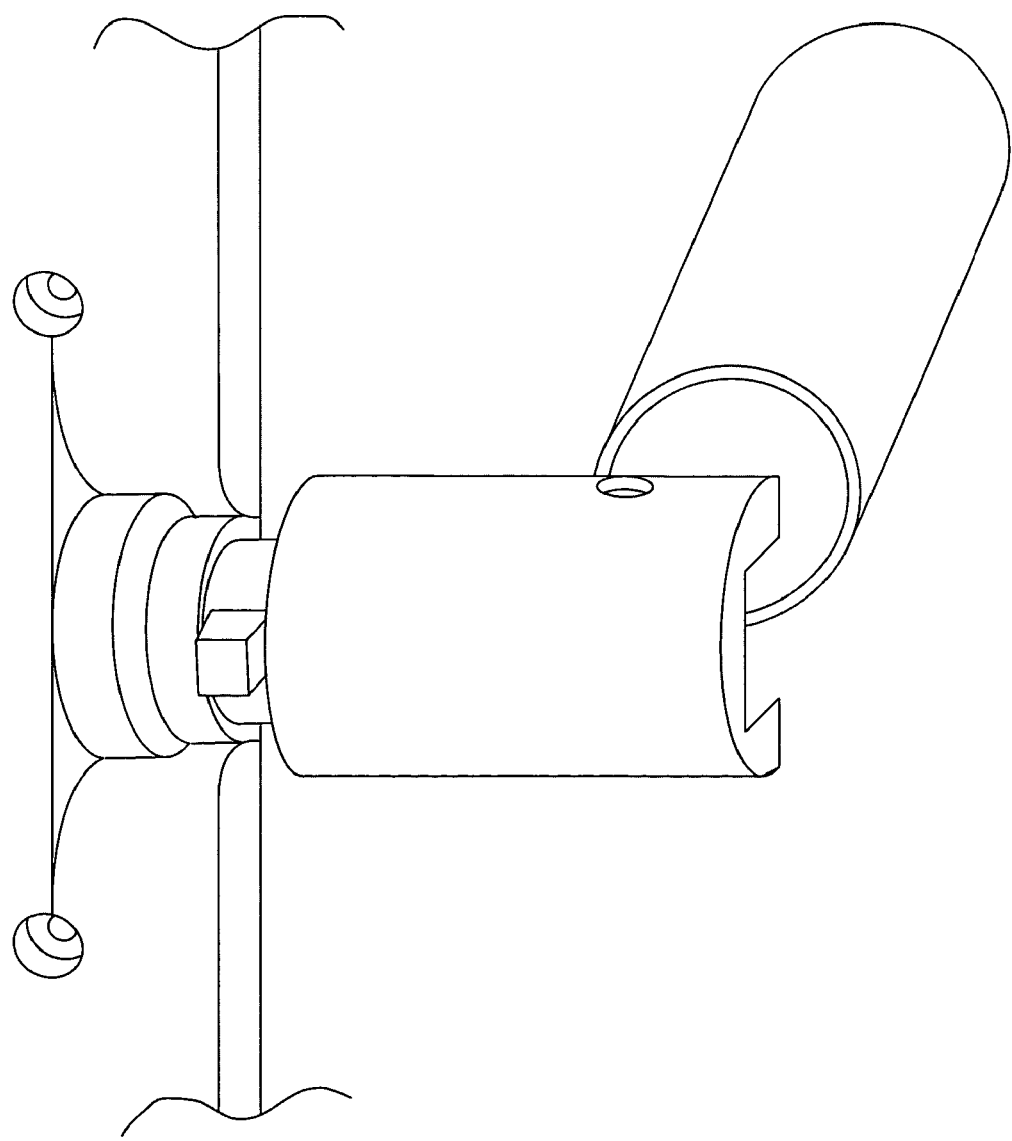

FIG. 7 depicts a typical configuration for use, e.g., in a grocery store or the like. (The component labeled Switch-View™ IP is KVM (Keyboard, Video, Mouse) remote access switch such as sold by Avocent Corporation of Huntsville, Ala.).

While the wireless aspects of this invention have many advantages, one skilled in the art would realize that a transmitter/receiver according to embodiments of the present invention may also, i.e., in addition to its wireless capabilities, be connectable to one or more receivers in a wired fashion. Thus, a system configuration may be entirely wireless or it may be a combination of a wireless and a wired system, and such a hybrid system and configuration are contemplated by the inventors as part of the invention.

Video Extension & Broadcasting

The present invention provides a simple hardware solution that requires minimal set up time. The present invention can be used, e.g., for point-to-point video extension or for a point-to-multipoint broadcast application, the only difference between the two modes being the number of receivers connected to the output devices. Multiple input and output devices can be connected to a single transmitter through the video ports. The described embodiment of the invention includes three video ports, although the invention is not limited to this number.

Self-Adjusting WXGA & HDTV Scaling

The present invention is compatible with all standard video input and output. Presently preferred embodiments are compatible up to WXGA (1355×768). The system is compatible with standard computers and TV hardware up to High Definition TV (720P) and requires no special application or operating system software. One skilled in the art will realize that other present and future video input and output standards are within the scope of the invention.

Some embodiments of the present invention include a number of features and benefits including, without limitation:

Wireless Video: Up to 30 frames per second full motion video (MPEG2 D1). Up to WXGA and HDTV compatible.

MPEG generally refers to the Moving Picture Expert Group (MPEG) standards. Examples of the MPEG standards include MPEG-2, MPEG-4, and MPEG-7. The digital data may include multimedia information such as moving picture and stereo audio. For example, the source format may include 240P, 480I, 480P, 720P, and 1080I, and the destination format may include 480I, 480P, 720P, and 1080I, each with 60 FPS, where P denotes progressive and I denotes interlaced.

Multipoint and Point-to-Point Transmission: A single transmitter according to embodiments of the present invention automatically adjusts to the number of receivers detected. That is, if more than one remote is detected (or trained), a transmitter automatically goes into multicast mode.

Plug and Play Quick, simple installation. No software to download or controls required. Presently preferred embodiments transmit signals up to 300 feet through walls and up to 1000 feet line-of-site. Greater distances are contemplated, depending on the wireless protocol used.

Multiple Input/Output Formats. Built-in support for multiple input/output formats including, without limitation, Component, S-Video, standard TV Video, RGB computer video (RGB) and stereo audio.

Auto Input/Output Sensing. The transmitter switches to active input devices automatically while the receiver automatically directs video to connected output devices. In some embodiments, where more than one device is active, a user may be able to select an active device.

Interchangeable Antennas. Omni-directional and long distance directional antennas are available to suit the installation.

Built-in Signal Strength Monitor. Identifies performance-optimized mounting location automatically without special metering equipment. Optimal location of remote units may be established by observing the signal strength indicator and no additional equipment is required.

802.11a Radio Standard Operates outside of the standard WLAN (Wireless Local-Area Network) frequencies for higher QoS, and interference-free connectivity. The 802.11a radio standard is hereby incorporated herein by reference in its entirety.

Communications Protocol of embodiments of the present invention offers security and high bandwidth for challenging installations.

AES Encryption. The system has built-in Advanced Encryption Standard (AES) for secure wireless connectivity. AES is defined in Advanced Encryption Standard (AES), FIPS Pub 197, National Institute of Standards, 26 Nov. 2001, the contents of which are hereby incorporated herein by reference.

Figure 9A:
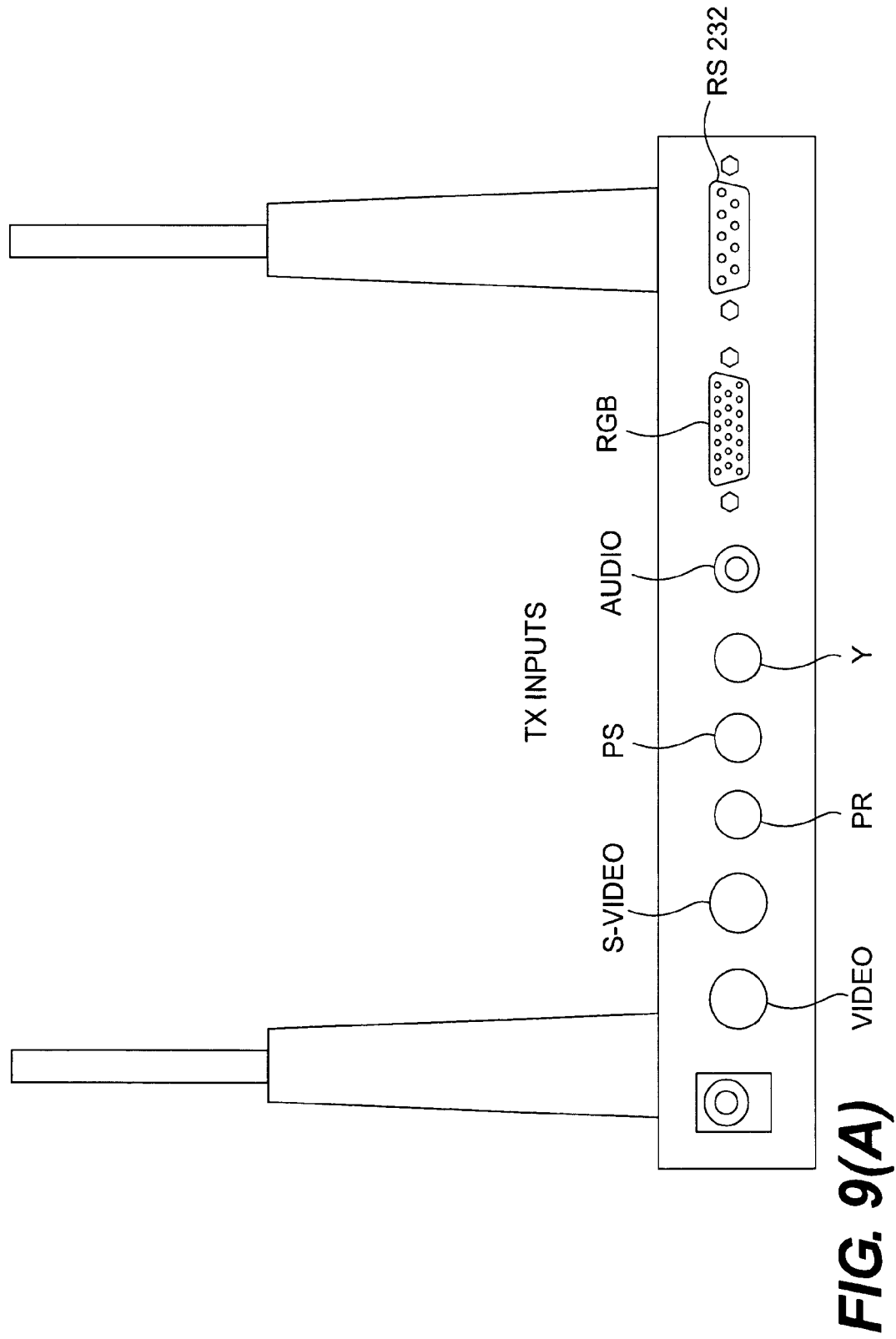

FIGS. 9(A)-9(B) depict a transmitter/receiver according to embodiments of the present invention, with FIG. 9(A) showing the transmitter inputs and FIG. 9(B) showing the receiver outputs. The transmitter/receivers shown in these drawings has omni-directional antennas.

While embodiments have been described as using the 802.11a wireless standard, the invention is not limited to that standard. One skilled in the art will realize that the invention will operate with other existing (and future) wireless standards. Furthermore, a transmitter/receiver according to embodiments of the present invention may be adapted to act as a repeater for other wireless devices, e.g., devices that cannot see a WAP.

Technology Design

The present invention utilizes a smart wireless technology design. The component hardware is capable of self-setup and adjustment to ensure that the most high quality signal strength and video transmission is maintained. As a result, the output, e.g., a digital sign, portrays smooth motion video with a stable, noiseless image.

Automatic Setup

Setup is performed automatically by the present invention simply by plugging in the transmitter and receiver(s). An automatic input/output sensor detects all units in the broadcast system within range of the transmitter. If more than one receiver is detected, the present invention automatically goes into multicast mode. Transmission of content occurs immediately and securely in the 802.11a bandwidth, freed from interference from other WLAN devices. subsequent displays/receivers can be added easily when conditions or requirements change. Display relocation is much quicker without bulky VGA cabling.

Signal Strength Indictor. A signal strength indicator light helps the installer find the best location for remote receiver units (LEDs 122-2, . . . , 122-5).

Multi-Display RS232 Interface. The system enables setup, display controls and monitoring the health of attached display devices from a single transmitter according to embodiments of the present invention. In some embodiments, the system monitors the health of up to eight attached display devices.

The Transmitter and Receiver wireless communication according to embodiments of the present invention is preferably bidirectional to facilitate requests from the receiver in broadcast or set-up modes.

Embodiments of the transmitter are able accept inputs of NTSC and RGB video with resolutions up to XGA. The unit then scales the image (using, e.g., an ST ADE3700X image scaler from STMicroelectronics, headquartered in Geneva, Switzerland) to NTSC (480 lines) resolution and feeds this information into the FGPI port of a PNX1502 (E.g., as made by Philips Semiconductors). The PNX1502 performs image color conversion as necessary to feed the MPEG2 core with its required input. The output of the MPEG2 data will be stored in reasonably sized packets and transmitted over the wireless link as they are completed. Duplicate requests may be made by the receiving device if any packets are missed.

The receiver uses a PNX1502 to receive the MPEG2 packets over the wireless PCI card and then upscales the image to XGA resolution. This image is output in 24 bit RGB format and passed through a D/A that drives a DB 15 RGB output. To ensure that no frames are missed, memory is used (preferably 64 Mbytes) to buffer up a few seconds of video and audio.

Preferred embodiments of the present invention use multicast as the transportation protocol. Multicast is based on UDP transport protocol. It provides real time service and let upper layer to handle on how to ensure packets arrival.

MPEG2 packetization.

MPEG2 categorizes video frames as intra-frame (I-frame), predictive-frame (P-frame) and bidirectional predictive-frame (B-frame). MPEG2 also segments video stream into groups of picture (GOP). GOP starts with I-frame and contains multiple P and/or B frames. GOP has only one I-frame.

Generally speaking, an I-frame is a frame that will not depend on any other frames and all the other frames will depend on an I-frame. A P-frame will depend on an I-frame and all the P-frames in front of it. A B-frame will depend on all I/P frames in the front and the closest I/P frame on the back. No frame will depend on a B frame.

Figure 10A:
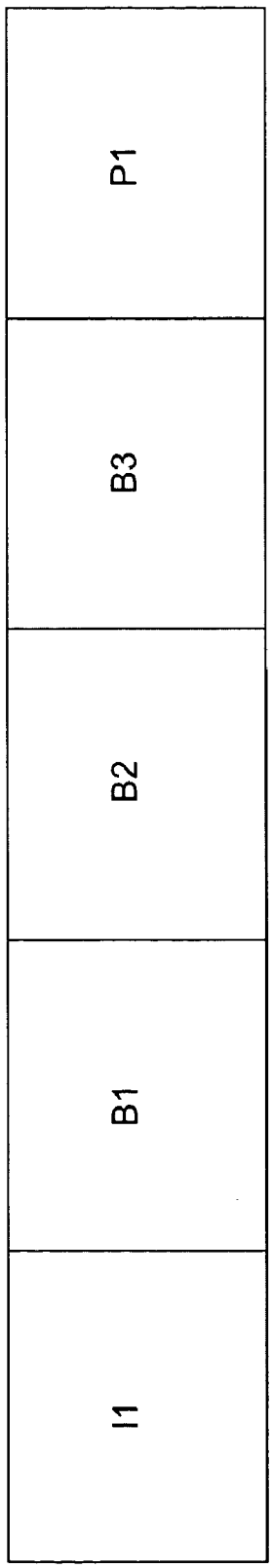
FIGS. 10(A)-10(B) show MPEG frame encoding according to embodiments of the present invention.
Figure 10B:
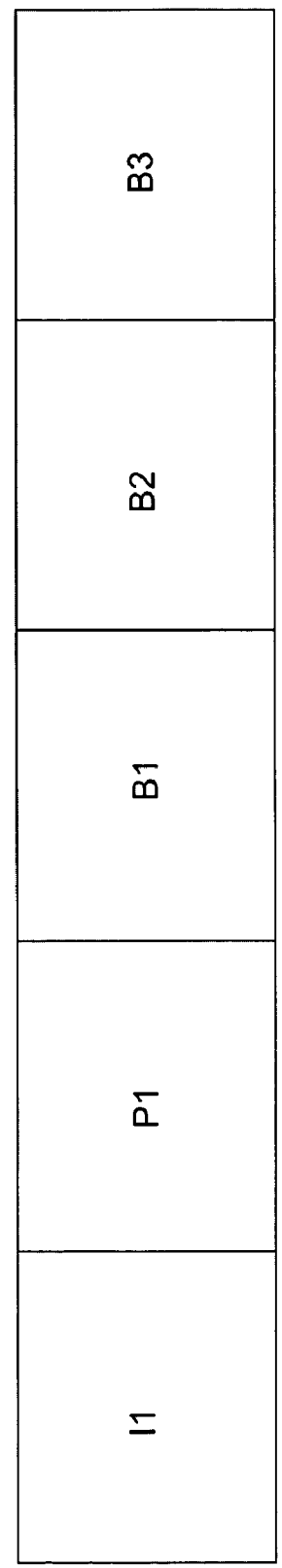
Figure 11A:
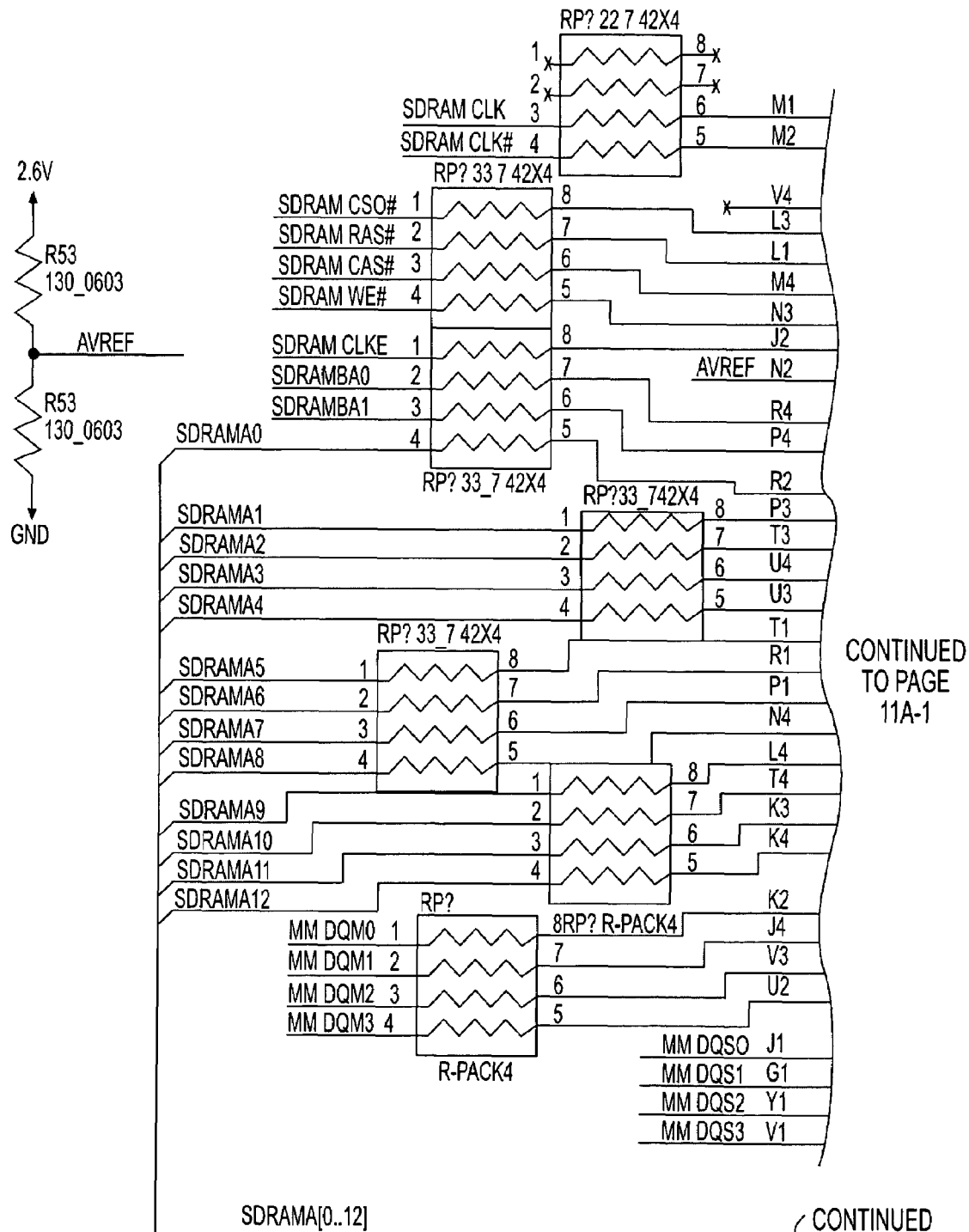
FIGS. 11(A)-11(M) and 12 are circuit schematic diagrams of a transmitter/receiver according to embodiments of the present invention.
Figures 1, 11A:
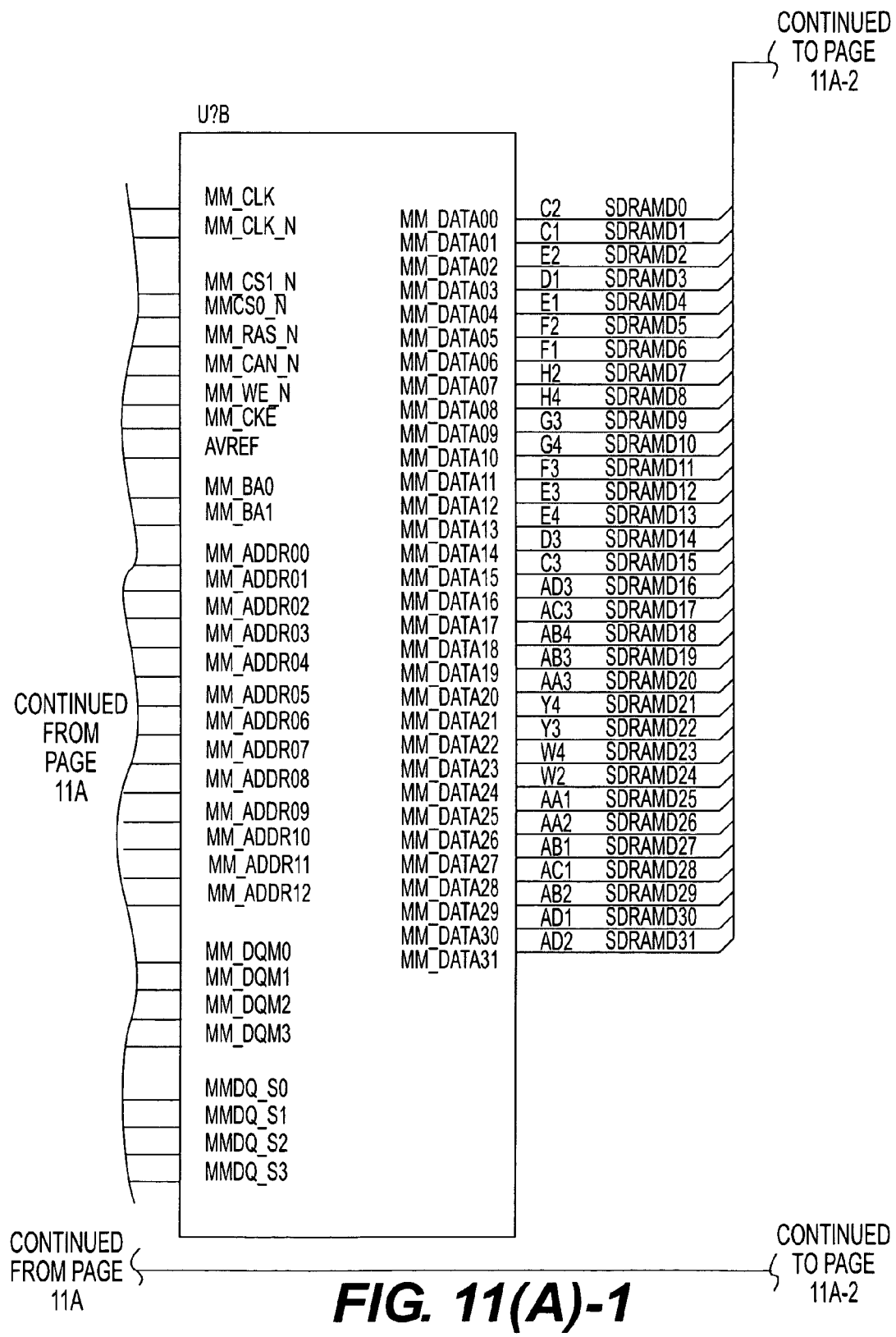
Figures 2, 11A:
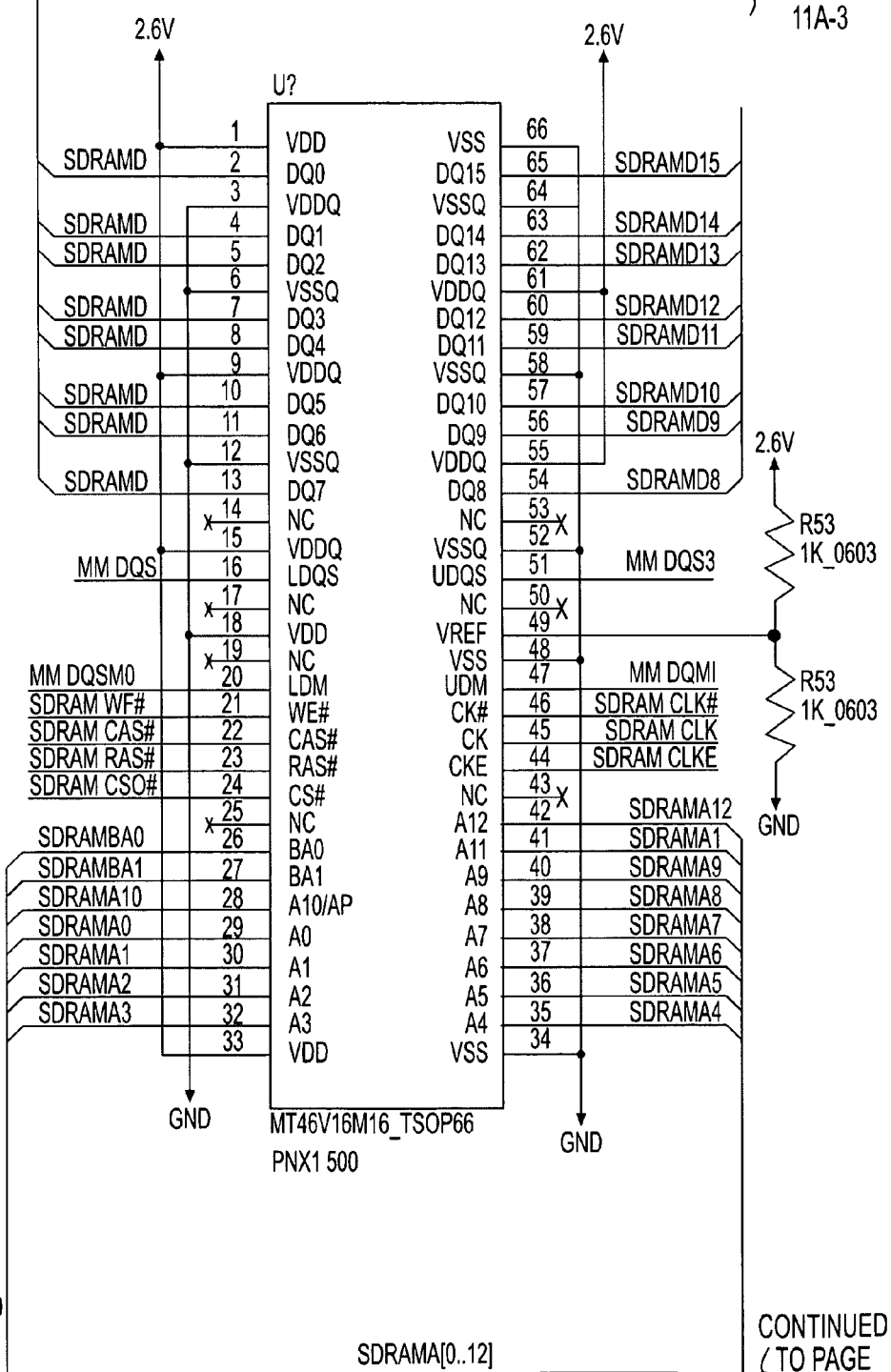
Figures 3, 11A:
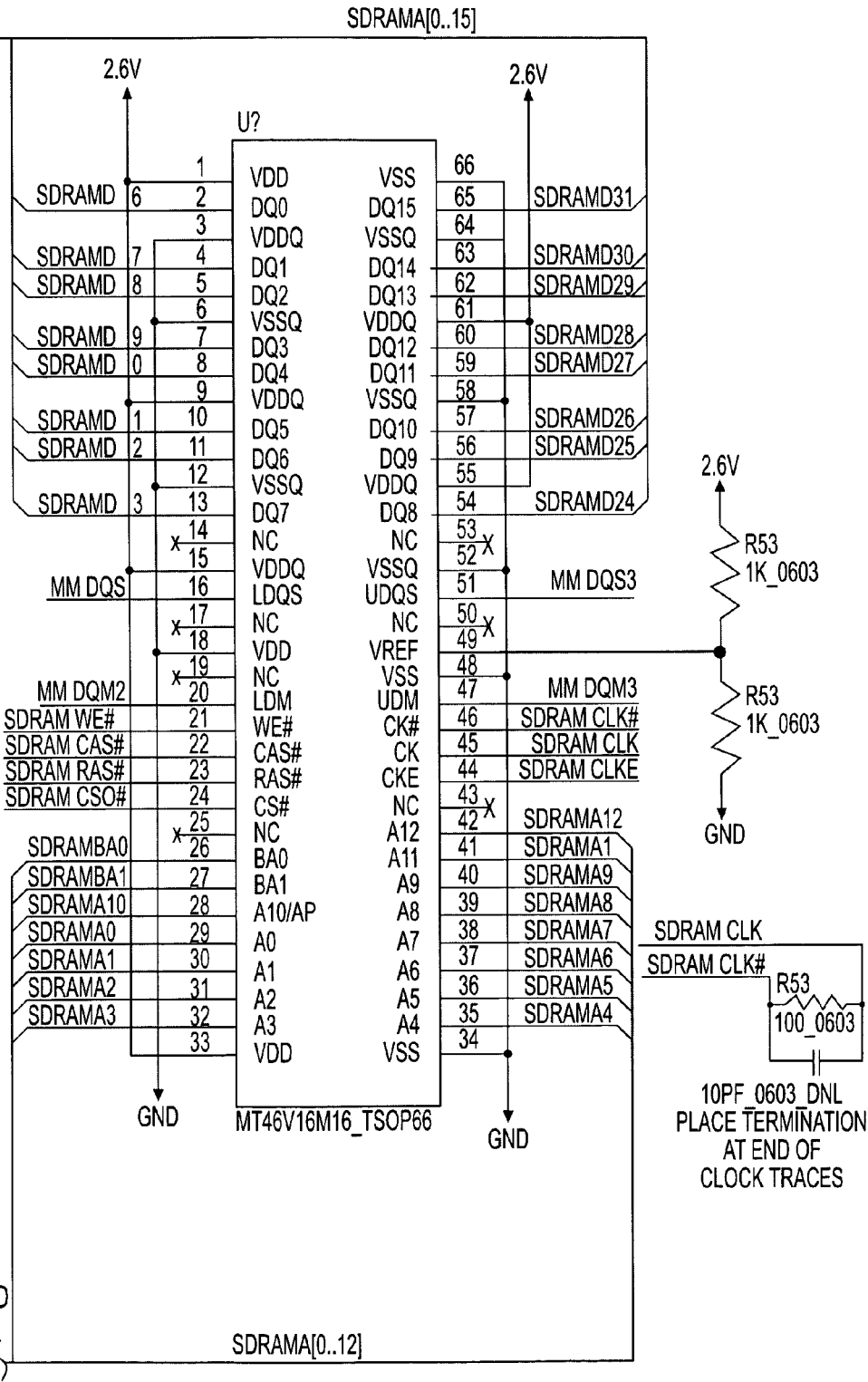
Figure 11B:
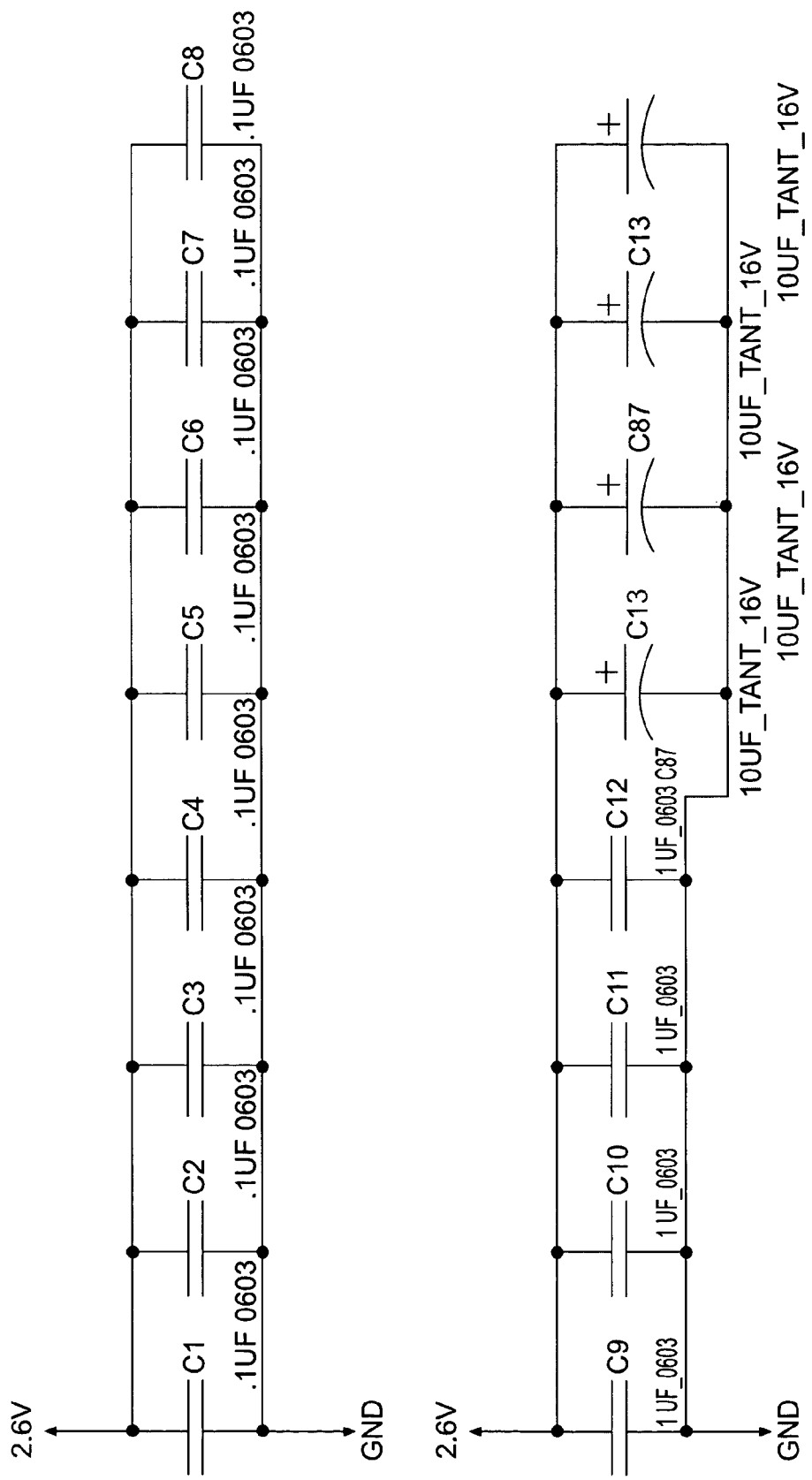
Figure 11C:
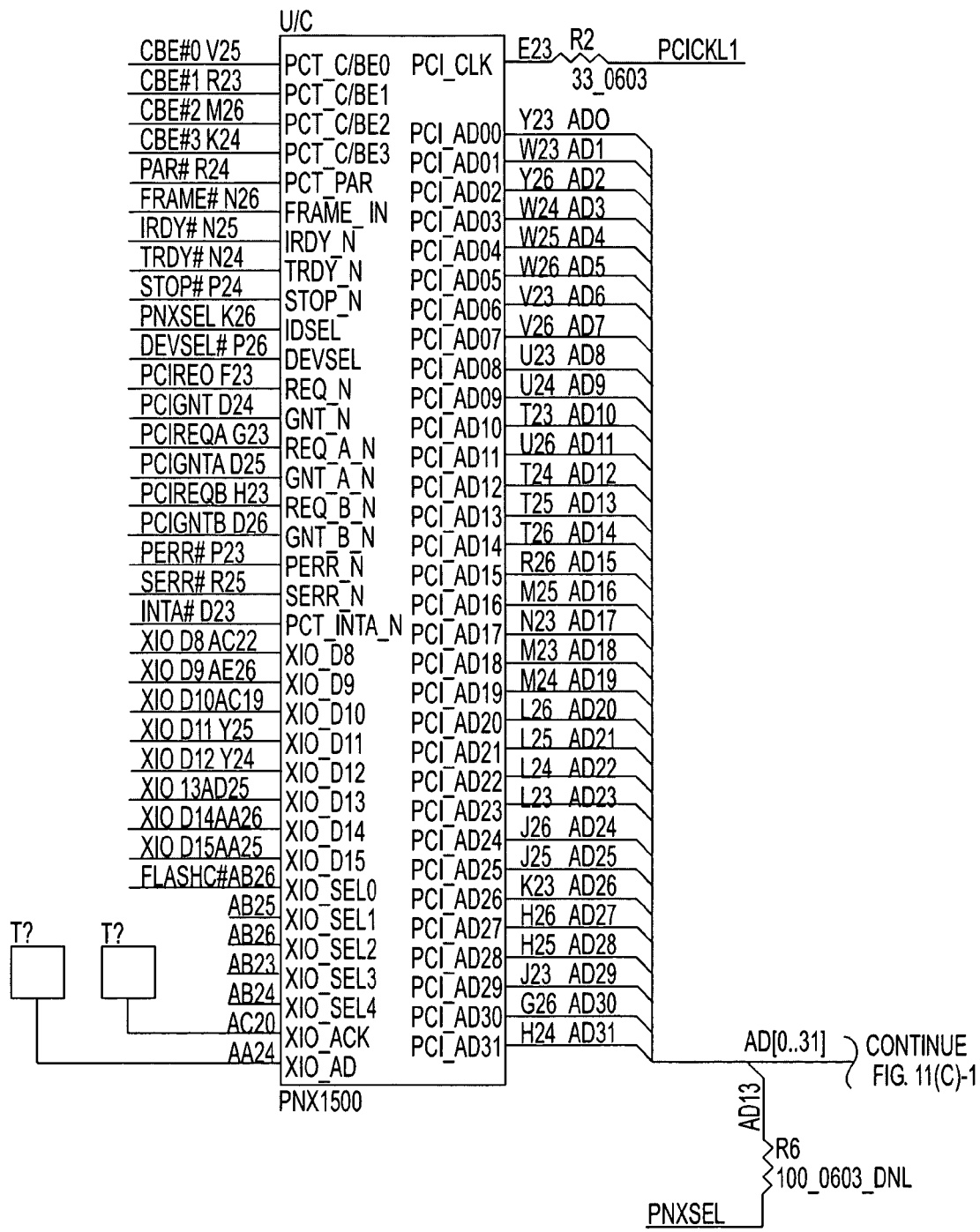
Figures 1, 11C:
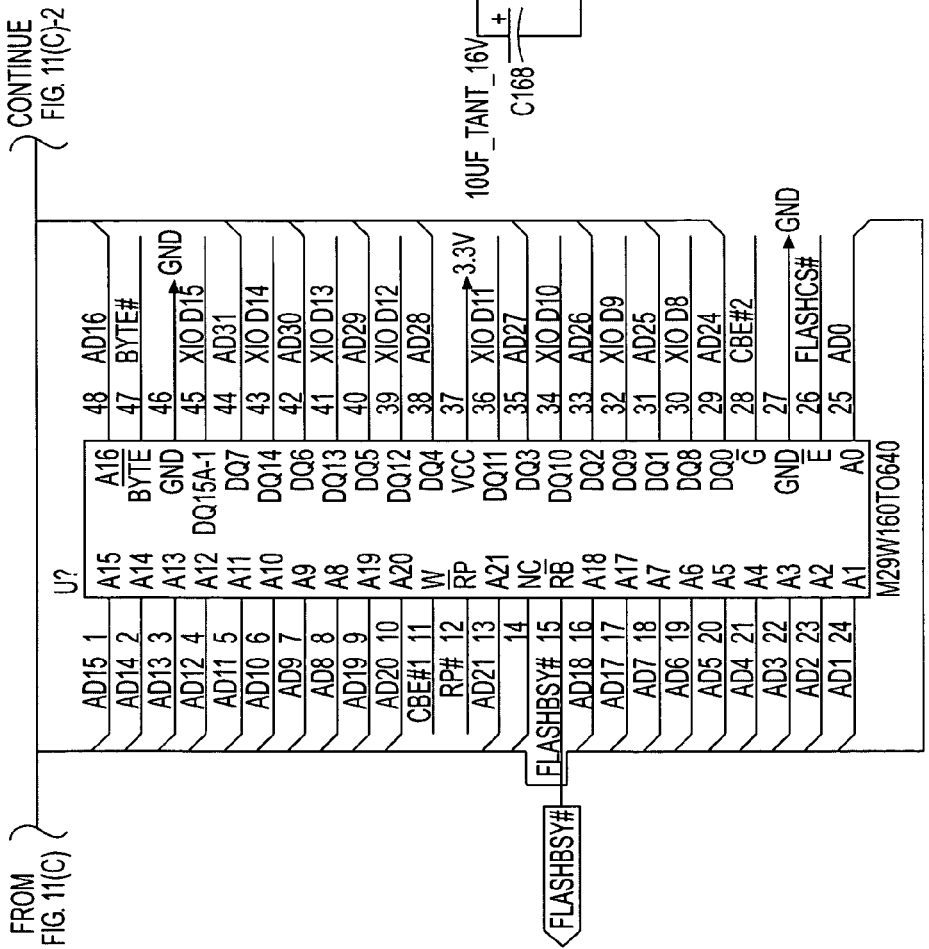
Figures 2, 11C:
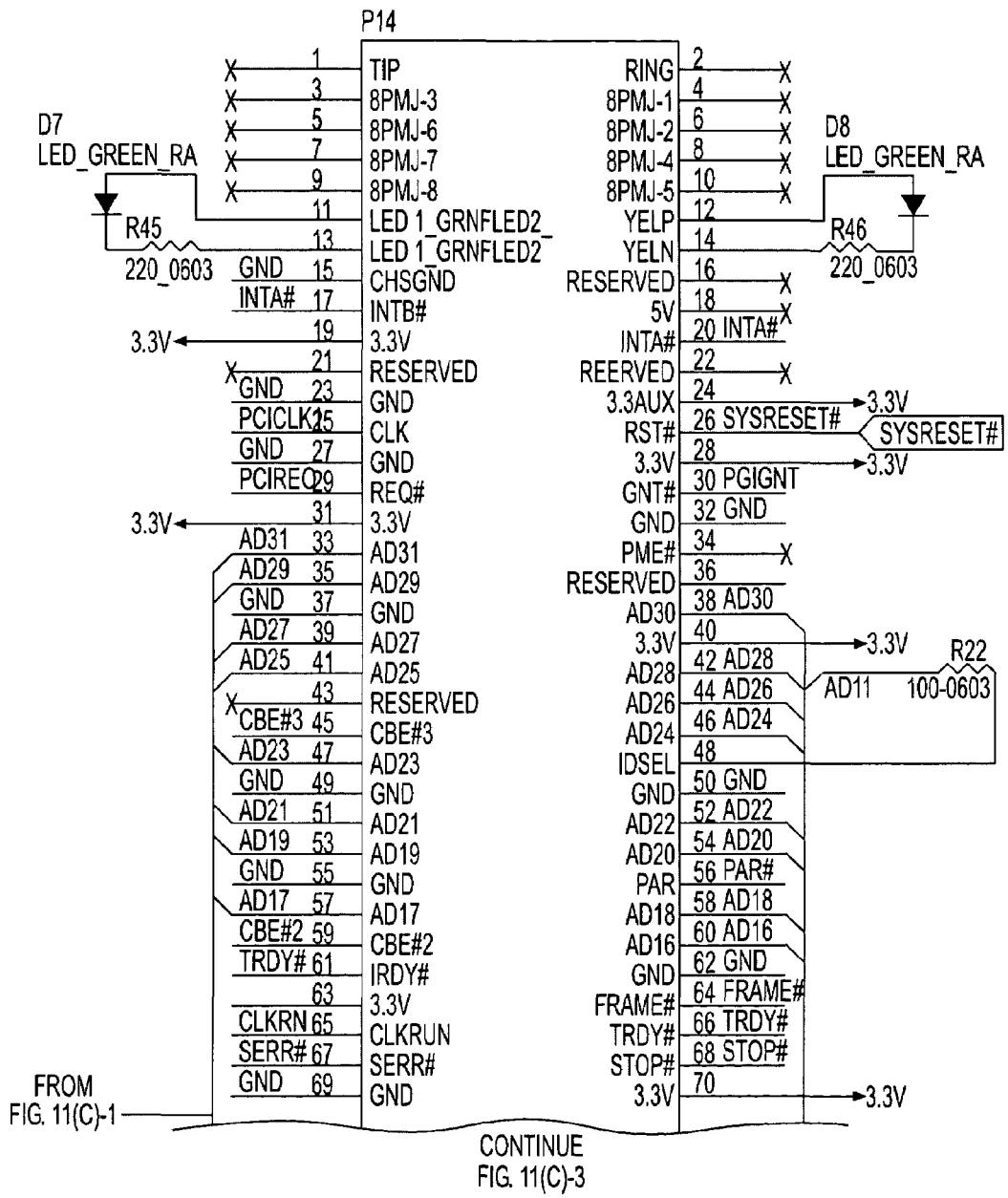
Figures 11D, 11E:
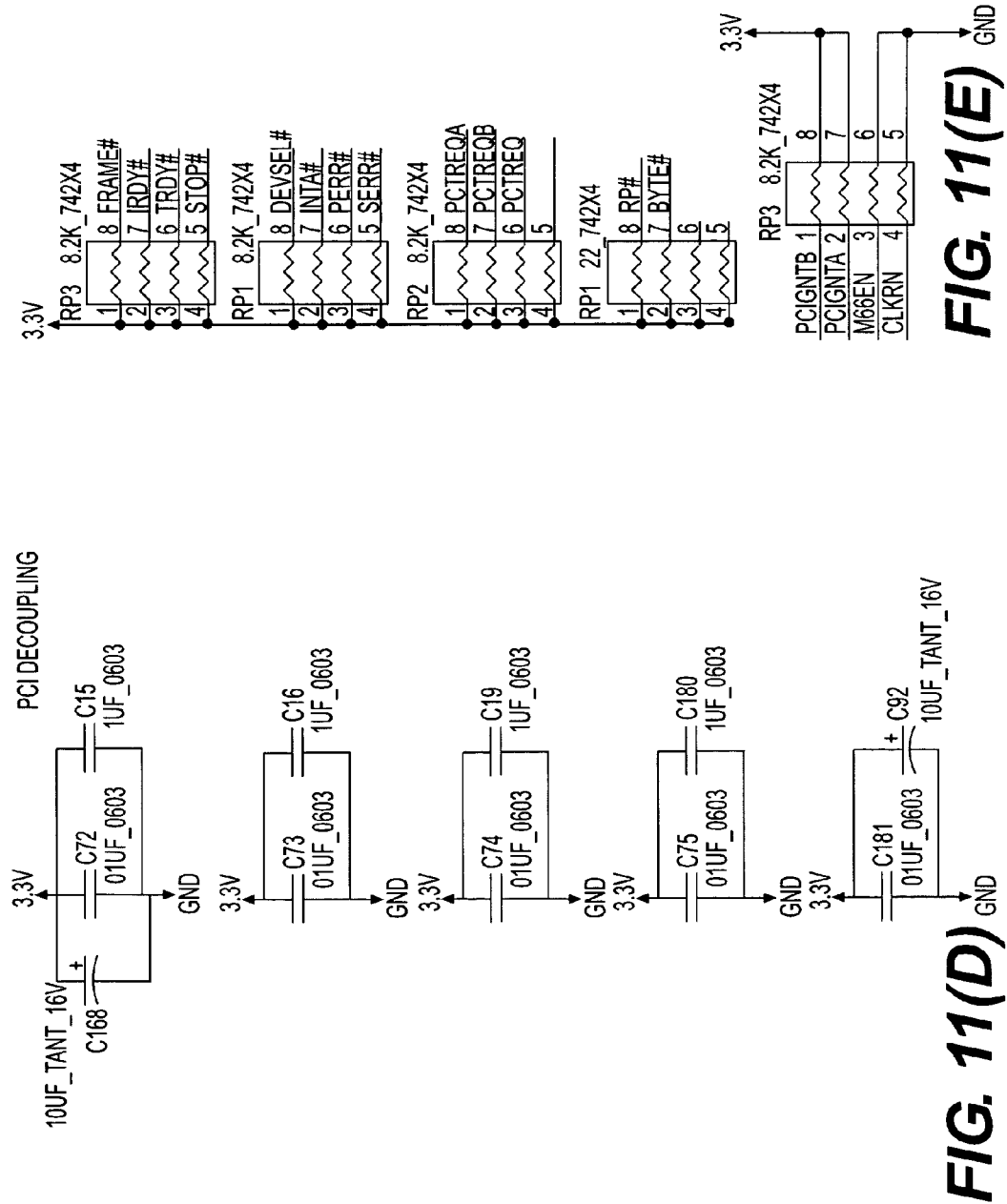
Figure 11F:
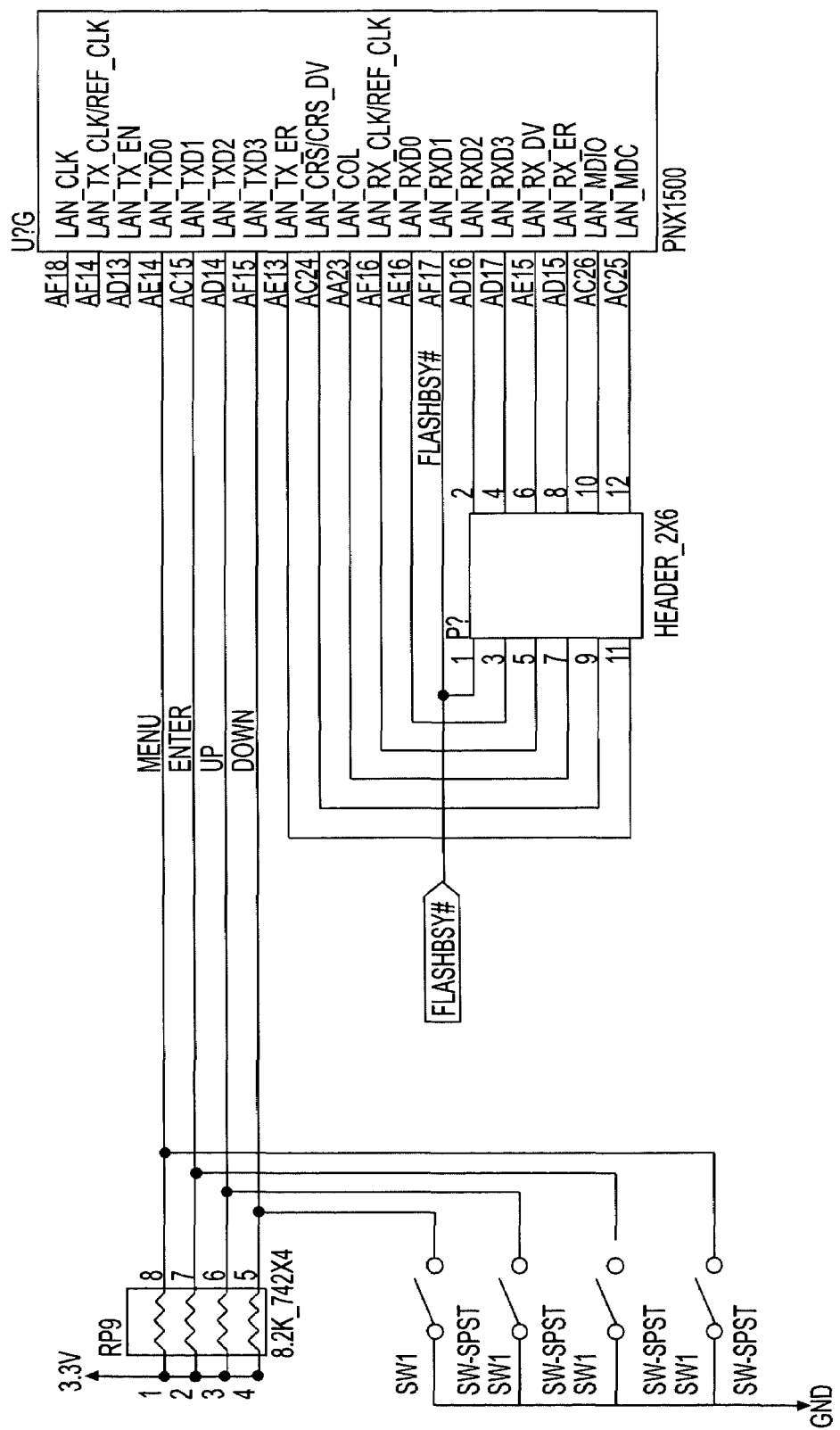
Figure 11G:
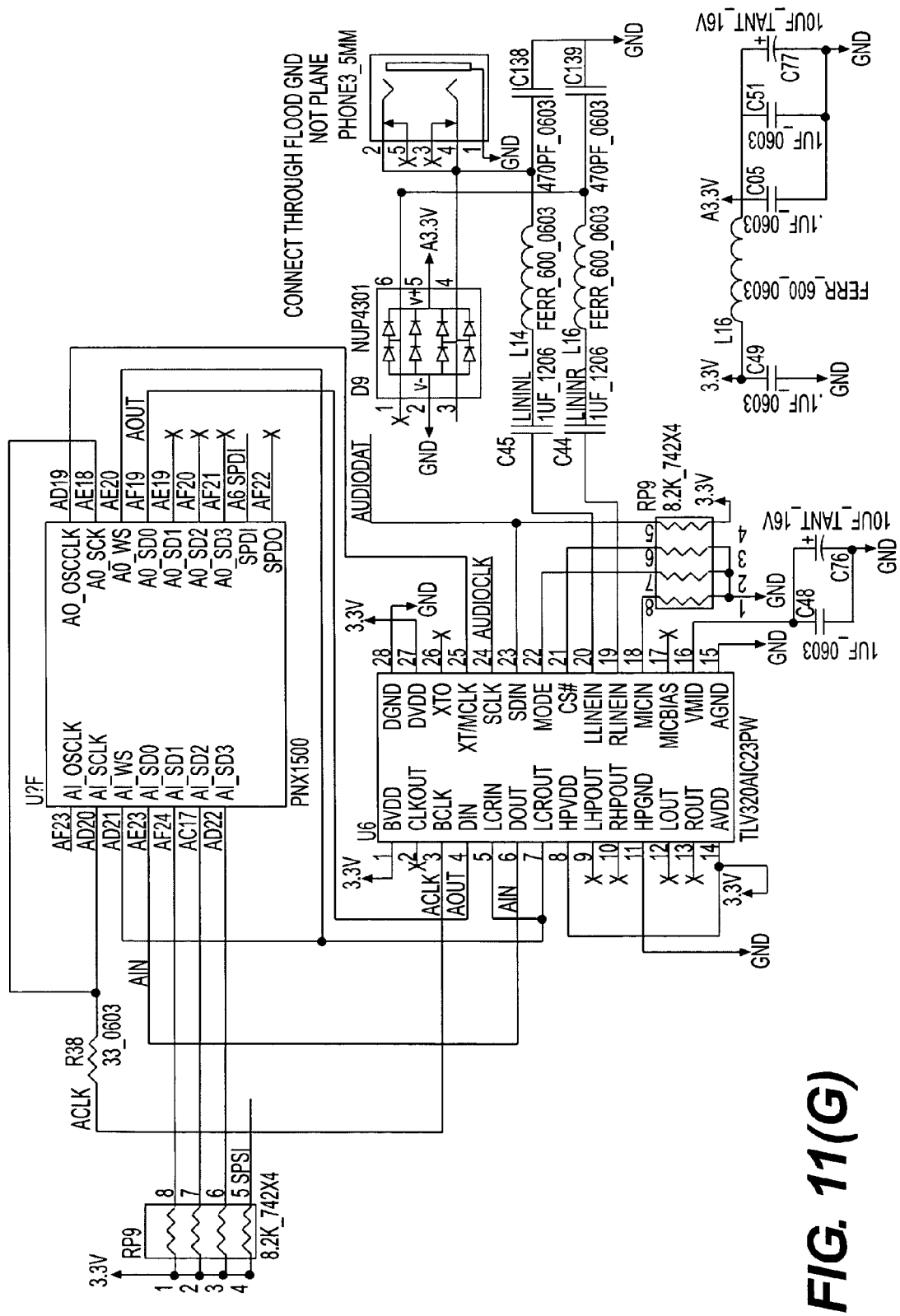
Figure 11:
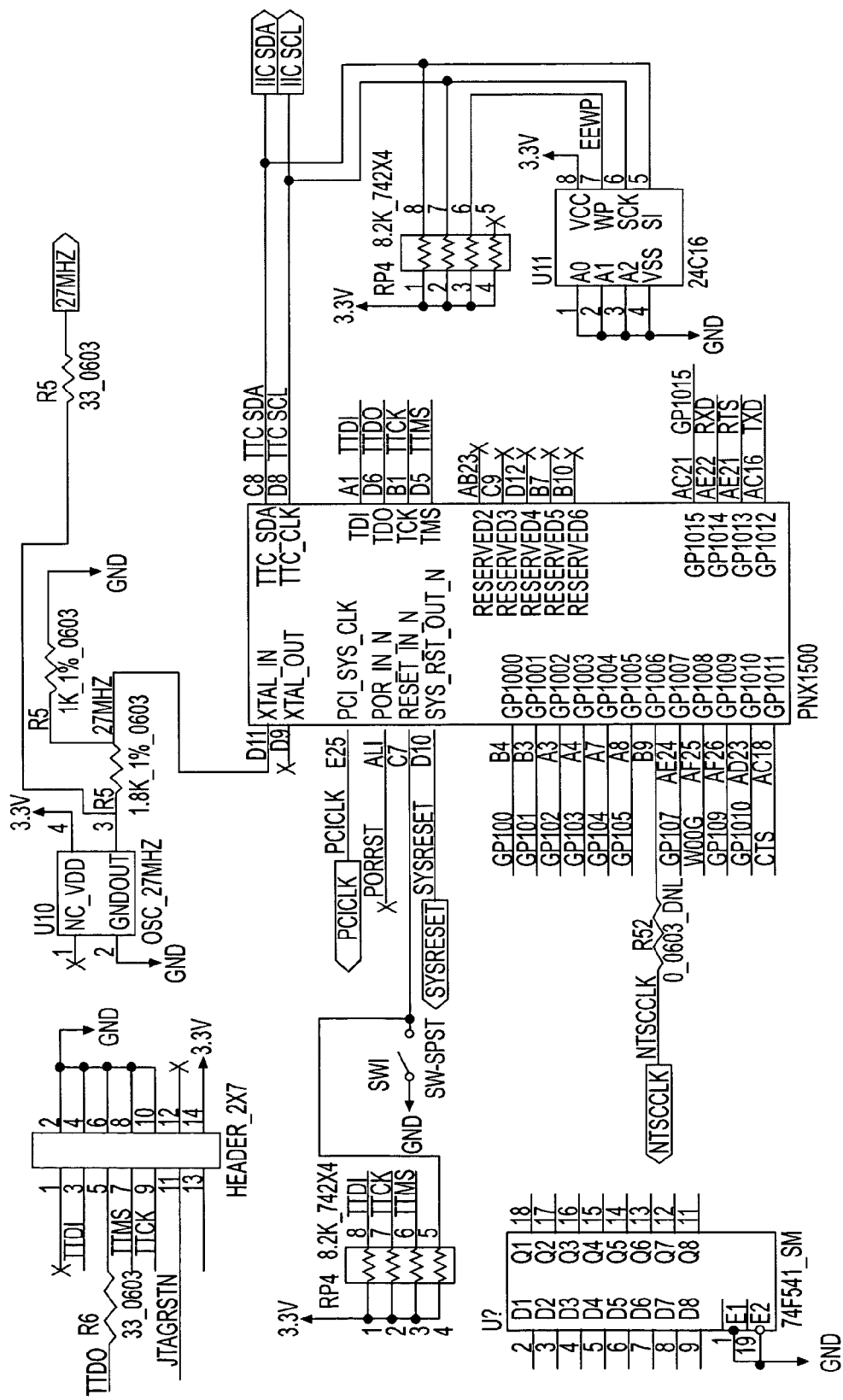
Figure 11:
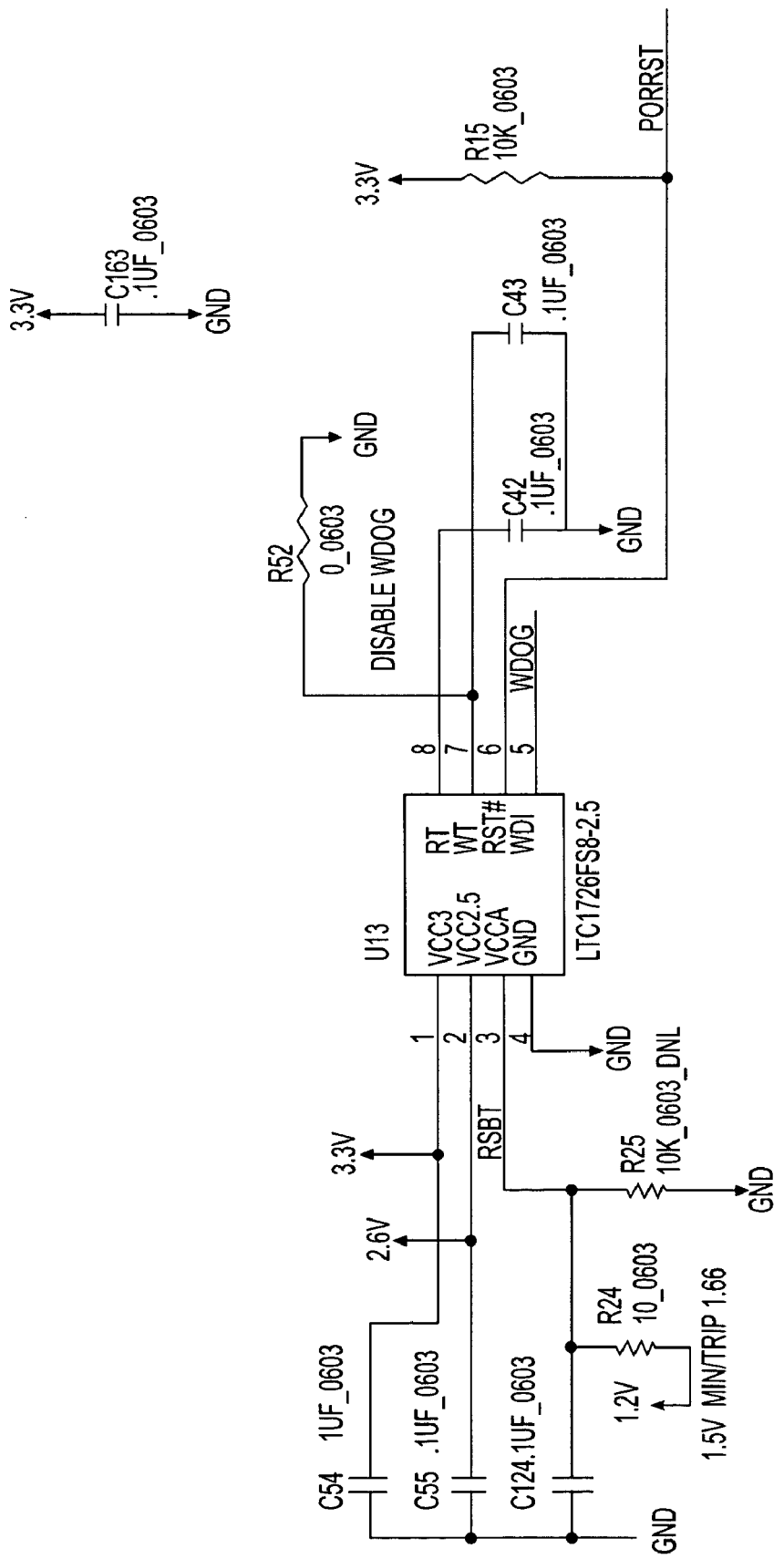
Figure 11:
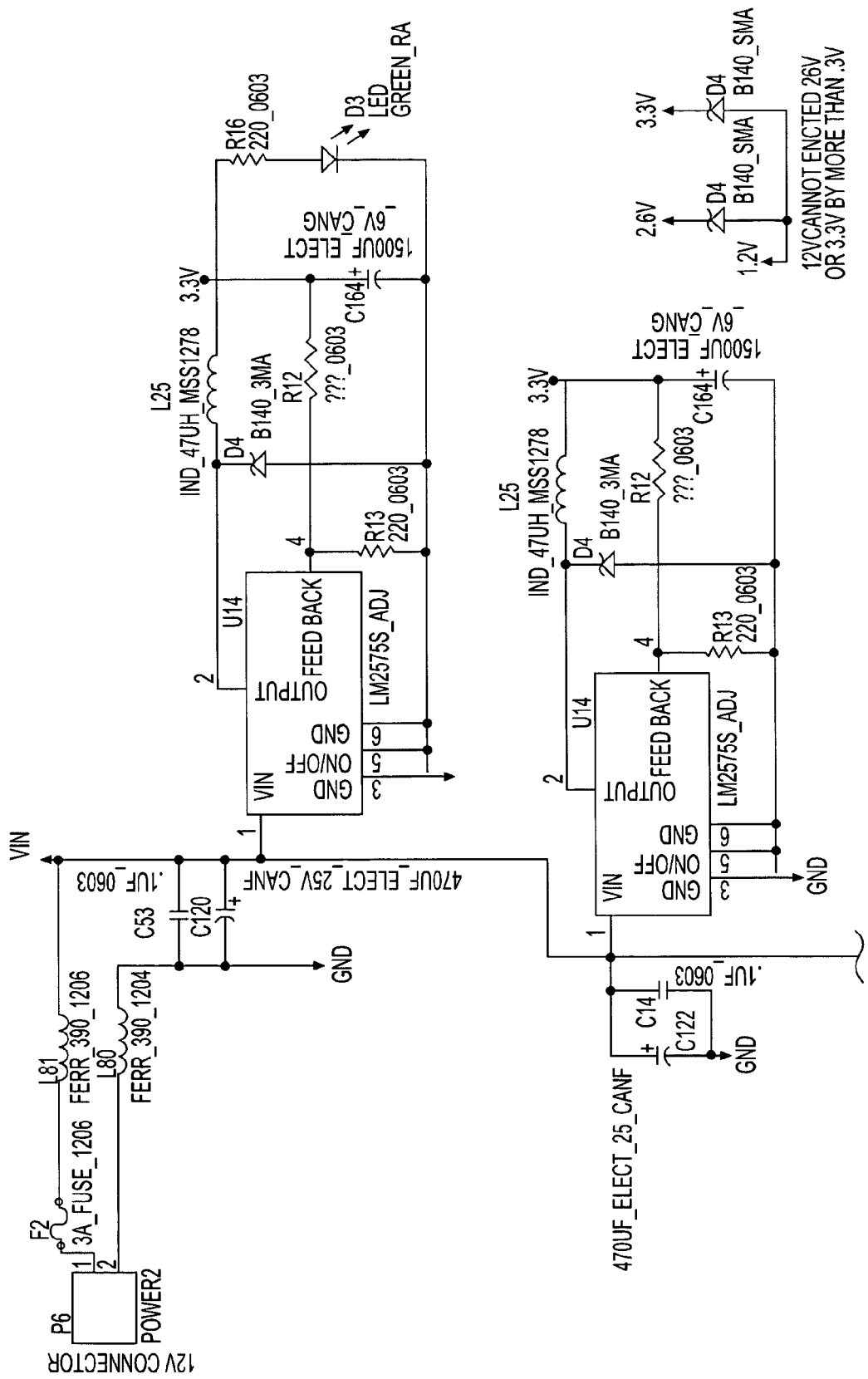
Figure 11:
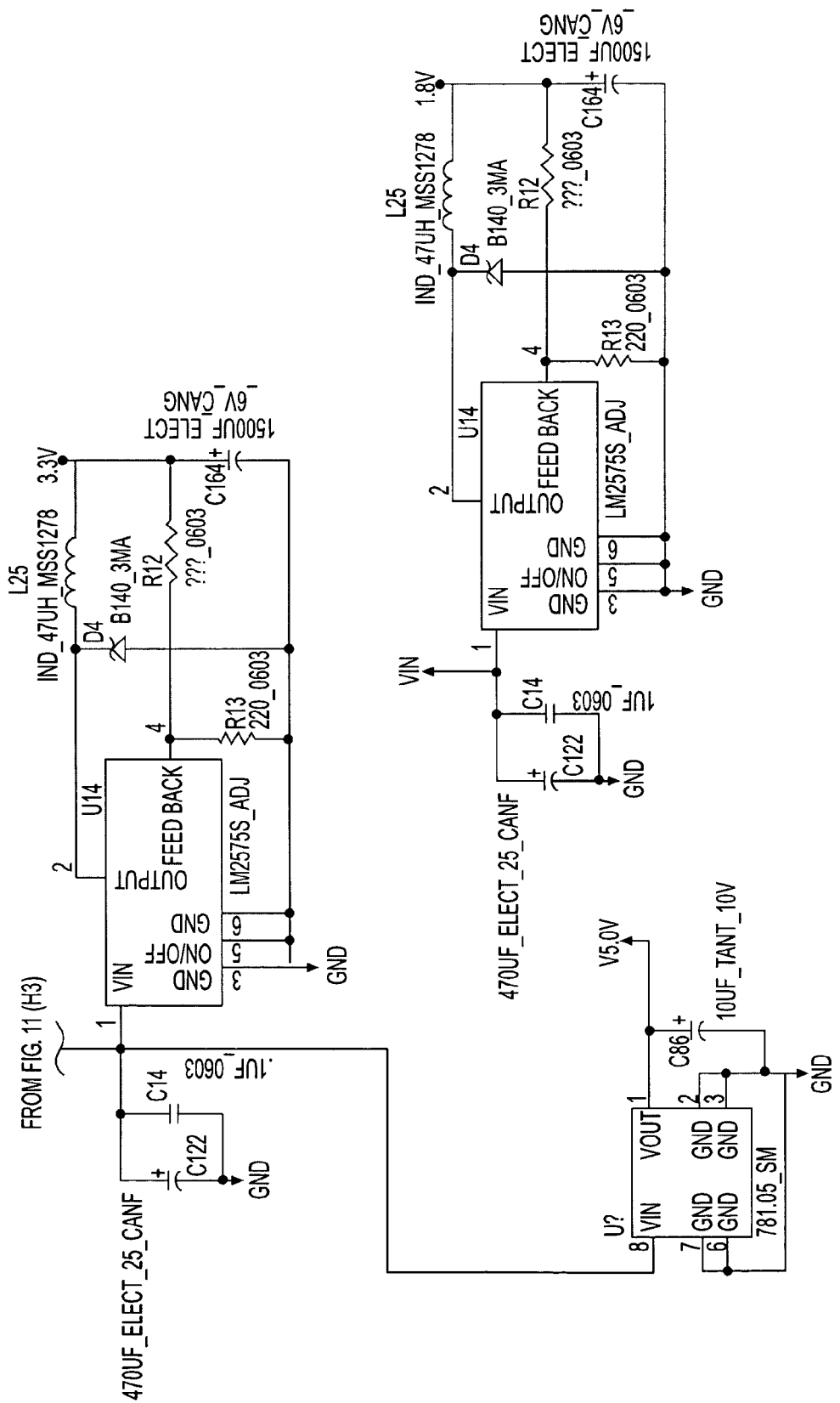
Figure 11:
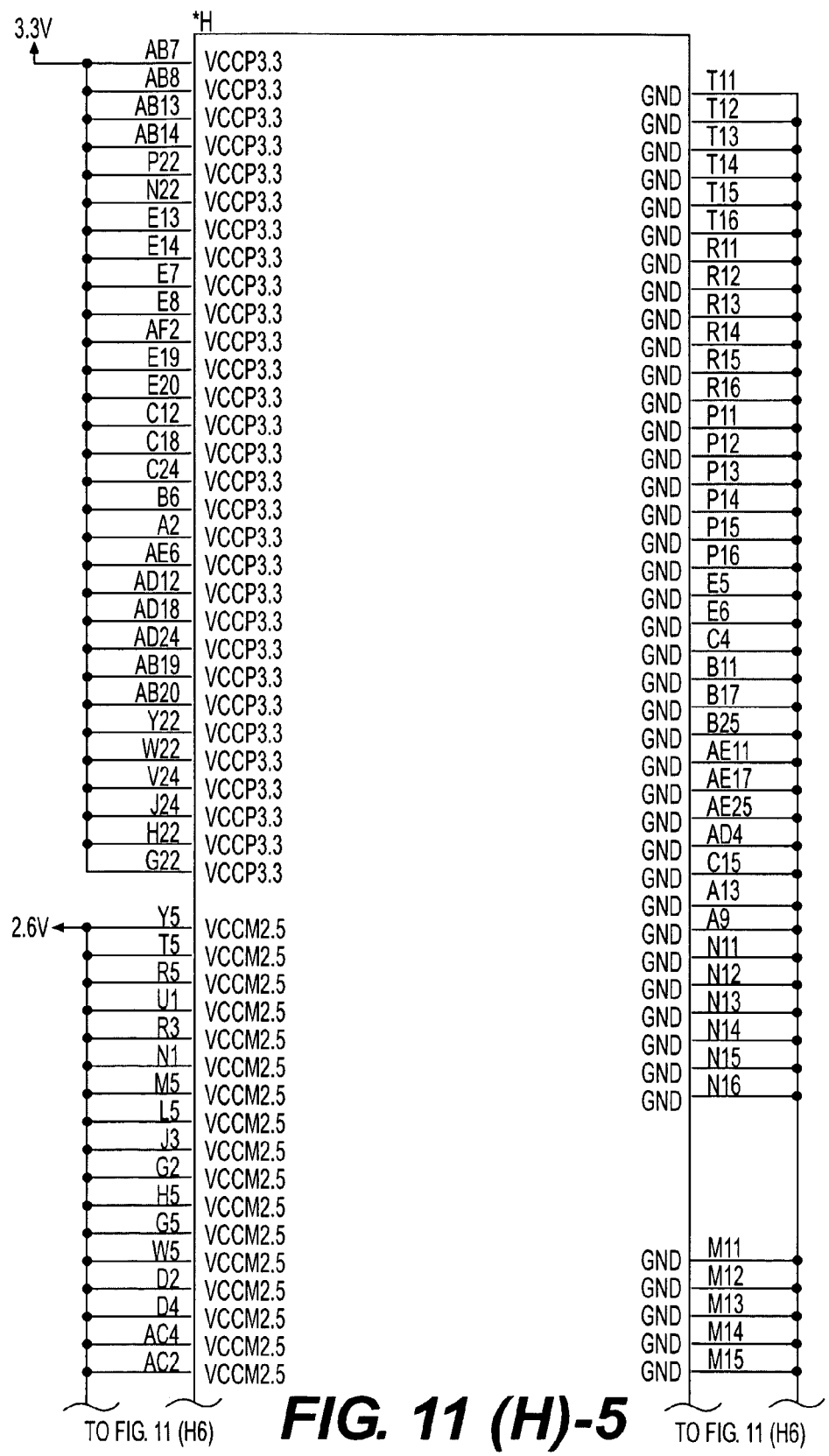
Figure 11:
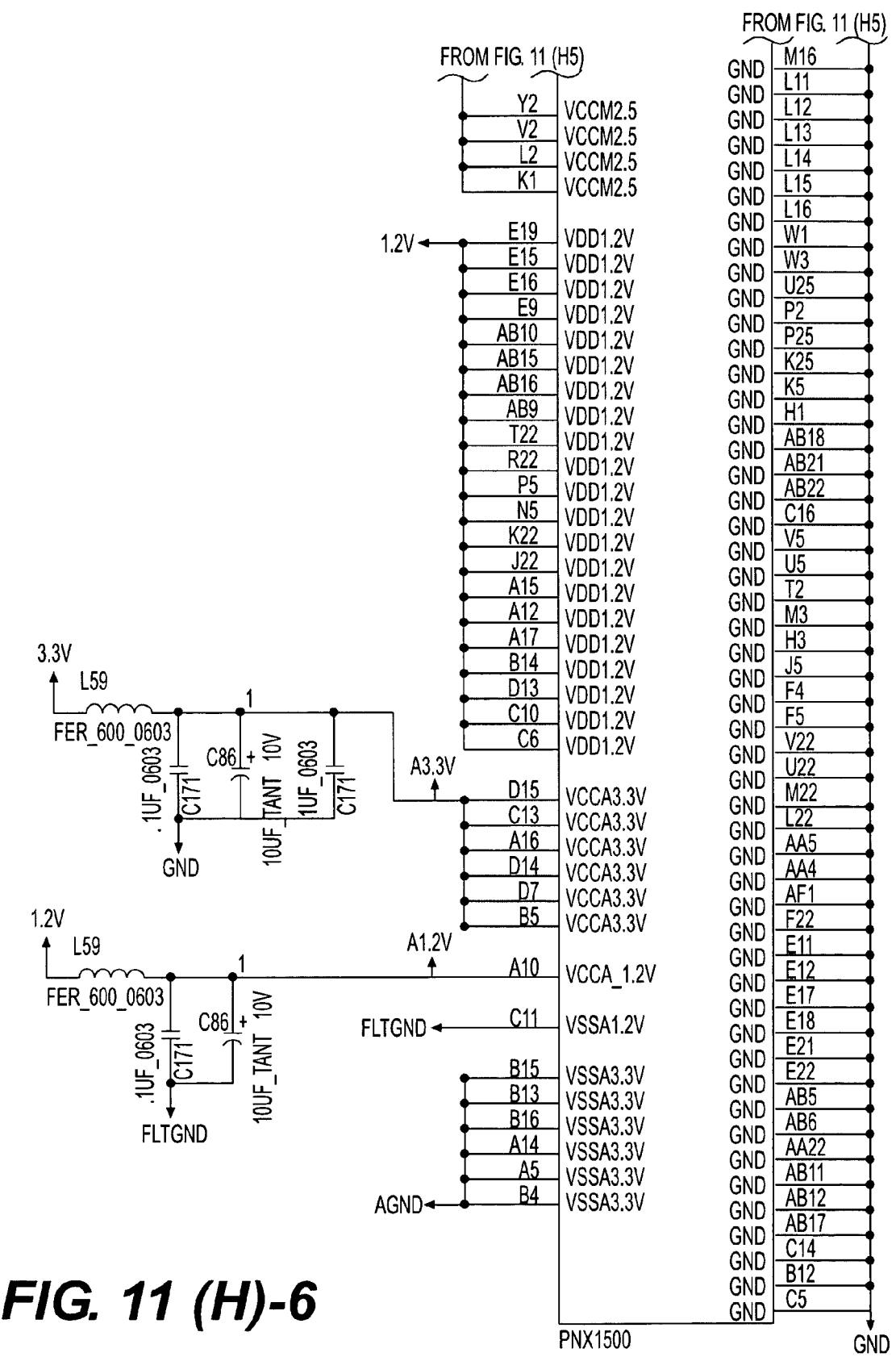
Figure 11:
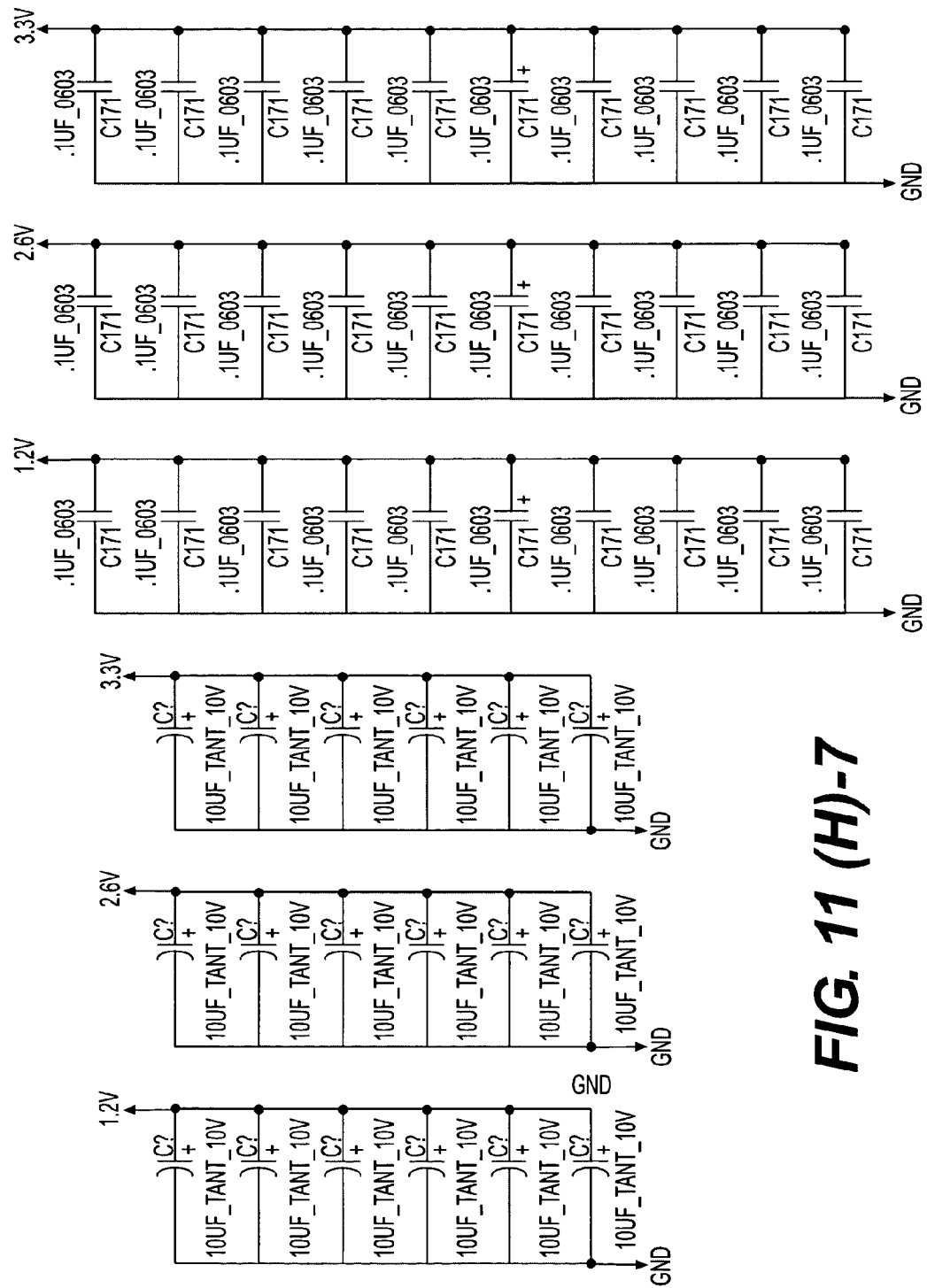
Figure 11:
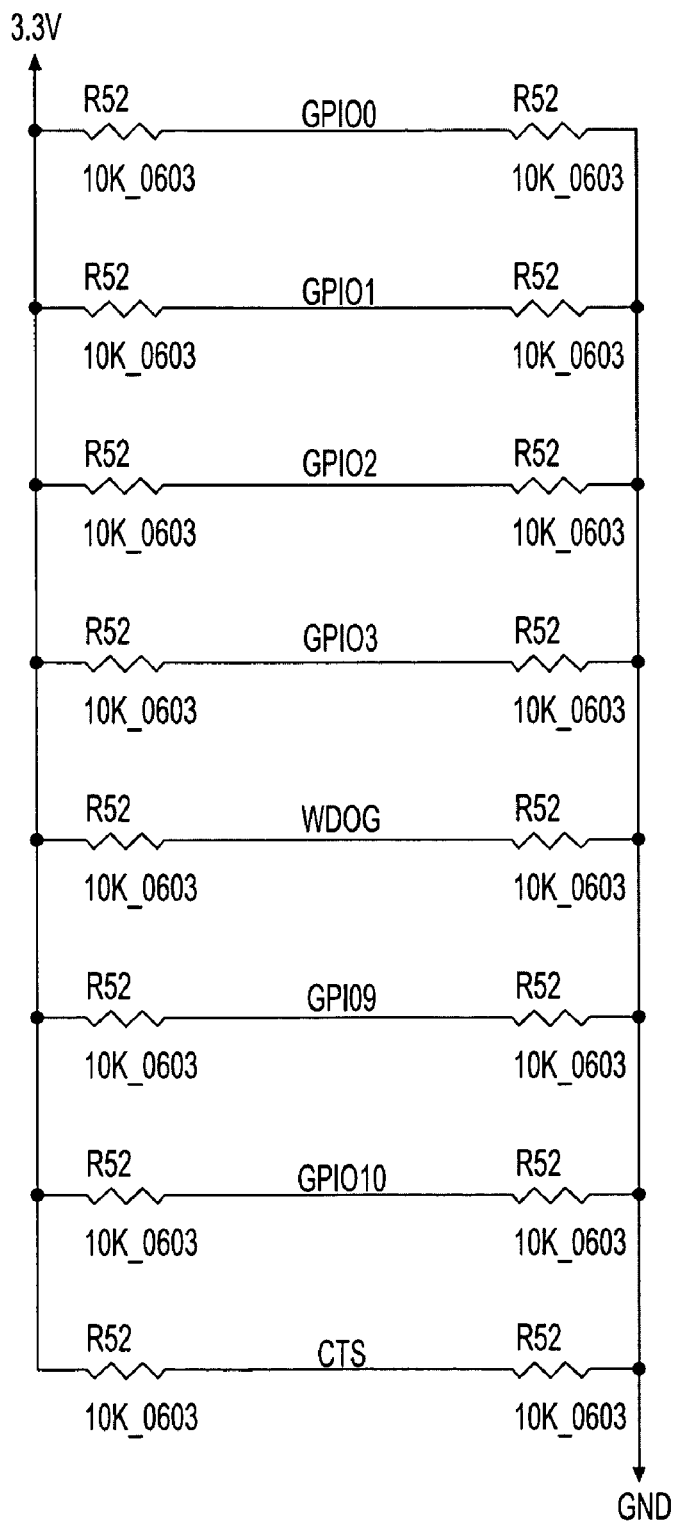
Figure 11I:
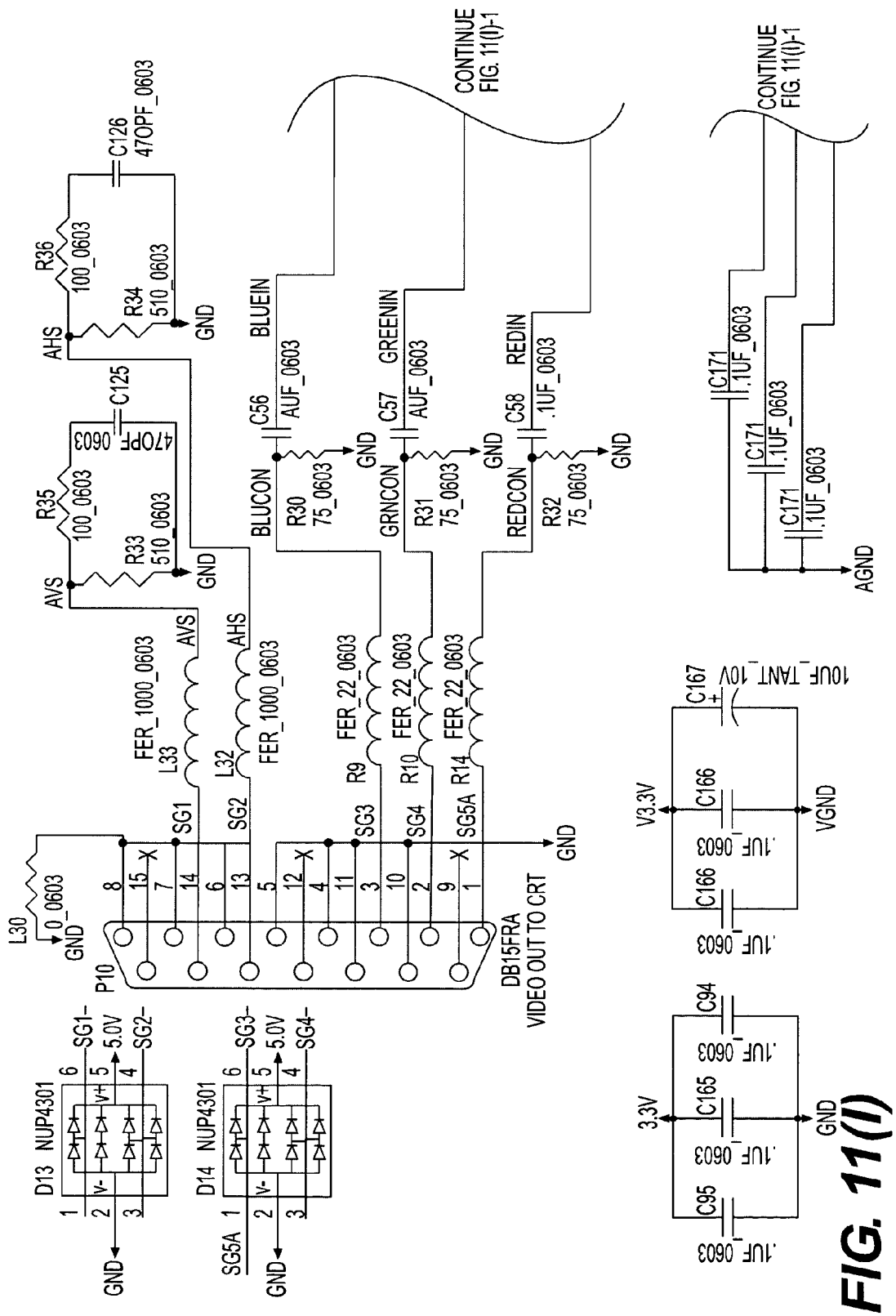
Figures 1, 11I:
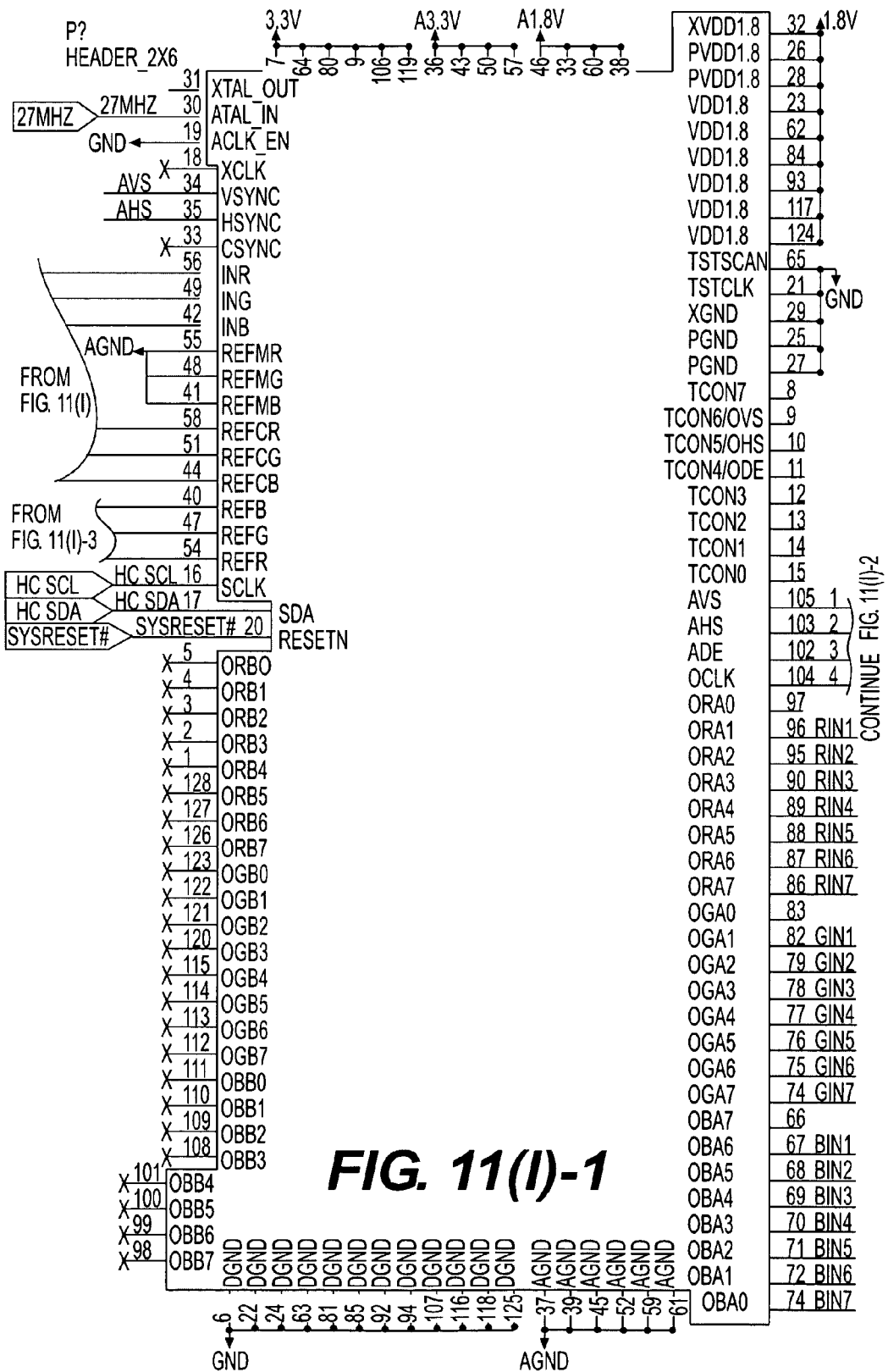
Figures 2, 11I:
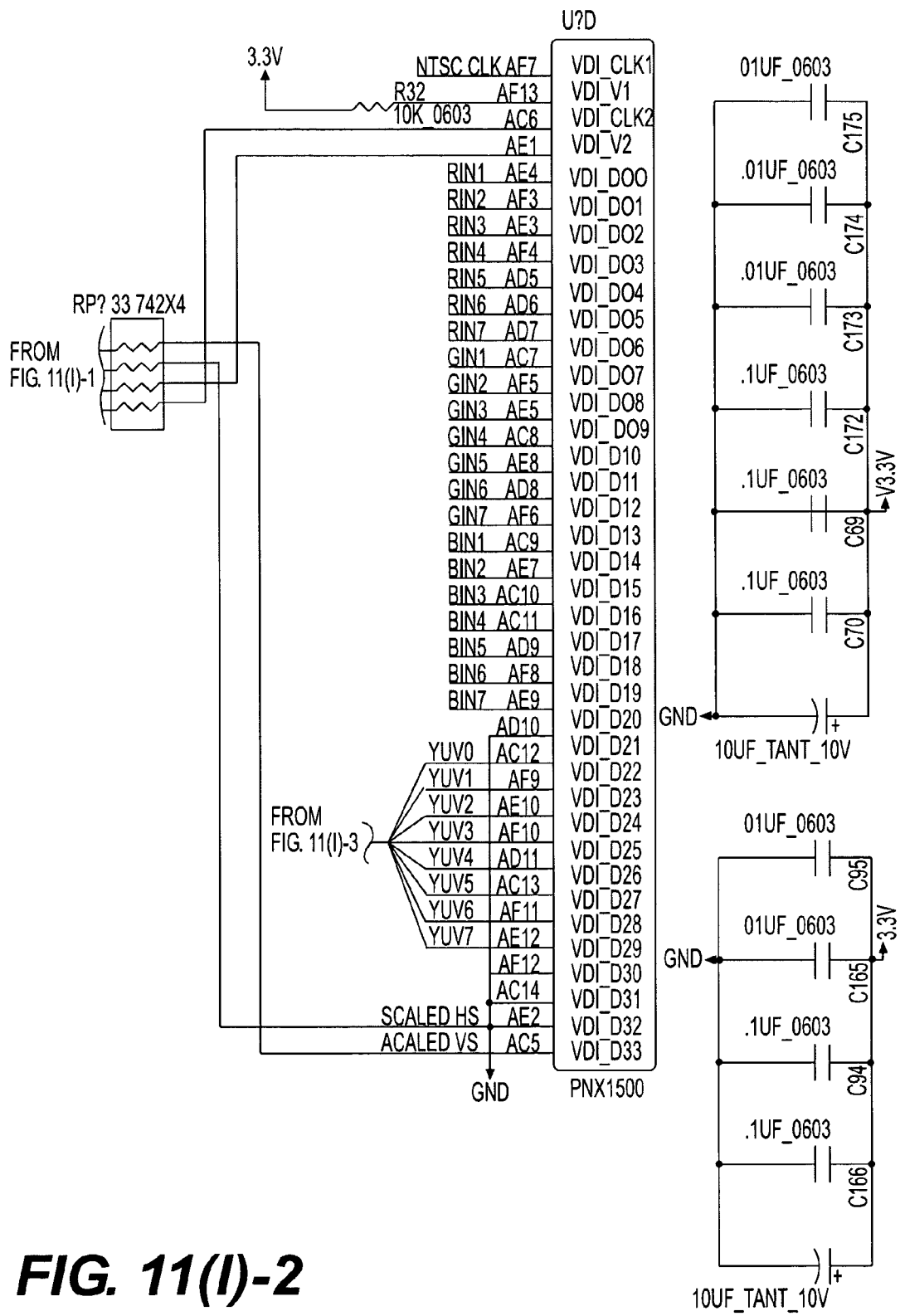
Figures 3, 11I:
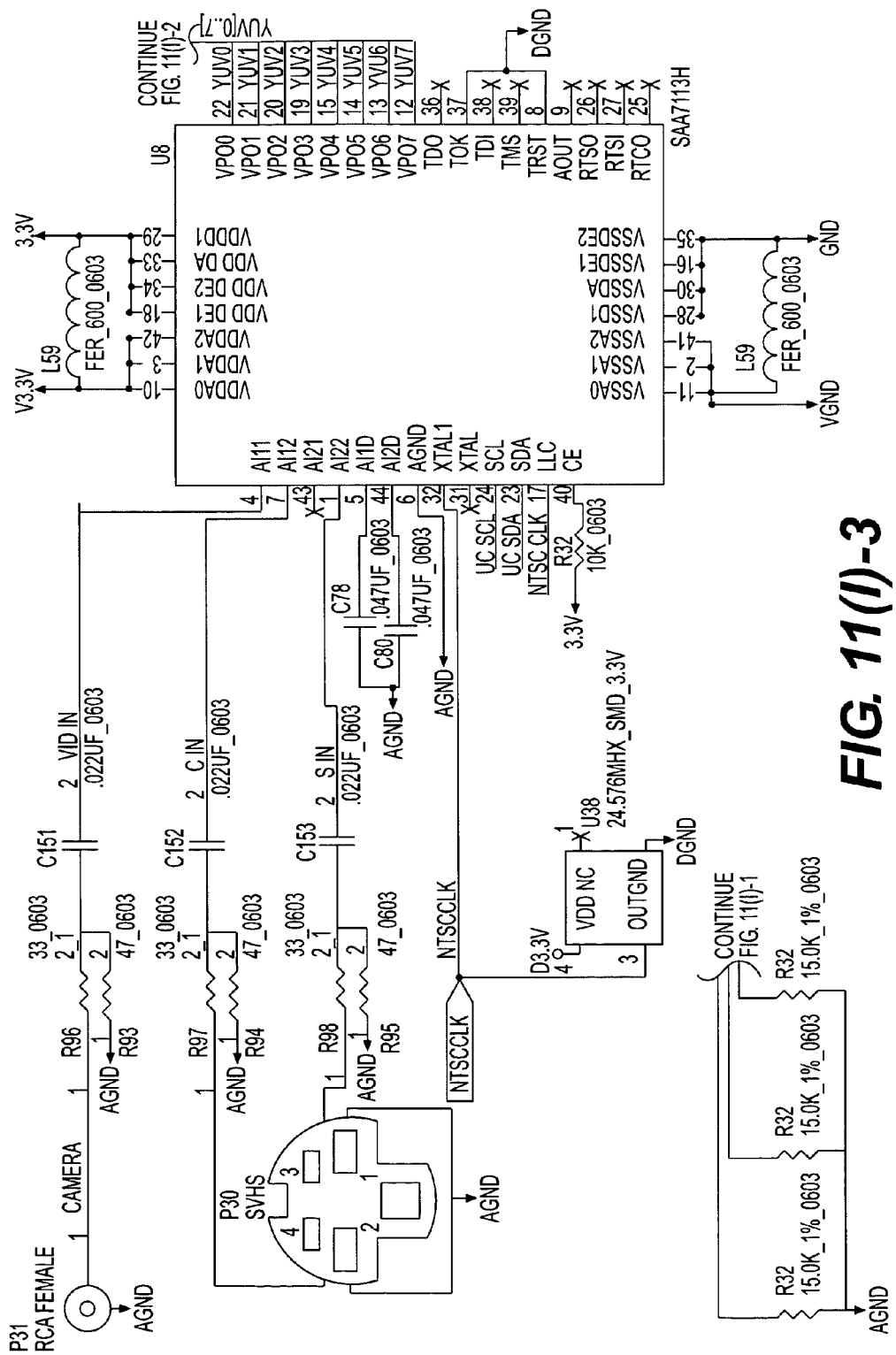
Figure 11J:
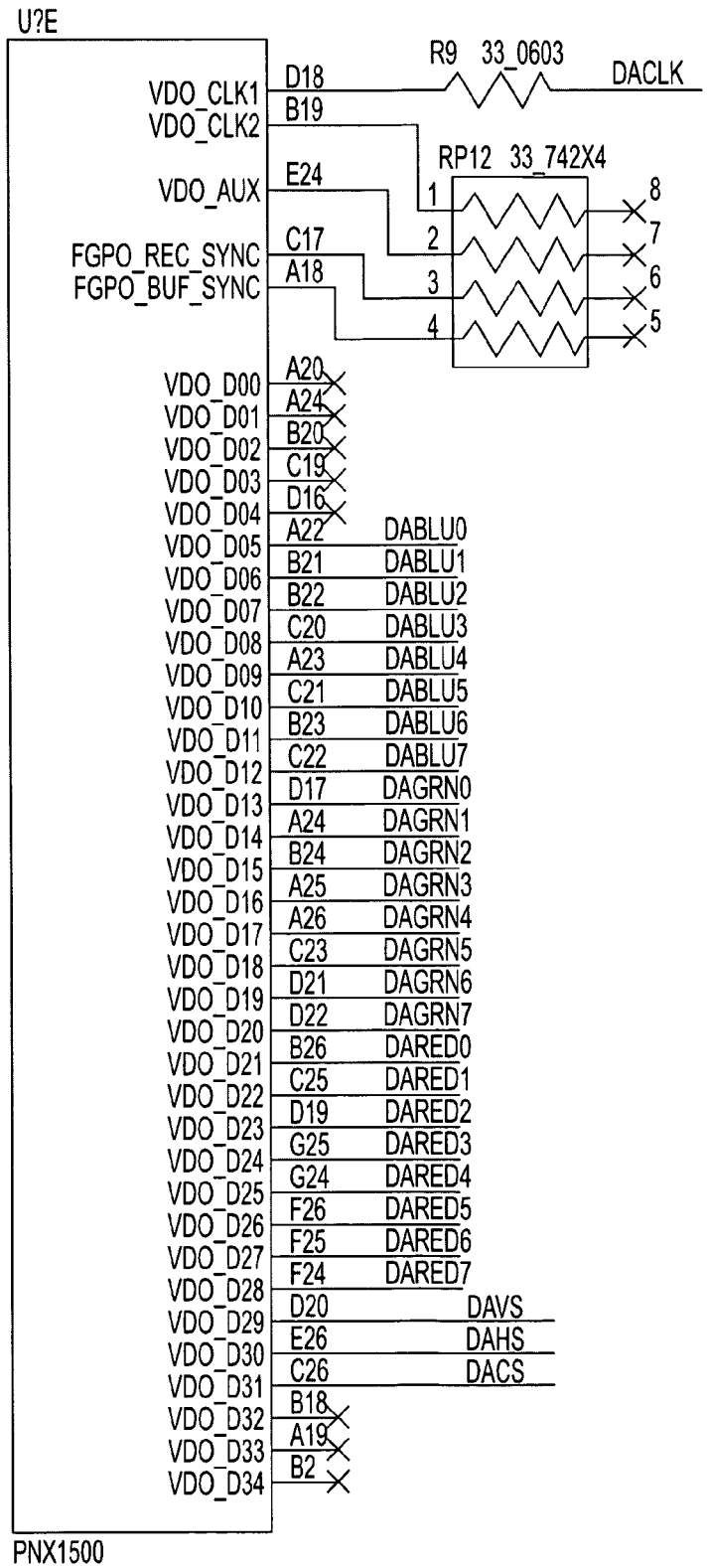
Figure 11K:
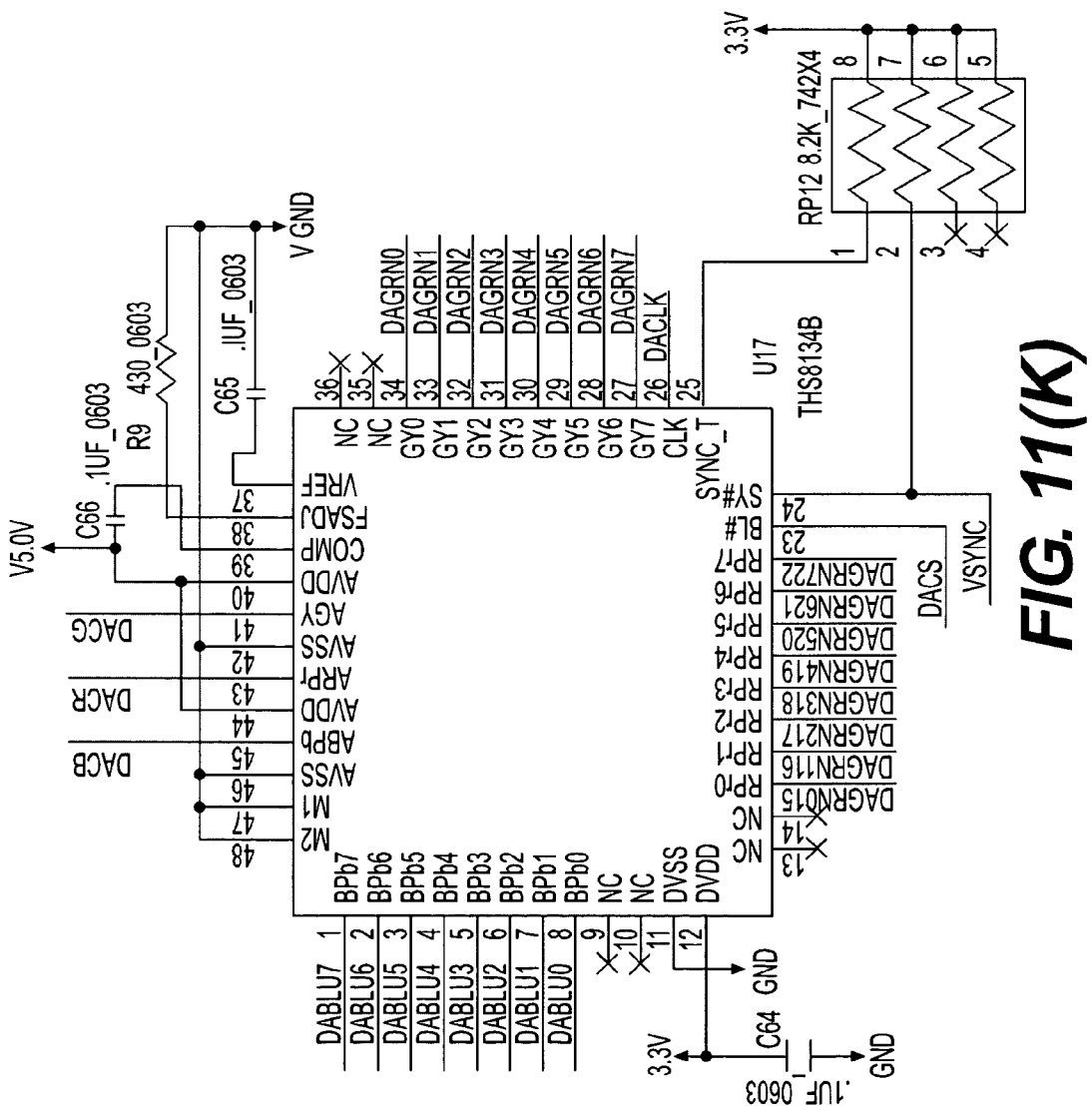
Figure 11L:
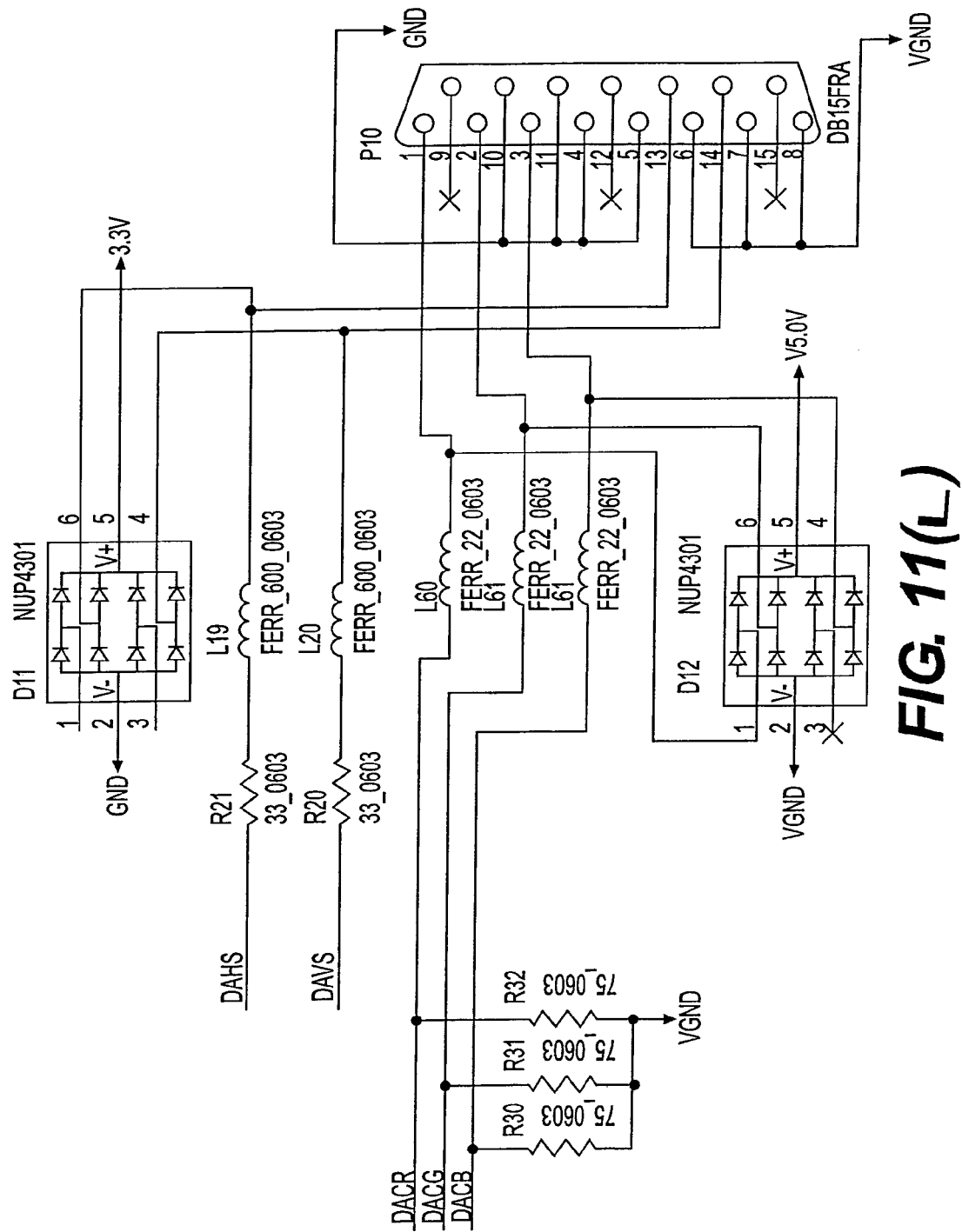
Figure 11M:
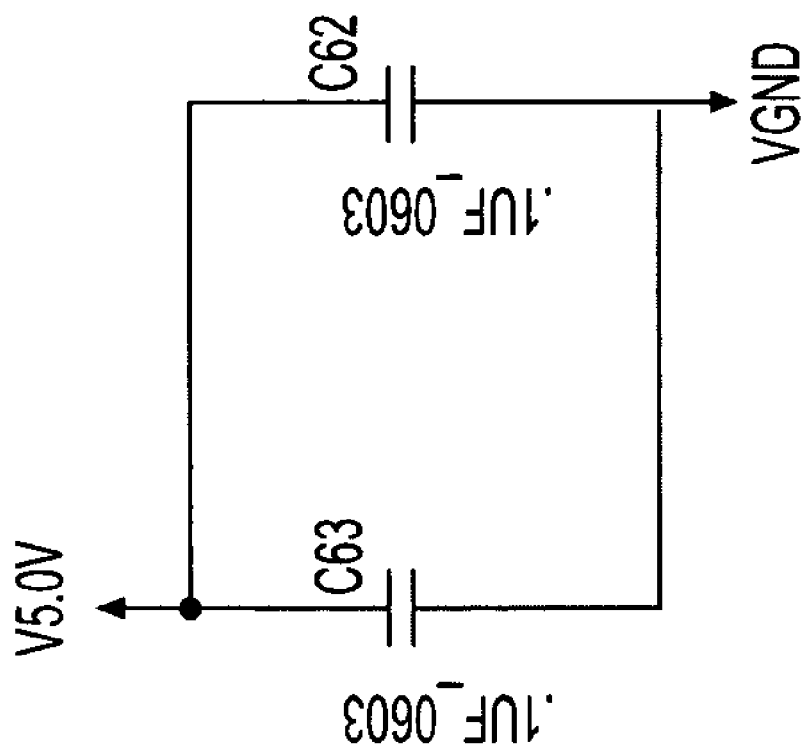
Figure 12:
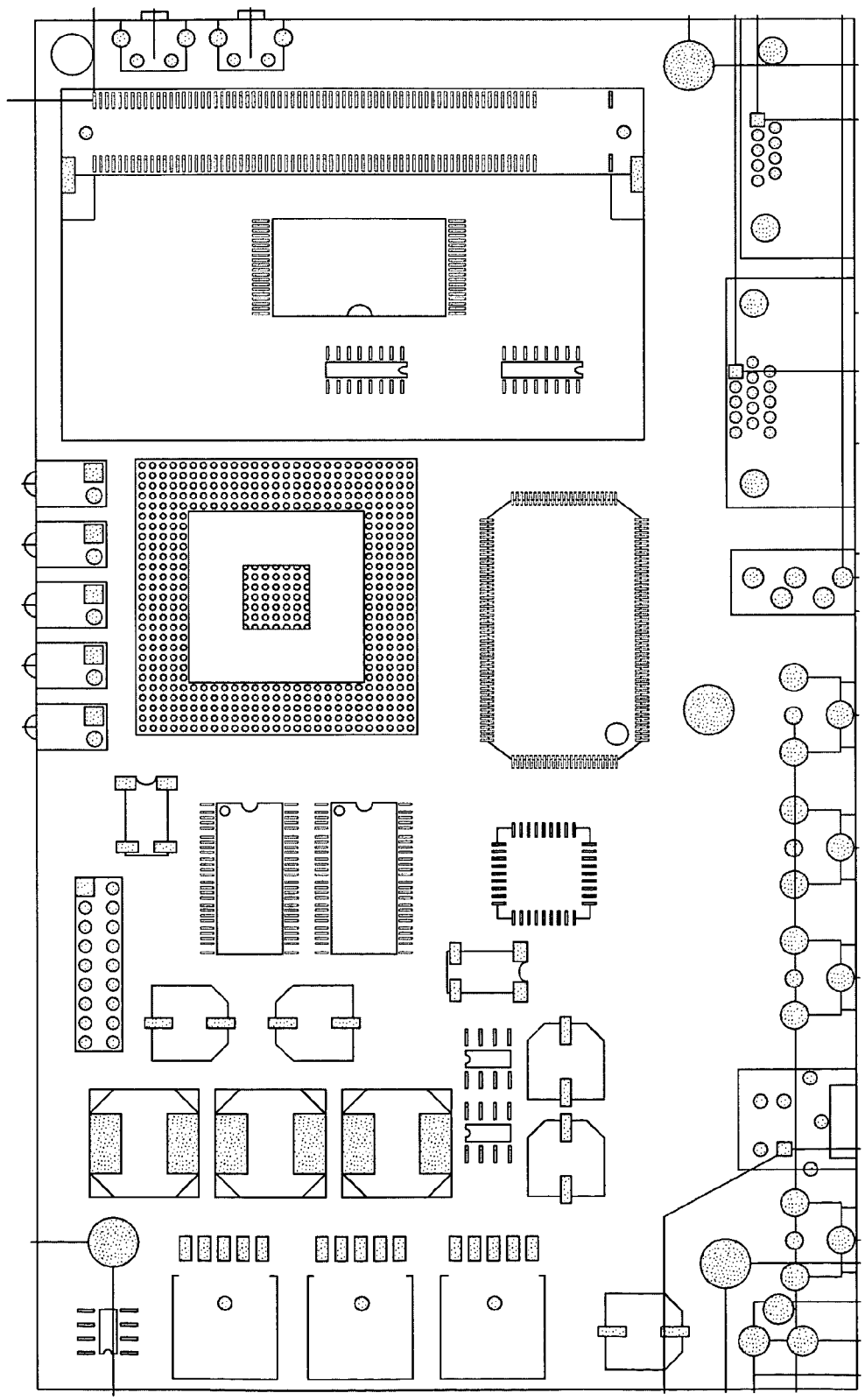

For example, assume there are five frames in a GOP. The frame display order is shown in FIG. 10(A), and the frame encoding order is shown in FIG. 10(B). Since the loss of an I-frame and P-frame will have cumulative negative effect on all in-coming frames (P and B frames) in the same GOP, preferred embodiments of the present invention provide a retransmission mechanism to secure I and P frames. On the other hand, B frames are non-reference frames. The data loss associated with a B frame will not affect other frames. The present invention may thus packetize B-frames in an efficient way.

Furthermore, video packet may be packetized at a slice boundary to isolate the air error to a local level. (Note: Slice is an MPEG2 term for a 16-pixel high rectangle image block.)

Preferred embodiments of the present invention use a Moonlight-encoded output format. (Moonlight provides a version of MPEG2 that runs on the Philips PNX1500 chip.)

Implementation

A particular implementation of an embodiment of the invention is shown in FIGS. 11(A)-11(M) which are circuit schematic diagrams of a transmitter/receiver according to embodiments of the present invention. The following tables (which is considered part of this application) list the parts for the components shown in the drawings. One skilled in the art will realize that scope of the invention is in no way limited to this particular implementation. The tables list component numbers which correspond to components in the drawings of FIGS. 11(A)-11(M). Under the heading "Description" is listed a description of the component and a supplier thereof.

TABLE I (TX)

| Component | | Transmitter Materials Description | Reference |
|---|---|---|---|
| 697-2026 | | 1 UF 16 V CER 10% X7R 1206 2.00000000 MURATA | C10, C11 |
| | Subs: | 697-2674 1 UF 25 V CER 10% X7R 1206 AVX | |
| | Mfgrs: | MURATA GRM31MR71C105KAO1L | |
| 698-1325 | | 22 PF 50 V CER 5% NPO 0603 6.00000000 | SEE REMARKS |
| | Remks: | C26-C28, C159, C169, C170 | |
| | Mfgrs: | PANASONIC ECJ-1VC1H220J | |
| 698-1349 | | .1 UF 50 V CER 10% X7R 0603 80.00000000 SAMSUNG | SEE REMARKS |
| | Remks: | C2-C4, C6-C9, C20-C25, C32-C43, C45-C66, C68, C71-C74, C121, C123, C125-C129, C135-C136, C139, C147-C151, C158, C174, C104, C104-C?? | |
| | Mfgrs: | SAMSUNG CL10B104KBNC | |
| 698-1635 | | .001 UF 50 V CER 5% X7R 0603 1.00000000 | C160 |
| | Mfgrs: | MURATA GRM39X7R102K050AD | |
| 698-1636 | | 10 PF 200 V CER 5% C0G 0603 1.00000000 | C171 |
| | Mfgrs: | MURATA GRM39C0G100C050AD | |
| 698-3073 | | .01 UF 50 V CER 10% X7R 0603 11.00000000 | SEE REMARKS |
| | Remks: | C5, C16-C19, C122, C140-C144 | |
| | Mfgrs: | PHYCOMP/YAGEO 06032R103K9B20D | |
| 698-3247 | | 470 PF 25 V CER 5% C0G 0603 19.00000000 | SEE REMARKS |
| | Remks: | C1, C12, C13, C100-C103, C118, C119, C130-C134, C145, C146, C152, C153, C202 | |
| | Mfgrs: | AVX 06033A471JAT2A | |
| 698-3278 | | .022 UF 25 V 10% X7R 0603 5.00000000 | C161-C165 |
| | Mfgrs: | SAMSUNG CL10B223KANC | |
| 698-4487 | | 180 PF 50 V CER 5% C0G 0603 1.00000000 | C168 |
| | Mfgrs: | MURATA GRM1885C1H181JA01D | |
| 698-4489 | | 82 PF 50 V CER 5% C0G 0603 1.00000000 | C172 |
| | Mfgrs: | MURATA GRM1885C1H820JA01D | |
| 699-3353 | | 560 PF 50 V CER 10% X7R 0805 3.00000000 FIRST | C78, C79, C98 |
| | Mfgrs: | AVX 08055C561KAT2A | |
| 700-4415 | | 1500 UF 6.3 V ELECT 20% SIZE G 4.00000000 | C44, C69, C75, C77 |
| | Mfgrs: | NIPPON NACZ152M6.3V10X10.5TR1 | |
| 700-4553 | | 470 UF 25 V ELECT 20% SIZE F 2.00000000 | C67, C70 |
| | Mfgrs: | PANASONIC ECE-V1EA471P | |
| 703-2758 | | 10 UF 10 V TANT 10% CASE A 33.00000000 | SEE REMARKS |
| | Remks: | C14, C15, C29-31, C80-C97, C99, C116, C117, C137, C154-C C157, C1, C167 | |
| | Mfgrs: | KEMET T491A106K010AS | |
| 709-1626 | | 33 4-ISO 742 5% 1/16 W 7.00000000 | RP13-RP16, RP18-RP20 |
| | Mfgrs: | CTS 742C083330JTR | |
| 709-1629 | A | 1K 4-ISO 742 5% 1/16 W 1.00000000 | RP11 |
| | Mfgrs: | KOA CN1J4T102J | |

TABLE I-continued (TX)

| Component | | Transmitter Materials Description | Reference |
|---|---|---|---|
| 709-1632 | | 8.2K 4-ISO 742 5% 1/16 W 7.00000000 | RP4-RP9, RP12 |
| | Mfgrs: | CTS 742C083822JTR | |
| 709-2826 | A | 22 4-ISO 742 5% 1/16 W 1.00000000 | RP17 |
| | Mfgrs: | KOA CN1J4TD220J | |
| 709-4491 | | 68 4-ISO 742 5% 1/16 W 2.00000000 | RP1, RP2 |
| | Mfgrs: | CTS 742C083680JTR | |
| 709-4550 | | 220 4-ISO 742 5% 1/10 W 1.00000000 | RP3 |
| | Mfgrs: | CTS 742C083221 | |
| 715-4556 | | .22 OHM 5% 1/4 W 1206 3.00000000 | R77-R79 |
| | Mfgrs: | PANASONIC ERJ-8RQJR22V | |
| 717-1327 | C | 10K 0603 5% 1/16 W 18.00000000 | SEE REMARKS |
| | Remks: | R23-R38, R41, R55 | |
| | Mfgrs: | VISHAY CRCW0603-103JRT1 | |
| 717-1331 | | 1K 0603 5% 1/10 W 5.00000000 | R21, R50-R53 |
| | | VISHAY | |
| | Mfgrs: | VISHAY CRCW0603102JRT1 | |
| 717-1602 | | 0 0603 5% 1/10 W 8.00000000 | SEE REMARKS |
| | | FIRST | |
| | Remks: | R1, R4, R5, R7, R19, R40, R42, L17 | |
| | Mfgrs: | DALE CRCW0603-000JRT1 | |
| 717-1607 | | 33 0603 5% 1/16 W 6.00000000 | SEE REMARKS |
| | Remks: | R8, R9, R14, R15, R45, R81 | |
| | Mfgrs: | PANASONIC ERJ-3GEYJ330V | |
| 717-1611 | | 220 0603 5% .1 W 5.00000000 | R10, R11, R16, R17, R82 |
| | Mfgrs: | PANASONIC ERJ-3GSYJ221V | |
| 717-1612 | | 330 0603 5% 1/10 W 1.00000000 | R44 |
| | | PANASONIC | |
| | Mfgrs: | PANASONIC ERJ-3GSYJ331V | |
| 717-1615 | | 510 0603 5% 1/16 W 2.00000000 | R59, R60 |
| | Mfgrs: | ROHM MCR03 EZH J 511 | |
| 717-1619 | | 75.0 0603 5% 1/16 W 10.00000000 | SEE REMARKS |
| | Remks: | R76, R56, R61-R63, R67-R69, R83, R84 | |
| | Mfgrs: | PANASONIC ERJ-3EKF75R0V | |
| 717-3253 | A | 365 0603 1% .1 W 2.00000000 | R18, R20 |
| | Mfgrs: | KOA RK73H1JT3650F | |
| 717-3288 | | 1 M 0603 5% 1/10 W 1.00000000 | R80 |
| | Mfgrs: | ROHM MCR03EZHJ105 | |
| 717-4258 | | 100 0603 1% .1 W 7.00000000 | SEE REMARKS |
| | | YAGEO | |
| | Remks: | R12, R46, R48, R49, R54, R57, R58 | |
| | Mfgrs: | YAGEO 9C06031A1000FKHFT | |
| 717-4260 | | 470 0603 1% .1 W 1.00000000 | R70 |
| | | YAGEO | |
| | Mfgrs: | YAGEO 9C06031A4700FKHFT | |
| 717-4262 | | 15.0K 0603 1% .1 W 3.00000000 | R73, R74, R75 |
| | | YAGEO | |
| | Mfgrs: | YAGEO 9C06031A1502FKHFT | |
| 717-4294 | | 1.80K 0603 1% .1 W 1.00000000 | R22 |
| | | YAGEO | |
| | Mfgrs: | YAGEO 9C06031A1801FKHFT | |
| 717-4493 | | 180 0603 1% 1/16 W 2.00000000 | R72, R47 |
| | Mfgrs: | ROHM MCR03EZPFX1800 | |
| 722-2525 | | B140 SCHOTTKY SMA 40 V 1 A 5.00000000 12 mm | D3, D7-D10 |
| | Mfgrs: | DIODES INC. B140-13 | |
| 722-3956 | | NUP4301 ESD TSOP6 70 V 100 uA 3.00000000 FIRST | D11-D13 |
| | Mfgrs: | ON SEMICONDUCTOR NUP4301MR6T1 | |
| 729-2120 | | 600 OHM FERRITE 100 MA 0603 9.00000000 | SEE REMARKS |
| | Remks: | L6, L7, L11, L15, L16, L20, L21, L24, L28 | |
| | Mfgrs: | NIC COMPONENTS NCB0603R601 | |
| 729-2914 | | 47 UH 1.8 A 13 × 9.5 MM 20% 3.00000000 VISHAY-DALE | L1-L3 |
| | Mfgrs: | VISHAY-DALE IDC-5020-47UH-20 | |
| 729-3398 | | 390 OHM 2 A 1206 FERRITE 3.00000000 | L9, L10, L27 |
| | Mfgrs: | MURATA BLM31PG391SN1L | |

TABLE I-continued (TX)

| Component | Transmitter Materials Description | Reference |
|---|---|---|
| 729-3399 | 22 OHM .5 A 0603 FERRITE 9.00000000 | SEE REMARKS |
| Remks: | L12-L14, L18, L19, L22, L23, L25, L26 | |
| Mfgrs: | MURATA BLM18BB220SN1D | |
| 729-4500 | 2.2 UH 30 MA 0805 10% 1.00000000 | L5 |
| Mfgrs: | MURATA LQM21NN2R2K10D | |
| 729-4501 | 5.6 UH 15 MA 0805 10% 1.00000000 | L4 |
| Mfgrs: | TDK MLF2012E5R6K | |
| 731-0572 | 3 A fuse - 1206 1.00000000 | F1 |
| Mfgrs: | BUSMAN TR\3216FF-3A LITTLE FUSE 429003WR | |
| 736-0983 | PSHBTN RA PANASONIC EVQ-PF106K 1.00000000 | SW1, SW2, SW5 |
| Mfgrs: | PANASONIC EVQ-PF106K | |
| 747-3597 | 27 MHZ OSC 7 × 5 MM SMT 50 PPM 3.3 V 1.00000000 | U5 |
| Mfgrs: | EPSON SG-8002CA-PCB | |
| 747-4344 | 27 MHZ CRY HCM49 50 PPM 18 PF 1.00000000 | Y1 |
| Mfgrs: | CITIZEN HCM49-27.000MABJT | |
| 750-0449 | 74HC14 SHOTKY, HEX INV, SO14 1.00000000 | U19 |
| Mfgrs: | FAIRCHILD MM74HC14M | |
| 750-2433 | 24LC16B 2KX8, 2.5 V, EE SO8 1.00000000 | U6 |
| Mfgrs: | MICROCHIP 24LC16B/SN | |
| 750-2627 | M24C04-WMN6 EEPROM SO8 1.00000000 | U16 |
| Mfgrs: | ST MICRO M24C04-WMN6 | |
| 750-2813 | TLV320AIC23PW, AUDCODEC, TSSOP28 1.00000000 | U3 |
| Mfgrs: | TEXAS INSTRUMENTS TLV320AIC23PW | |
| 750-2819 | LTC1726ES8-2.5, TRI SUPVSR, SO8 1.00000000 3.3, 2.5, ADJ SUPERVISOR | U7 |
| Mfgrs: | LINEAR TECHNOLOGIES LTC1726ES8-2.5 | |
| 750-2972 | MC33063AD SMPS CONTROLLER SO8 3.00000000 | U2, U8, U9 |
| Mfgrs: | ON SEMICONDUCTOR MC33063ADR2 | |
| 750-4412 | ADE3700X XGA VID SCALER QFP128 1.00000000 | U17 |
| Mfgrs: | ST MICRO ADE3700X | |
| 750-4413 | MT46V16M16 DDR SDRAM TSSOP66 2.00000000 | U13, U14 |
| Mfgrs: | MICRON TECH MT46V16M16TG-5B | |
| 750-4414 | PNX1502E VIDEO DSP 300 MHZ BGA 1.00000000 | U1 |
| Mfgrs: | PHILLIPS PNX1502E | |
| 750-4457 | MAX3232ID R5232 DVR SOIC 1.00000000 | U15 |
| Mfgrs: | TI MAX3232ID | |
| 750-4555 | RC1117S33 3.3 V REG 1 A SOT-223 1.00000000 | U11 |
| Mfgrs: | FAIRCHILD RC1117S33T | |
| 750-4560 | STV2310 NTSC VID DECODER QFP64 1.00000000 14 × 14 × 1.4 | U12 |
| Mfgrs: | ST MICRO STV2310D | |
| 760-4558 | AVOCENT ALCATRAZ LOCAL PCB 1.00000000 PANALIZATION 1 UP | PCB |
| 770-0113 | 9 DB9 FEMALE RA TIN W/JACK SCR 1.00000000 | P6 |
| Mfgrs: | JAMECO 104951 | |
| 770-0928 A | 15, DB15HD BLUE, FEMALE, RA, TIN, 1.00000000 W/JACK HIGH DENSITY | P8 |
| Mfgrs: | TYCO/AMP 1-788624-2 | |
| 770-2122 | 4, DIN4 FEMALE RA, SVIDEO 1.00000000 | P10 |
| Mfgrs: | CUI INC MD-40SM | |
| 770-3153 | 53.5 MM AUDIO FEMRA LIME 1.00000000 | P3 |
| Mfgrs: | STARCONN 914N05-T80000 | |
| 770-3332 | 3 2.1 MM ID 5.5 MM OD RA POWER 1.00000000 CONNECTOR 4 A 9.5 MM DEEP | P7 |
| Mfgrs: | CUI PJ-202AH | |
| 770-4573 | 14 2 × 7 SHROUDED 3 M MHB14K 1.00000000 | P5 |
| Mfgrs: | 3 M MHB14K | |
| 770-4574 | 2 RCA JACK RA RED 1.00000000 | P2 |
| Mfgrs: | CUI RCJ-012 | |
| 770-4575 | 2 RCA JACK RA BLUE 1.00000000 | P12 |
| Mfgrs: | CUI RCJ-015 | |

TABLE I-continued

(TX)

| Component | | Transmitter Materials Description | Reference |
|---|---|---|---|
| 770-4576 | | 2 RCA JACK RA YELLOW 1.00000000 | P1 |
| | Mfgrs: | CUI RCJ-014 | |
| 770-4577 | | 2 RCA JACK RA GREEN 1.00000000 | P9 |
| | Mfgrs: | CUI RCJ-046 | |
| 771-2818 | | 124, MINI PCI III, RA GOLD 5.6HT 1.00000000 | P4 |
| | Mfgrs: | STARCONN 087B56-20000A | |
| 780-3081 | | GRN RA T1 562 NM 2.2 V 10 MA 2.00000000 KINGBRIGHT L934CB/GD | D1, D2 |
| | Mfgrs: | KINGBRIGHT L934CB/GD | |
| 780-4569 | | YELLOW T-1 RA LED 3 V 10 MA 2.00000000 KINGBRIGHT L934CB/YD | D4, D5 |
| | Mfgrs: | KINGBRIGHT L934CB/YD | |
| 780-4570 | | RED T-1 RA LED 3 V 10 MA 1.00000000 KINGBRIGHT L934CB/ID | D6 |
| | Mfgrs: | KINGBRIGHT L934CB/ID | |

NOTES:
DNL: R2, R3, R6, R7, R13, R39, R43, R45, R46, C76, R71, C115, C120, C124, L8, U10

TABLE II

(RX)

| Component | | Remote (Receiver) Materials Description | Reference |
|---|---|---|---|
| 697-2026 | | 1 UF 16 V CER 10% X7R 1206 2.00000000 MURATA | C10, C11 |
| | Mfgrs: | MURATA GRM31MR71C105KAO1L | |
| 698-1349 | | .1 UF 50 V CER 10% X7R 0603 67.00000000 SAMSUNG | SEE REMARKS |
| | Remks: | C2-C9, C14, C20-C27, C32-C43, C45-C66, C68, C71-C74, C10 C104, C114 | |
| | Mfgrs: | SAMSUNG CL10B104KBNC | |
| 698-3073 | | .01 UF 50 V CER 10% X7R 0603 4.00000000 PHYCOMP/YAGEO 06032R103K9B20D | C16-C19 |
| 698-3247 | | 470 PF 25 V CER 5% C0G 0603 4.00000000 | C1, C12, C13, C202 |
| | Mfgrs: | AVX 06033A471JAT2A | |
| 699-3353 | | 560 PF 50 V CER 10% X7R 0805 3.00000000 FIRST | C78, C79, C98 |
| | Mfgrs: | AVX 08055C561KAT2A | |
| 700-4415 | | 1500 UF 6.3 V ELECT 20% SIZE G 3.00000000 NIPPON NACZ152M6.3 V10 × 10.5TR13 | C44, C69, C75 |
| 700-4553 | | 470 UF 25 V ELECT 20% SIZE F 3.00000000 | C67, C70, C76 |
| | Mfgrs: | PANASONIC ECE-V1EA471P | |
| 703-2758 | | 10 UF 10 V TANT 10% CASE A 35.00000000 | SEE MA |
| | Remks: | C15, C29-31, C80-C97, C99, C115-C117, C124, C154-C157 | |
| | Mfgrs: | KEMET T491A106K010AS | |
| 709-1626 | | 33 4-ISO 742 5% $\frac{1}{16}$ W 7.00000000 | RP1, RP13-16, RP18-19 |
| | Mfgrs: | CTS 742C083330JTR | |
| 709-1629 | A | 1K 4-ISO 742 5% $\frac{1}{16}$ W 1.00000000 | RP11 |
| | Mfgrs: | KOA CN1J4T102J | |
| 709-1632 | | 8.2K 4-ISO 742 5% $\frac{1}{16}$ W 8.00000000 | RP2-RP4-RP9, RP12 |
| | Mfgrs: | CTS 742C083822JTR | |
| 709-2826 | A | 22 4-ISO 742 5% $\frac{1}{16}$ W 1.00000000 | RP17 |
| | Mfgrs: | KOA CN1J4TD220J | |
| 709-4550 | | 220 4-ISO 742 5% $\frac{1}{10}$ W 1.00000000 | RP3 |
| | Mfgrs: | CTS 742C083221 | |
| 715-4556 | | .22 OHM 5% $\frac{1}{4}$ W 1206 3.00000000 | R77-R79 |
| | Mfgrs: | PANASONIC ERJ-8RQJR22 V | |
| 717-1327 | C | 10K 0603 5% $\frac{1}{16}$ W 19.00000000 | SEE REMARKS |
| | Remks: | R23-R38, R41, R64, R65 | |
| | Mfgrs: | VISHAY CRCW0603-103JRT1 | |
| 717-1331 | | 1K 0603 5% $\frac{1}{10}$ W 5.00000000 VISHAY | R21, R50-R53 |
| | Mfgrs: | VISHAY CRCW0603102JRT1 | |
| 717-1602 | | 0 0603 5% $\frac{1}{10}$ W 7.00000000 FIRST | SEE REMARKS |
| | Remks: | R1, R4, R5, R7, R19, R40, R42 | |
| | Mfgrs: | DALE CRCW0603-000JRT1 | |

TABLE II-continued (RX)

| Component | | Remote (Receiver) Materials Description | Reference |
|---|---|---|---|
| 717-1607 | | 33 0603 5% 1/16 W 8.00000000 | SEE REMARKS |
| | Remks: | R8, R9, R14, R15, R46, R55, R57, R59 | |
| | Mfgrs: | PANASONIC ERJ-3GEYJ330 V | |
| 717-1611 | | 220 0603 5% .1 W 4.00000000 | R10, R11, R16, R17 |
| | Mfgrs: | PANASONIC ERJ-3GSYJ221 V | |
| 717-1612 | | 330 0603 5% 1/10 W 1.00000000 PANASONIC | R44 |
| | Mfgrs: | PANASONIC ERJ-3GSYJ331 V | |
| 717-1613 | | 430 OHM 0603 1.00000000 | R58 |
| | Mfgrs: | PANASONIC ERJ-3GSYJ431 V | |
| 717-1619 | | 75.0 0603 5% 1/16 W 3.00000000 | R60, R61, R62 |
| | Mfgrs: | PANASONIC ERJ-3EKF75R0 V | |
| 717-3253 | A | 365 0603 1% .1 W 2.00000000 | R18, R20 |
| | Mfgrs: | KOA RK73H1JT3650 F | |
| 717-3591 | | 4.02K 0603 1% .1 W 1.00000000 | R63 |
| | Mfgrs: | DALE CRCW06034021FRT1 | |
| 717-4258 | | 100 0603 1% .1 W 5.00000000 YAGEO | SEE REMARKS |
| | Remks: | R12, R45, R48, R49, R54 | |
| | Mfgrs: | YAGEO 9C06031A1000FKHFT | |
| 717-4294 | | 1.80K 0603 1% .1 W 1.00000000 YAGEO | R22 |
| | Mfgrs: | YAGEO 9C06031A1801FKHFT | |
| 722-2525 | | B140 SCHOTTKY SMA 40 V 1 A 5.00000000 12 mm | D3, D7-D10 |
| | Mfgrs: | DIODES INC. B140-13 | |
| 722-3956 | | NUP4301 ESD TSOP6 70 V 100 uA 1.00000000 FIRST | D12 |
| | Mfgrs: | ON SEMICONDUCTOR NUP4301MR6T1 | |
| 729-2120 | | 600 OHM FERRITE 100 MA 0603 10.00000000 | SEE REMARKS |
| | Remks: | L4-L7, L11, L15, L16, L20, L21, L28 | |
| | Mfgrs: | NIC COMPONENTS NCB0603R601 | |
| 729-2914 | | 47 UH 1.8 A 13 × 9.5 MM 20% 3.00000000 VISHAY-DALE | L1-L3 |
| | Mfgrs: | VISHAY-DALE IDC-5020-47UH-20 | |
| 729-3398 | | 390 OHM 2 A 1206 FERRITE 5.00000000 | L9, L10, L17, L24, L27 |
| | Mfgrs: | MURATA BLM31PG391SN1L | |
| 729-3399 | | 22 OHM .5 A 0603 FERRITE 9.00000000 | SEE REMARKS |
| | Remks: | L12-L14, L18, L19, L22, L23, L25, L26 | |
| | Mfgrs: | MURATA BLM18BB220SN1D | |
| 731-0572 | | 3 A fuse - 1206 1.00000000 | F1 |
| | Mfgrs: | BUSMAN TR\3216FF-3 A LITTLE FUSE 429003WR | |
| 736-0983 | | PSHBTN RA PANASONIC EVQ-PF106K 2.00000000 | SW1, SW2 |
| | Mfgrs: | PANASONIC EVQ-PF106K | |
| 736-1099 | | PSHBTN, NO, PANASONIC, EVQ-PAE04M 1.00000000 | SW5 |
| | Mfgrs: | PANASONIC EVQ-PAE04M | |
| 747-3597 | | 27 MHZ OSC 7 × 5 MM SMT 50 PPM 3.3 V 1.00000000 | U5 |
| | Mfgrs: | EPSON SG-8002CA-PCB | |
| 747-4344 | | 27 MHZ CRY HCM49 50 PPM 18 PF 1.00000000 | Y1 |
| | Mfgrs: | CITIZEN HCM49-27.000 MABJT | |
| 750-2433 | | 24LC16B 2KX8, 2.5 V, EE SO8 1.00000000 | U6 |
| | Mfgrs: | MICROCHIP 24LC16B/SN | |
| 750-2813 | | TLV320AIC23PW, AUDCODEC, TSSOP28 1.00000000 | U3 |
| | Mfgrs: | TEXAS INSTRUMENTS TLV320AIC23PW | |
| 750-2814 | | THS8134BCPHP, VIDEO DAC, 48HTQFP 1.00000000 | U12 |
| | Mfgrs: | TEXAS INSTRUMENTS THS8134BCPHP | |
| 750-2819 | | LTC1726ES8-2.5, TRI SUPVSR, SO8 1.00000000 3.3, 2.5, ADJ SUPERVISOR | U7 |
| | Mfgrs: | LINEAR TECHNOLOGIES LTC1726ES8-2.5 | |
| 750-2835 | | CS4954-CQ NTSC ENCODER 44TQFP 1.00000000 | U16 |
| | Mfgrs: | CRYSTAL CS4954-CQ | |
| 750-2972 | | MC33063AD SMPS CONTROLLER SO8 3.00000000 | U2, U8, U9 |
| | Mfgrs: | ON SEMICONDUCTOR MC33063ADR2 | |
| 750-4413 | | MT46V16M16 DDR SDRAM TSSOP66 2.00000000 | U13, U14 |
| | Mfgrs: | MICRON TECH MT46V16M16TG-5B | |
| 750-4414 | | PNX1502E VIDEO DSP 300 MHZ BGA 1.00000000 | U1 |
| | Mfgrs: | PHILLIPS PNX1502E | |
| 750-4457 | | MAX3232ID RS232 DVR SOIC 1.00000000 | U15 |
| | Mfgrs: | TI MAX3232ID | |
| 750-4555 | | RC1117S33 3.3 V REG 1 A SOT-223 2.00000000 | U11, U10 |
| | Mfgrs: | FAIRCHILD RC1117S33T | |
| 760-4563 | | AVOCENT ALCATRAZ REMOTE PCB 1.00000000 PANALIZATION 1 UP | PCB |

TABLE II-continued (RX)

| Component | | Remote (Receiver) Materials Description | Reference |
|---|---|---|---|
| 770-0113 | | 9 DB9 FEMALE RA TIN W/JACK SCR 1.00000000 | P6 |
| | Mfgrs: | JAMECO 104951 | |
| 770-0928 | A | 15, DB15HD BLUE, FEMALE, RA, TIN, 1.00000000 W/JACK HIGH DENSITY | P8 |
| | Mfgrs: | TYCO/AMP 1-788624-2 | |
| 770-2122 | | 4, DIN4 FEMALE RA, SVIDEO 1.00000000 | P10 |
| | Mfgrs: | CUI INC MD-40SM | |
| 770-3153 | | 5 3.5 MM AUDIO FEMRA LIME 1.00000000 | P3 |
| | Mfgrs: | STARCONN 914N05-T80000 | |
| 770-3332 | | 3 2.1 MM ID 5.5 MM OD RA POWER 1.00000000 CONNECTOR 4 A 9.5 MM DEEP | P7 |
| | Mfgrs: | CUI PJ-202AH | |
| 770-4573 | | 14 2 × 7 SHROUDED 3 M MHB14K 1.00000000 | P5 |
| | Mfgrs: | 3 M MHB14K | |
| 770-4574 | | 2 RCA JACK RA RED 1.00000000 | P2 |
| | Mfgrs: | CUI RCJ-012 | |
| 770-4575 | | 2 RCA JACK RA BLUE 1.00000000 | P12 |
| | Mfgrs: | CUI RCJ-015 | |
| 770-4576 | | 2 RCA JACK RA YELLOW 1.00000000 | P1 |
| | Mfgrs: | CUI RCJ-014 | |
| 770-4577 | | 2 RCA JACK RA GREEN 1.00000000 | P9 |
| | Mfgrs: | CUI RCJ-046 | |
| 771-2818 | | 124, MINI PCI III, RA GOLD 5.6HT 1.00000000 | P4 |
| | Mfgrs: | STARCONN 087B56-20000 A | |
| 780-3081 | | GRN RA T1 562 NM 2.2 V 10 MA 2.00000000 KINGBRIGHT L934CB/GD | D1, D2 |
| | Mfgrs: | KINGBRIGHT L934CB/GD | |
| 780-4569 | | YELLOW T-1 RA LED 3 V 10 MA 2.00000000 KINGBRIGHT L934CB/YD | D4, D5 |
| | Mfgrs: | KINGBRIGHT L934CB/YD | |
| 780-4570 | | RED T-1 RA LED 3 V 10 MA 1.00000000 KINGBRIGHT L934CB/ID | D6 |
| | Mfgrs: | KINGBRIGHT L934CB/ID | |

Notes:
DNL: R2, R3, R6, R13, R24, R26, R28, R30, R32, R33, R36, R38, R39, R43, R56, R60, R66-R69, R84, C115, C120, C124, L8

APPLICATIONS

There are countless applications of the present invention. One particular application is mentioned here, by way of example only. The present invention may be used to provide digital signage for/in, e.g., an airport, supermarket, bank, stadium, school, house of worship, military base, courtroom, hospital, shopping mall, airport, trainibus station and the like and for presentations, training, large group communications, conferencing, network control rooms, and the like. A typical grocery store installation is shown in FIG. 7.

For some applications, it might be desirable to provide printing capabilities from a remote unit. In such cases, serial port functionality may be added to the remote unit (e.g., to allow for coupon printing and the like).

Thus are described a system and associated methods for supporting wireless streaming media. While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:
1. A system comprising:
at least one transmitter unit constructed and adapted to transmit wireless streaming media to detected ones of one or more receiver units, the transmitter unit including:
external antenna connectors connectable to selected antennae including omni-directional antennae and long-distance antennae;
plural external ports for communication with plural differently-formatted streaming media video sources delivering source video in respectively different video formats from associated repository video files of the video sources, the transmitter unit constructed and adapted to automatically detect a type of the different video formats from the differently-formatted streaming video sources;
an image scaler to transform the source video into video information at a preset resolution;
a digital video signal processor receiving the video information at the preset resolution, converting the video information into one of a plurality of available video protocols, and preparing the video information for wireless transmission to the detected ones of the receiver units;
the transmitter unit constructed and adapted to automatically detect which receiver units are operating in an operational range and, if the number of the receiver units in the operational range is one, automatically establishing a point-to-point wireless communications channel to send the video information to the one of the receiver units, and if the number of other receiver units is more than one, automatically establishing a point-to-multipoint communication broadcast to send the video information to the more than one receiver units in the operational range, the transmitter unit also constructed and adapted to automatically detect when changes occur to the number of receiver units in the operating range and accordingly change the point-to-point or point-to-multipoint communication; and the one or more receiver units constructed and adapted to receive the wireless transmission, each detected receiver unit connected to at least one video rendering device of a plurality of video rendering devices that render video in respectively different video rendering styles, wherein each receiver unit is further constructed and adapted to produce, automatically, an appropriate signal for the at least one video rendering device connected thereto in a corresponding one of the different video rendering styles.

2. The system of claim 1, wherein the receiver provides bidirectional communication and transmits requests.

3. The system of claim 1, wherein the wireless transmission occurs over a secure connection between the transmitter unit and one or more of the receiver units.

4. The system of claim 3, wherein the secure connection is a Advanced Encryption Standard (AES).

5. The system of claim 1, further comprising a set up button to establish the communication channel between the transmitter unit and one or more receiver units.

6. The system of claim 1, wherein one or more of the receiver units has a signal strength monitor.

7. The system of claim 1, wherein the transmitter unit further comprises three video ports.

* * * * *